(12) United States Patent
Osheroff

(10) Patent No.: US 8,712,163 B1
(45) Date of Patent: Apr. 29, 2014

(54) PILL IDENTIFICATION AND COUNTERFEIT DETECTION METHOD

(71) Applicant: Osheroff/Schiffer Partners, Carmel, CA (US)

(72) Inventor: Jason Alexander Osheroff, Elk Grove, CA (US)

(73) Assignee: EyeNode, LLC, Carmel, CA (US)

( * ) Notice: Subject to any disclaimer, the term of this patent is extended or adjusted under 35 U.S.C. 154(b) by 0 days.

(21) Appl. No.: 13/715,115

(22) Filed: Dec. 14, 2012

(51) Int. Cl.
*G06K 9/00* (2006.01)
*A61K 9/44* (2006.01)
*A61K 9/28* (2006.01)

(52) U.S. Cl.
USPC ........... 382/195; 382/149; 424/467; 427/2.14

(58) Field of Classification Search
CPC ............... A61J 1/00; A61J 7/02; A61J 1/035; A61K 9/2072; G06T 7/0081; G06T 5/001; G06K 9/6203; G06K 9/20; G06K 9/00577
USPC ......... 382/128, 195, 199, 203, 190, 149, 151, 382/162, 266, 274; 235/462.01, 454; 206/531, 528, 534; 427/2.23, 2.1, 2.14; 348/125, 85; 424/10.2, 467, 400
See application file for complete search history.

(56) References Cited

U.S. PATENT DOCUMENTS

| | | | |
|---|---|---|---|
| 2,026,329 A | 12/1935 | Tauschek | |
| 2,612,994 A | 10/1952 | Woodland et al. | |
| 2,940,355 A | 6/1960 | Carey | |
| 3,478,216 A | 11/1969 | Carruthers | |
| 4,131,919 A | 12/1978 | Lloyd et al. | |
| 4,812,904 A | 3/1989 | Maring et al. | |
| 5,150,425 A | 9/1992 | Martin | |
| 6,026,189 A | 2/2000 | Greenspan | |
| 6,292,212 B1 | 9/2001 | Zigadlo et al. | |
| 6,535,637 B1 | 3/2003 | Wootton et al. | |
| 6,543,692 B1* | 4/2003 | Nellhaus et al. | 235/462.01 |
| 6,574,580 B2* | 6/2003 | Hamilton | 702/128 |
| 6,738,723 B2* | 5/2004 | Hamilton | 702/128 |
| 6,864,552 B2 | 3/2005 | Razeghi | |
| 6,952,206 B1 | 10/2005 | Craighead | |
| 7,028,723 B1 | 4/2006 | Alouani et al. | |
| 7,218,395 B2 | 5/2007 | Kaye et al. | |
| 7,599,516 B2 | 10/2009 | Limer et al. | |
| 7,764,324 B2 | 7/2010 | Andonian et al. | |

(Continued)

OTHER PUBLICATIONS

Manijeh Razeghi, Northwestern University, "Superlattice Sees Colder Objects in Two Colors and Higher Resolution," SPIE Newsroom (Feb. 16, 2012), available at http://cqd.eecs.northwestern.edu/news/25f0382c07dba032eea6a11b413af922.pdf.

(Continued)

*Primary Examiner* — Sheela Chawan
(74) *Attorney, Agent, or Firm* — Mesmer & Deleault, PLLC

(57) ABSTRACT

Disclosed is a computer-implemented method of pill analysis including the steps of acquiring a pill image having an image frame and detecting contrast shifts within the image frame to locate at least one object with an object outline. A first value for the object(s) is determined, where the value is an area, a position, a length, a width, an angle, a color, a brightness, a code, a shape, a crystal pile size, a crystal geometry, a substance identity, or a character identity. Based on the first and second values, the computer outputs a result to a user.

19 Claims, 29 Drawing Sheets

(56) References Cited

U.S. PATENT DOCUMENTS

| | | |
|---|---|---|
| 8,121,392 B2 * | 2/2012 | Popovich et al. ............. 382/143 |
| 8,235,302 B2 * | 8/2012 | Loiret-Bernal et al. ...... 235/494 |
| 8,457,384 B2 * | 6/2013 | Smilansky .................... 382/141 |
| 2001/0041968 A1 | 11/2001 | Hamilton |
| 2003/0174326 A1 | 9/2003 | Curtiss et al. |
| 2006/0015536 A1 | 1/2006 | Buchanan et al. |
| 2006/0045323 A1 | 3/2006 | Ateya |
| 2006/0124656 A1 | 6/2006 | Popovich, Jr. et al. |
| 2008/0000979 A1 | 1/2008 | Poisner |
| 2010/0284607 A1 | 11/2010 | Van Den Hengel et al. |
| 2010/0294927 A1 * | 11/2010 | Nelson et al. ................. 250/307 |
| 2011/0081087 A1 | 4/2011 | Moore |
| 2011/0317905 A1 | 12/2011 | Sam |
| 2012/0012750 A1 * | 1/2012 | Sinbar et al. ............. 250/339.03 |
| 2012/0013734 A1 * | 1/2012 | Ranieri et al. ................ 348/125 |
| 2012/0113231 A1 | 5/2012 | Kim et al. |
| 2012/0182397 A1 | 7/2012 | Heinzle |
| 2012/0183204 A1 | 7/2012 | Aarts et al. |

OTHER PUBLICATIONS

Korean Intellectual Property Office, International Search Report, PCT/US2012/070131 (Sep. 30, 2013).

Korean Intellectual Property Office, Written Opinion of the International Searching Authority, PCT/US2012/070131 (Sep. 27, 2013).

* cited by examiner

PILL IDENTIFICATION AND COUNTERFEIT DETECTION METHOD

BACKGROUND OF THE INVENTION

1. Field of the Invention

The present invention relates generally to identifying oral medications. Particularly, the present invention relates to a counterfeit detection and pill identification method.

2. Description of the Prior Art

In the pharmaceutical, law enforcement, and medical fields, it is necessary and desirable to identify and characterize oral and dermal medications (collectively referred to as "pills"). Among other things, being able to accurately identify and/or characterize one or more pills enables one to determine the nature of the substance and whether it poses a health risk to a person who ingested medication or pills from the same group. It also enables pharmaceutical companies and border enforcement officials to determine whether a medication is legitimate or counterfeit, and current or expired.

Current methods used to identify a medication rely heavily on visual inspection performed by humans. A person compares a pill or oral medication sample to a combination of a written description and accompanying photo. Most drug identification is performed this way and has been for a very long time. The quality of the identification often depends on the person correctly interpreting written definitions and pictures. In other methods of drug examination, a "computer vision" technique is used to identify drug shape, color, and size uniformity.

Error-free prescription fill is both an industry goal and a regulatory goal. Independent pharmacies are leaders in error-free prescription fill because they manually count pills or use manually-operated pill counting devices. Online prescription fill and chain drug store fill provide only a cursory examination of pills. Current products used for prescription fill collect only limited data for use in anti-counterfeit efforts. Although there are various pill counting and examination products available, no standardized method of displaying and sharing drug information is used.

Existing tools enable drug packagers to examine only portions of their product inventory. Pre-screening incoming inventory prior to packaging and distribution is performed manually or not at all. Drug manufacturers and pharmacies also do not have tools for examining the quality of pills and whether it has deteriorated due to shipping effects, temperature changes, aging, and manufacturing or packaging quality of medications.

In addition, no software-based tools for counterfeit detection are currently available to drug packagers, pharmacies, law enforcement, or the general public. Instead, the pharmaceutical industry and the Food and Drug Administration have requested a computer-based solution to these problems. The rapid increase in the number of generic drugs further emphasizes the need for anti-counterfeit tools.

In addition to the numerous issues above, current identification and counterfeit detection tools reject damaged or split pills. Current tools also ignore marking quality for anti-counterfeit applications. Further, no tool exists for addressing a pill's "drift" in appearance between the time of manufacture and the time of consumption. A pill's drift could indicate a counterfeit drug or a manufacturing quality issue.

Therefore, what is needed is an improved method and apparatus for identifying and characterizing pills, such as oral and dermal medications.

SUMMARY OF THE INVENTION

Current methods fail to detect counterfeit pills, fail to capture detailed information, and lack the ability to perform universal drug identification. Existing products also fail to address the desires for error-free prescription filling, eliminate drug packaging errors, and detect pharmaceutical manufacturer errors. Traditional pill identification methods exhibit deficiencies not only for pharmaceutical manufacturers and pharmacies, but these existing products further fail to serve the general public because no consumer versions of these products are available for use by the general public.

Online prescription fill and chain drug store fill each suffer from accuracy problems caused by incomplete examination of pills. Current products used for prescription fill do not completely examine pills nor do they collect sufficient data for anti-counterfeit efforts. The lack of a standardized procedure for displaying and sharing drug information results in incomplete pill information and no user interface or application is available for use from the drug maker all the way to the drug user.

It is an object of the present invention to provide a computer-based method of identifying pills, oral medications, dermal medications, and/or prescription drugs.

It is another object of the present invention to provide a method of identification that may be used for counterfeit screening, prescription filling verification, pill inventory screening, and/or evaluating pill identifiers as they change over time.

The present invention achieves these and other objectives by providing a computer-based pill identification and characterization method and apparatus for use in drug identification, drug quality verification, and counterfeit detection. The present invention addresses the need for fast, high-quality, prescription fill that checks for any form of pharmacy manufacture, packaging, and dispensary. The present invention is usable for prescriptions, over-the-counter drugs, supplements, natural medicines, and veterinary medicines. One embodiment of the present invention provides a computer-implemented method of pill analysis in which a computer acquires a pill image having an image frame and detects contrast shifts within the image frame to locate at least one object having an object outline. The computer determines a first value or values for the object(s) where the first value is an area, a position, a length, a width, an angle, a color, a brightness, a code, a shape, a crystal pile size, a crystal geometry, a substance identity, or a character identity. The computer searches within the object outline for additional contrast shifts to determine the contents of the object outline. For the contents of the object outline the computer determines at least one second value that is an area, a position, a length, a width, an angle, a color, a brightness, a code, a shape, a crystal pile size, a crystal geometry, a substance identity, or a character identity. The computer compares the first value with the second value and outputs a result to a user based on the first value and the second value.

In another embodiment of the method, the computer compares the first value(s) and the second value(s) with a reference value to obtain one or more drift values.

In another embodiment of the method, a pill authenticity is determined based on the at least one drift value.

In another embodiment of the method, the step of detecting contrast shifts is performed using a line scan method, a radial scan method, or a polygonal scan method.

In another embodiment of the method, the step of detecting contrast shifts includes detecting a change in a color, an intensity, a chemical constituency, or a physical geometry.

In an embodiment of the method where the change in a chemical constituency is determined, a change in one or more of an electron value, an isotope value, and a phase state value is determined.

In another embodiment of the method, the objects are a first pill side and a second pill side, and the method includes the steps of comparing a property of the first pill side with a corresponding property of the second pill side, where the property and the corresponding property are one of an area, a length, a width, a height, an angle, and a perimeter length. A label is assigned to the first pill side and to the second pill side.

In another embodiment of the method, the contrast shift contacts the image frame at more than one location and the method includes the steps of determining whether the at least one partial object is an incomplete drug object and determining whether the incomplete drug object substantially matches a portion of a whole geometric shape.

In another embodiment, the method also includes the steps of determining a first background value, determining a reference background value, and comparing the first background value with the reference background value to determine a background shift value.

In another embodiment of the method, the shift region contains one or more characters, and the computer searches any regions enclosed by the character(s) for a contrast shift.

In another embodiment of the method, the shift region contents include one or more characters and the computer defines each character by one or more elements that are a line segment, a curve, a circle, a vertex, a length, a distance, or a vector. The computer determines a value for each of the elements, where the value is a position, a length, an angle, a shape, a distance, a radius, or a line width. The computer calculates a drift value for the character(s).

In another embodiment of the method, the object is an oblong object and the method includes determining whether the pill is a capsule by detecting a capsule seam, a capsule band traversing the oblong object, or a plurality of objects having a substantially round shape.

In another embodiment of the method, the oblong object has a first elongated segment and a second elongated segment substantially parallel to the first elongated segment. Detecting a capsule seam includes detecting a first portion of the first elongated segment, the first portion having a proximal end and a distal end, detecting a second portion of the first elongated segment, the second portion having a proximal end and a distal end, where the second portion of the first elongated segment is substantially parallel to the first portion of the first elongated segment and where the distal end of the second portion of the first elongated segment is located proximate to the proximal end of the first portion of the first elongated segment. Also detected is a first transverse segment that extends transversely between the proximal end of the first portion of first elongated segment and the distal end of the second portion of the first elongated segment. A first portion of the second elongated segment has a proximal end and a distal end. A second portion of the second elongated segment is detected, where the second portion has a proximal end and a distal end, where the second portion of the second elongated segment is substantially parallel to the first portion of the second elongated segment, and where the distal end of the second portion of the second elongated segment is located proximate to the proximal end of the first portion of the second elongated segment. A second transverse segment is detected that extends transversely between the proximal end of the first portion of second elongated segment and the distal end of the second portion of the second elongated segment.

In another embodiment, the method includes the step of determining whether the first transverse segment is substantially collinear with the second transverse segment.

The present invention also includes a method of counterfeit pill detection in which a pill image is input to a computer. The computer determines at least one pill feature value that is an area, a size, a length, a width, a position, a color, an angle, a height, a shape, a texture, a crystal pile size, a crystal geometry, or a substance identity. The computer compares the pill feature value(s) to a reference value to obtain at least one pill feature drift value. Based on the pill feature drift value(s), the authenticity of a pill in the pill image is determined.

The present invention further includes a computer-implemented method of pill analysis from a pill image in which a pill image is input to a computer. The pill image has an image frame and the computer detects an object having object outline within the image frame. The computer determines for the object a value of a length, a width, a height, an area, a position, a color, an intensity, a shape, an angle, a perimeter length, code, a substance identity, a crystal pile size, a crystal geometry, or a character identity. The computer detects one or more additional object within the object outline, where the additional object(s) is (are) a letter, a number, a character, a symbol, or a glyph. The computer defines the additional object(s) using object elements that are a curve, a circle, an angle, a vector, a line width, a vertex, a distance, or a length. For the object elements, a value is calculated of a position, a distance, a dimension, or an angle. The value is compared with a reference value to obtain one or more drift values. A result is output based on the at least one drift value.

In another embodiment of the method, the result is a pill identity or an authenticity determination.

In another embodiment of the method, the step of detecting an object includes detecting a change in one or more of a color, an intensity, a chemical constituency, or a physical geometry.

An apparatus of the present invention uses simple cameras to examine and record the entire surface area of any pill presented to it. The invention also examines images from a remote internet source, for example. The method as embodied in software can run on many platforms, from a super computer to a cell phone. Therefore, it can be used at the most complex manufacturing facility or by a person at home using the present invention for imaging and identifying drugs.

One embodiment of the present invention treats every pill as if it were already damaged, split or modified. This means that the method can be used to identify drugs even if just a partial sample is provided. One embodiment of a pill identification and characterization method measures and records the alignment, rotation, and marking quality of letters, numbers, and symbols on pills with high enough accuracy to be able to act as an anti-counterfeit tool. The present invention also supports international registered medications.

DETAILED DESCRIPTION OF THE PREFERRED EMBODIMENT

The preferred embodiments of the present invention are illustrated in FIGS. 1-48. For the purposes of this specification, the word "pill" means prescription and non-prescription oral or dermal medications, medicines, nutritional supplements, vitamins, and pharmaceutical doses in the form of a tablet, pellet, gel, gel cap, capsule, patch, and other three-dimensional solid dose forms.

Apparatus

Figure 1:
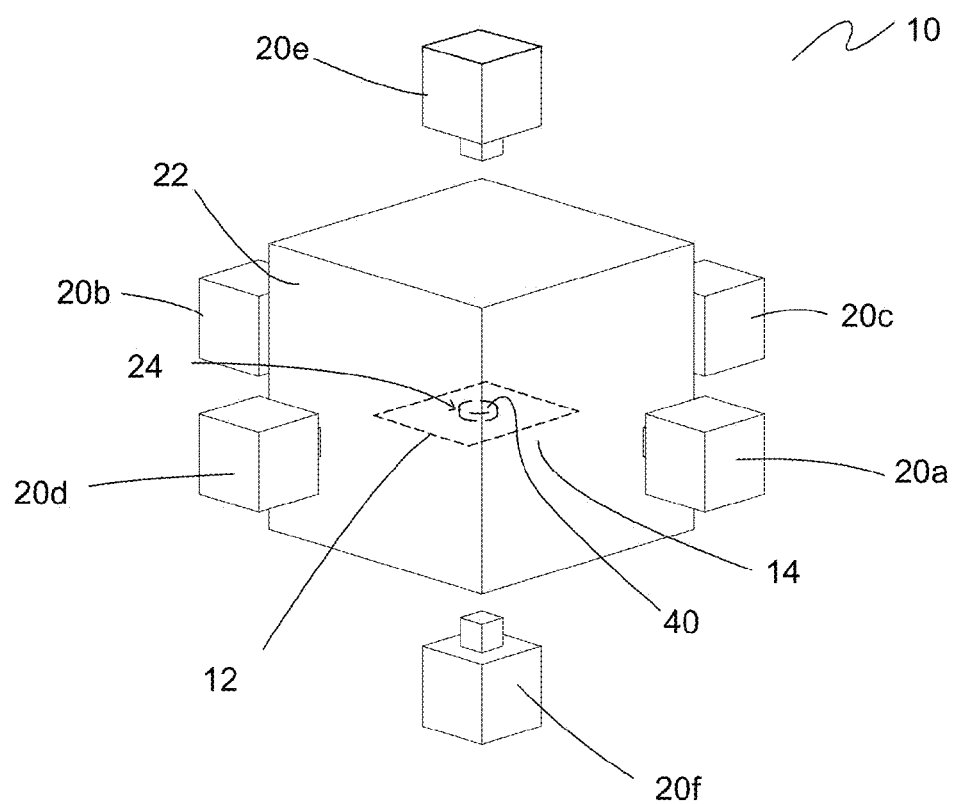
FIG. 1 illustrates a perspective view of one embodiment of an imaging chamber of the present invention.

Referring to FIG. 1, there is shown one embodiment of an imaging chamber 10 that may be used to capture one or more images of a pill 40. Imaging chamber 10 in one embodiment includes a transparent shelf 12 positioned within imaging chamber 10, preferably positioned horizontally across a middle portion 14 of imaging chamber 10 and positioned to support one or more pills 40.

Imaging chamber 10 is preferably rectangular or cubic and no smaller than 25 mm×25 mm×25 mm for characterizing or identifying a single pill. Chamber 10 is preferably no larger than 1 m×1 m×1 m to support up to 1,024 individual pills for any single use of the device or characterization of stored sensor data. For reference, a 32×32 array of FDA maximum sized (20 mm×~5 mm) pills, plus 5 mm gap between pills requires approximately 800 mm×320 mm of shelf space in imaging chamber 10.

Shelf 12 is preferably transparent to radiation (light) transmitted to or reflected from pill 40 in the visible, infrared, near-infrared, and/or ultraviolet wavelengths. Shelf 12 in one embodiment is transparent to selected wavelengths of radiation, but is opaque or semi-opaque to other wavelengths. Shelf 12 may be constructed of glass or transparent plastics or composites. Shelf 12 may be etched with either spatial dots or linear measurement reference markings. Shelf 12 may also contain or be part of a mass scale system for obtaining the weight or mass of objects on shelf 12. Shelf 12 may be made of disposable or recyclable materials to facilitate U.S. Pharmacopeia regulations for pharmaceutical dispensary equipment and cross-drug contamination.

Chamber 10 preferably has six sensors or image capturing devices 20a-20f positioned on each face 22 of chamber 10 with each image capture device 20 directed towards pill 40 located at or near a center 24 of imaging chamber 10. For example, chamber 10 has a side camera 20a, a side camera 20b, a side camera 20c, a side camera 20d, a top camera 20e, and a bottom camera 20f. Side camera 20a preferably opposes and directly faces side camera 20b and side camera 20c preferably opposes and directly faces side camera 20d. In this configuration, each image capturing device 20a-20f captures one or more image or data files 50 of pill 40 from six sides. The six image or data files 50 may then be individually or collectively analyzed. For example, six images 50 of pill 40 are "stitched" together using methods known in the art to form a composite three-dimensional image of pill 40. The same objective may be accomplished by one or more image capturing devices 20 that moves or rotates about a center 24 of imaging chamber 10 to capture images and data used to create multiple two-dimensional data sets and/or one or more three-dimensional data set(s) of pill 40.

Image capture device(s) 20 can be active sensors, such as Raman spectroscopy, terahertz cameras, 3D sensors, and infra-red illumination sensors. Image capture device(s) 20 may also be passive sensors, such as human visible light optical range sensors that use ambient or simple flash-based illumination. An example of a terahertz camera is described in U.S. Pat. No. 7,764,324. Examples of 3D sensors are disclosed in US patent application nos. 2012/0113231 and 2012/0182397. An example of an infrared sensor is disclosed in U.S. Pat. No. 6,292,212.

Images and data sets of pill 40 may further be processed to align, orient, rotate, center, zoom in/out, magnify, normalize, or otherwise adjust pill data for optimal analysis for determining the identity or genuineness of pill 40.

Image file and data processing is performed by a combination of hardware, software, and pill identification libraries or databases. Processing may be performed by a computer with any type of processor (hardware), software, firmware, or combination of processors (hybrid processor, FPGA, firmware, etc.) that is capable of image and image-sensor type data computations. Hardware may have some or all of the present invention inherent in its logic gate or circuit design. Software source code may be hosted by firmware, hardware, or a combination of the two.

Method

Figure 2:
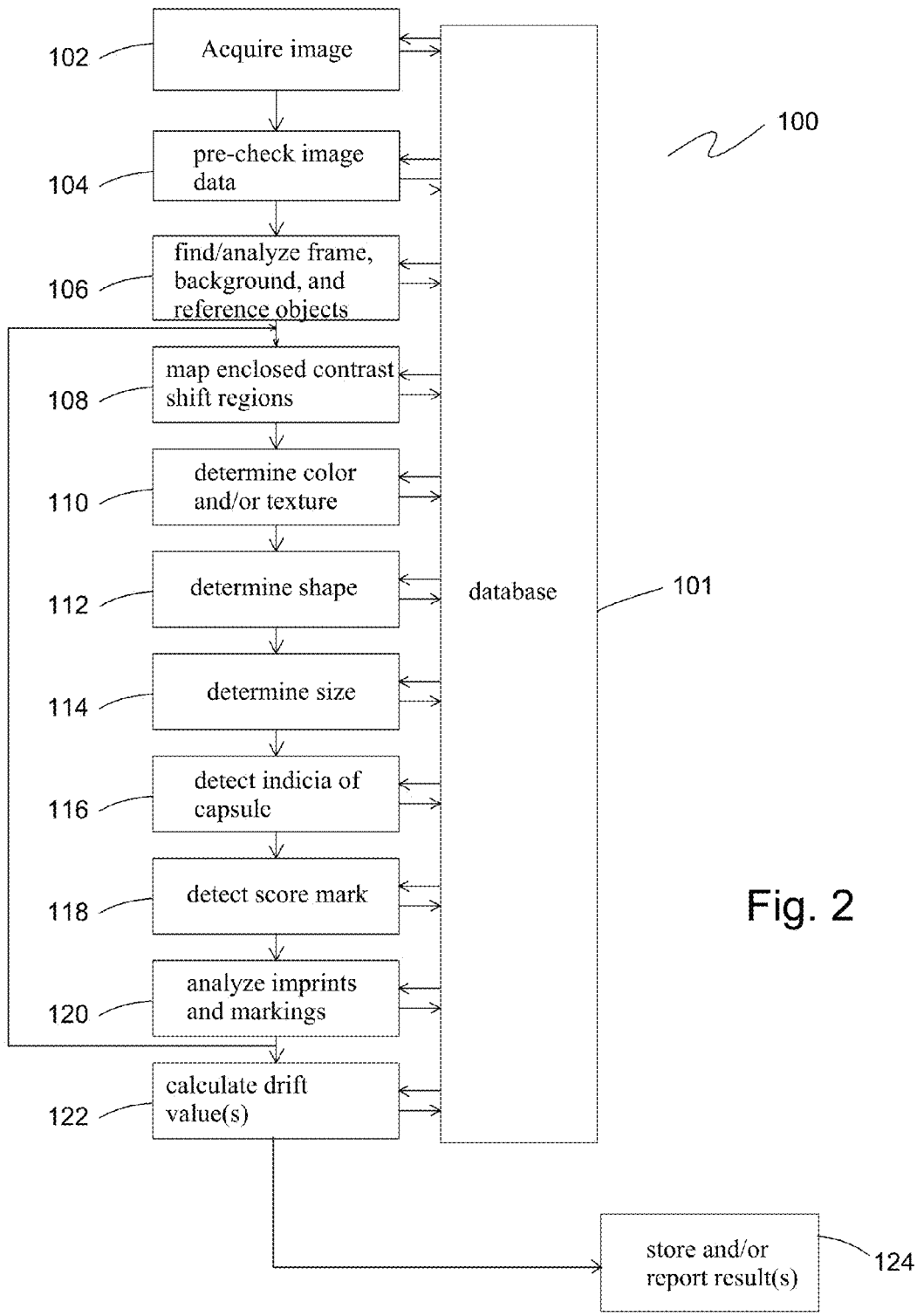
FIG. 2 illustrates a flow chart showing steps performed in one embodiment of a method of analyzing a pill image.

Referring to FIG. 2, there is shown a flow chart of an overview of one embodiment of a method 100 of analyzing a pill image. In step 102, a computer or similar analysis machine acquires one or more image or data files of a pill to be analyzed. The image file may be acquired using imaging chamber 10 described above or acquired from one or more separate image capture device, such as a camera or sensor. The image file may also be acquired, for example, from an Internet host, a third party database, an on-site database, an academic institution, a government agency, a drug vendor, and the like. Optionally, calibration data is acquired along with or instead of an image file. If method 100 has neither local nor remote database access, the processed pill image file or data may be analyzed locally without information from a database. Access to remote or local databases enables processing and comparison of data as well as communication of newly-generated data to databases.

Image file or data includes data sets contained in a remote or local data storage system. The image file or data may or may not have been pre-processed by method 100. In either case, the image file or data is placed into a repository or database 101 to be further processed by method 100. One source of image files is a database compliant with U.S. Food and Drug Administration ("FDA") structured product labeling ("SPL") guidelines and approved by the Health Level Seven (HL7) convention.

Method 100 communicates data sets to or from multiple different sensor types to perform counterfeit drug object detections. The present invention may be used, for example, to perform mass drift computation from pills characterized by a mass-scale sensor. Obtained mass-scale pill data is subtracted from a vendor's mass-scale reference data for the same pill.

Data sets generated by method 100 can be combined with other data sets from other sources, such as terahertz cameras, to perform multi-layered counterfeit detection. One example is analyzing a known-fake pill that barely passes identification analysis using visible spectrum optical sensors and Raman spectroscopy to determine the pill's core ingredients, but where the pill also fails a digital infra-red test used to determine that the pill coating contains compounds known to be poisonous to humans. Method 100 may be adapted for use by sensor vendors who wish to apply method 100 to processing contrast or feature differential patterns of targeted objects.

In step 104, method 100 pre-checks the image file or data as needed. Pre-check step 104 may include determining a beginning and an end of the data, determining whether the data is "framed" (i.e., the data file has an established beginning, end, and type), and evaluating the data format and type. Data set beginning can include, for example, headers, content ID, source information, and date. Data set end can include file markers and pointers. Data set type can indicate whether the data has been pre-processed, is 2D or 3D, and whether the data is in a format that allows faster searching and characterization. Step 104 would not be needed, for example, when a user knows the image or data file is satisfactory for analysis.

In one embodiment, the minimum image resolution is 72 pixels per inch with a minimum image size of 75×75 pixels (i.e., 1.04 inch×1.04 inch). In a minimum-sized image, the image may only contain one complete pill. In another embodiment, the minimum image size is 91×65 pixels as indicated by the U.S. National Library of Medicine. The maximum image file or data set size accepted for analysis in one embodiment is 10 GB.

In another embodiment, a ratio of the image resolution to the minimum object size is referred to as "crop grace." A crop grace check is optionally performed in step 104 by computing a value for frame crop grace as the area of visible background divided by the area of valid geometric objects. In one embodiment, images having a crop grace value greater than approximately 25 are rejected for analysis. Such images would appear to display one or more pills on a background, but the pills would be overwhelmed in the field of view by the excessive amount of visible background. In this situation, the camera/sensor is typically too far away from the drug object of interest and the focal system is not adjusted or zoomed to compensate.

The present invention exceeds current FDA drug image handling specifications in that it allows pills to contact the image frame edge and still be eligible for processing. The present invention also allows an edge-to-drug object distance that is greater than the FDA minimum. By exceeding the FDA's image handling and formatting requirements, the present invention is able to process images of drug objects provided by non-FDA entities, such as the general public. Also, the present invention exceeds the FDA drug object minimum and maximum size limits of 2 mm and 25 mm, respectively, in order to process objects that are from 0.1 mm to 0.5 m in size.

Step 104 may include processing incoming 2-dimensional images into 3-dimensional composite images. Step 104 may use video frame stream 2D to 3D image alignment and segmenting in combination to provide a 3D composite frame. This feature may be used for processing pills in motion, such as a pill held unsteadily in a person's hand while the video images are captured. Step 104 may include sequencing image frames from multiple cameras positioned around an imaging chamber. Step 104 may also include processing camera parameter information, such as image resolution, color depth, optical parameters, and the like, in order to generate image frames that have three-dimensional composite images built from two-dimensional sensor data. An example of 2D to 3D image conversion is disclosed in US patent application serial nos. 2010/0284607 and 2012/0183204.

Step 104 may include receiving 2D segments, 3D segments, and 3D composite representations of objects in an image frame or stream. Method 100 may receive 3D extrusion and composite object free-body data sets. Step 104 may include manipulating these data sets using other software instructions, such as graphics processing libraries and physics engines, to break down the image into vector format for a computer composite representation of the original image.

An example of image data for a pill includes SPL elements, texture, and bevel edge fields as shown below:

SPL_Color=green
SPL_Shape=tear
SPL_Size=14.00 mm
SPL_Score=1
Texture=true
Bevel Edge=false
SPL_imprint=250 mg In step 106, method 100 detects, isolates, and analyzes the image frame, background, and image reference objects. Step 106 is discussed in more detail below with a deconstructor module of the present invention and reference to FIG. 3.

In step 108, method 100 applies a deconstructor module to find and map an enclosed contrast shift region of the image. Step 108 is used, for example, to map the outline of a pill and features located within the pill outline. In steps 106 and 108, the deconstructor module is used to detect and isolate the pill image frame, reference objects, frame objects, and pill features. Objects detected with the deconstructor module are further processed as needed in steps 110-120.

In step 110, a pill's color and/or texture are detected. In step 112, an object's shape is determined, whether it is a regular geometric shape or an irregular shape. In step 114, the size of an object or feature is determined. In step 116, method 100 checks for a capsule seam. In step 118, a pill's score mark(s) is (are) detected. In step 120, pill imprints and markings are processed. If unmapped regions remain, such as a region or imprint located within shape detected on a pill surface, method 100 repeats steps 108-120 as needed to analyze all features of a pill.

In step 122, one or more drift values are calculated for pill features and objects from steps 108-120. Using information obtained from image or data file alone or together with reference data, step 122 calculates drift values. A drift value represents deviations from known or expected values for a given feature. One example of a drift value is the difference in size between a pill as analyzed and a reference size supplied by the pill manufacturer. Another example of a drift value is the amount of deviation between a pill's outer shape and the expected pill shape as indicated in vendor specifications contained in a reference file.

In step 124, one or more results are stored and/or reported to a user. Based on one or more drift values, for example, method 100 calculates and reports results. Results may include pill image data, drift values, pill identity, pill genuineness, composition, physical characteristics, and other information about the pill being analyzed as selected by a user. Step 124 may report the information in text format, image format, or both. The report may be in the form of a data file, printed report, screen display, audible signal or message, signal communication to a control device, or other perceptible format. Method 100 preferably stores information obtained from a pill image to database 101 for use, for example, as reference information at a later date. In this way, method 100 may be used to generate or contribute to a reference library of information for genuine and counterfeit pills in the U.S. and other countries.

Each step of method 100 preferably communicates data to and from a local or remote database 101 as needed to perform calculations, call information, compare data, and store data. Steps of method 100 are discussed in more detail below and with examples that follow.

Deconstructor Module

Figure 3:
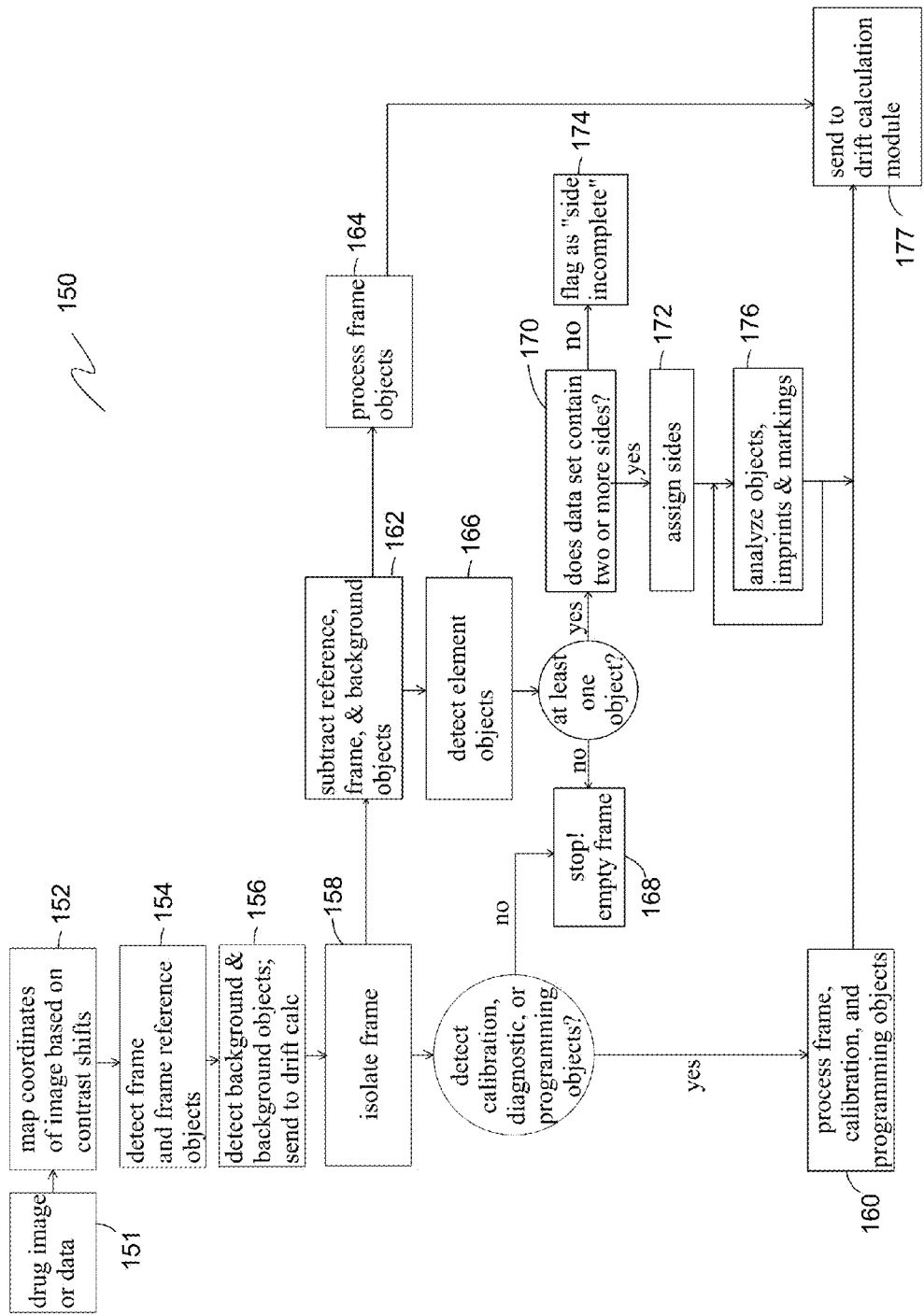
FIG. 3 illustrates a flow chart showing steps performed in one embodiment of a deconstructor module used in the method of FIG. 2.

Referring now to FIG. 3, a flow diagram illustrates an overview of steps performed in one embodiment of a deconstructor module 150, with detail of steps performed during a first iteration (also known as DIF#0). Deconstructor module 150 is used to detect and break down an image into basic components for further analysis. The first iteration of deconstructor module 150 shown in FIG. 3 is referred to as deconstructor iteration frame zero (DIF#0). Steps 152-174 of deconstructor module 150 are used in particular to perform step 106 of method 100, with additional analysis and mapping shown generally as steps 160, 176, and 164. Details of analysis and mapping steps are also discussed below.

In step 151, the image acquired in step 102 of method 100 is input to deconstructor module 150. In step 152, deconstructor module 150 maps the image, looking for contrast shifts. Detection of contrast shifts is discussed in more detail below with reference to contrast shift detection module 200 and FIG. 7. Method 100 can hold a virtual copy of pre-processed reference objects in memory or storage that can provide rapid comparison computations. Thus, so long as the original input image data has not changed, step 152 is not required to be performed when method 100 has acquired a pre-processed image or method 100 has sufficiently processed the image in step 104 to provide an image vector map.

In step 154, the image map and contrast shifts from step 152 are used to detect an image frame, frame reference objects, and element objects. Element objects include pill sides and features within the area of a pill side. In step 156, background and background objects are detected. Optionally, background and background objects are sent to drift calculation module 218. In step 158, the image frame is isolated from the data and analyzed for the presence of calibration objects, diagnostic objects, and programming objects. If any of these objects are detected, they are processed in step 160. If none of these objects are detected, then the image frame is determined to be an empty frame and analysis of the image frame ends at step 168.

In step 162, the image frame, frame reference objects, the image background, and background objects are ignored or subtracted from the data. These objects are processed or analyzed separately in step 164 if desired. In step 166, element objects (e.g., sides of a pill) are detected within the image frame. If no element objects are detected within the image frame, then the image is determined to be an empty frame and analysis of element objects ends at step 168.

If at least one element object is detected, then step 170 determines whether more than one whole element object is detected within the image frame. If more than one whole element object is detected (e.g., two pill sides), Then pill sides are assigned to the whole element objects. In one embodiment, if whole element objects have approximately the same shape and size, then pill sides are assigned to the detected whole element objects in step 172. The requirement of same size and shape includes the situation where one dimension is considered, such as a common length between a top view and a side view of a pill. If the data does set does not contain at least two sides, the data is flagged as "side incomplete" in step 174. In step 176, element objects are analyzed for imprints and markings. In step 177, results are sent to a drift calculation module 370 discussed below.

FIG. 3 shows three outcomes from the first iteration of deconstructor module 150. One path is for cases where the data contains markers indicating system calibration, re-programming, updates, debug mode operations, and the like. These frame, calibration, and programming objects are processed in step 160. A second path is to continue processing detected element objects in step 176 (e.g., pill sides) if the element object count is equal to or greater than one. A third path is to stop analysis in step 168 due to a failure to detect any markings or contrast shift regions or edges in the entire data set (i.e., no pills are present in the image).

In all three paths, "discarded" data set frames are made available to be added to any attached database or data repository. In addition to identifying and characterizing pills, the present invention is intended to be used for total data collection. To this end, even an empty frame is useful because it may indicate a device failure or a need to correct a device that communicates data sets to the present invention for processing. For example, the background or data set header/footer may require processing to determine whether the reference file or data is authentic or not. It is expected that counterfeiters may attempt to upload to internet sites counterfeit reference files or data of specific medications in order to fool the present invention. Thus, as a further safeguard to provide reliable counterfeit pill detection, method 100 preferably analyzes the entire image frame rather than analyzing only the drug object(s) detected within the image frame.

Figure 4:
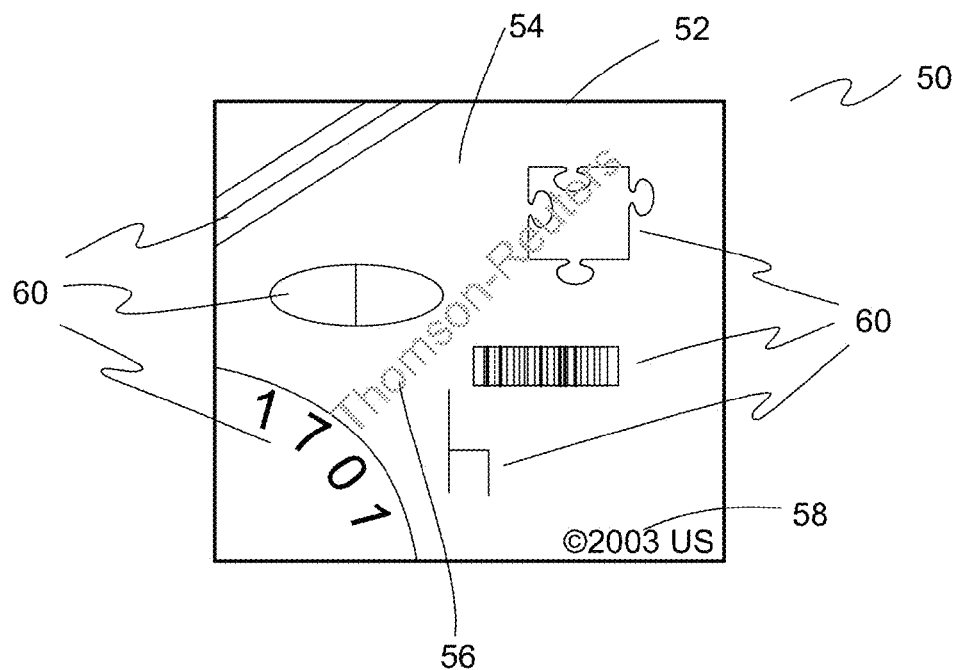
FIGS. 4-6 illustrate an example implementation of deconstructor module of FIG. 3.
Figure 5:
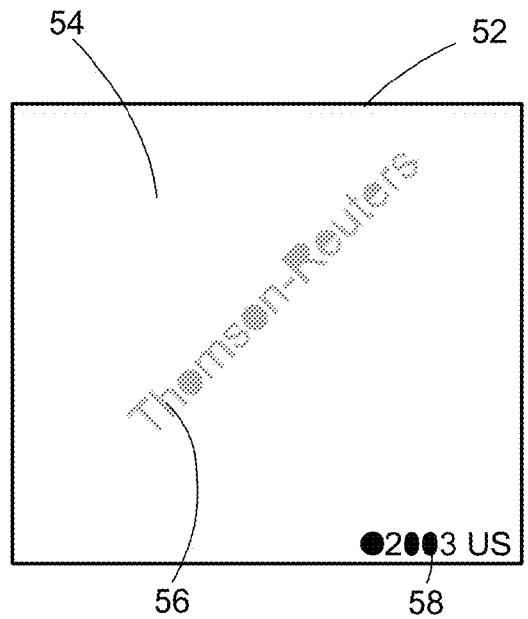
Figure 6:
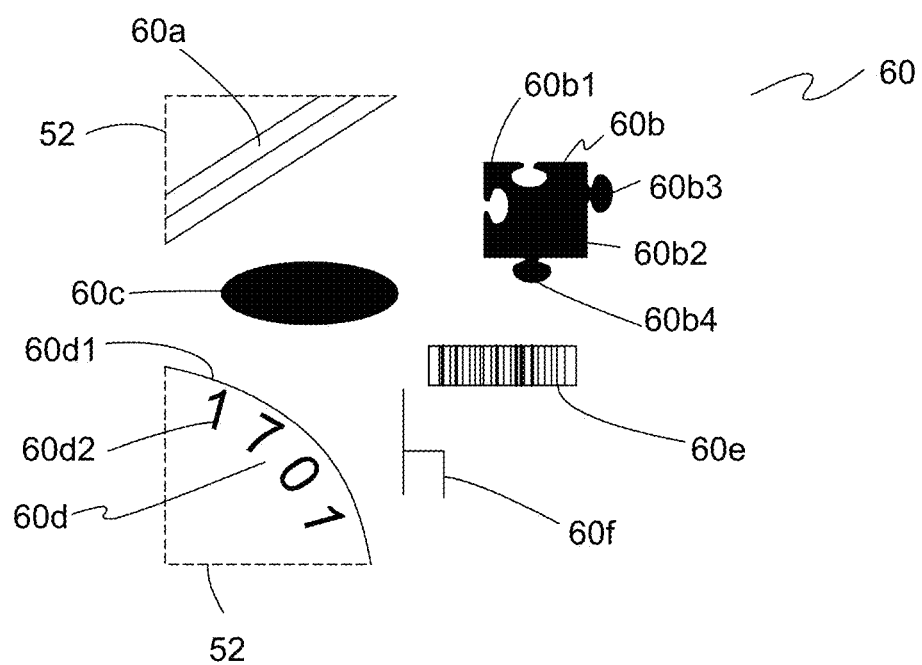

Example: DIF#0:

FIGS. 4, 5, and 6 illustrate an example implementation of a first iteration (DIF#0) of deconstructor module 150 as discussed above with reference to FIG. 3. FIG. 4 illustrates an image 50 having been completely mapped in step 152 of deconstructor module 150. After performing steps 154 and 156, image 50 has six element objects 60, frame 52, frame reference object 58, background 54, and background object 56. Element objects 60 were detected in step 166 after frame 52, frame reference objects 58, background 54, and background objects 56 are either ignored or subtracted in step 162. Image file or data 50 includes a frame 52, background 54, background objects 56, reference objects 58, and element object sets 60.

The present invention can perform characterization computations on up to 1,024 element objects. FIG. 4 includes a total of eight element objects including objects 60, frame 52, and reference object 58. The present invention can process of up to 1,024 individual pills in a single image or data set to facilitate high-capacity units. The ability to process up to 1,024 pills per frame allows the use of future processors where predefined geometries can be programmed directly into an assignable hardware register space in signal processing logic units such as in IBM's SyNAPSE processors.

As shown in FIG. 5, background 54 includes the area within image frame 52 that is substantially featureless, other than color or intensity, and has minimal or no contrast shift regions. Background object 56 is an example of objects added to an image file, such as a label indicating the author or owner of a file library or database. Background object 56, which reads Thomson-Reuters, and copyright label 58 are examples of background objects.

Figure 7:
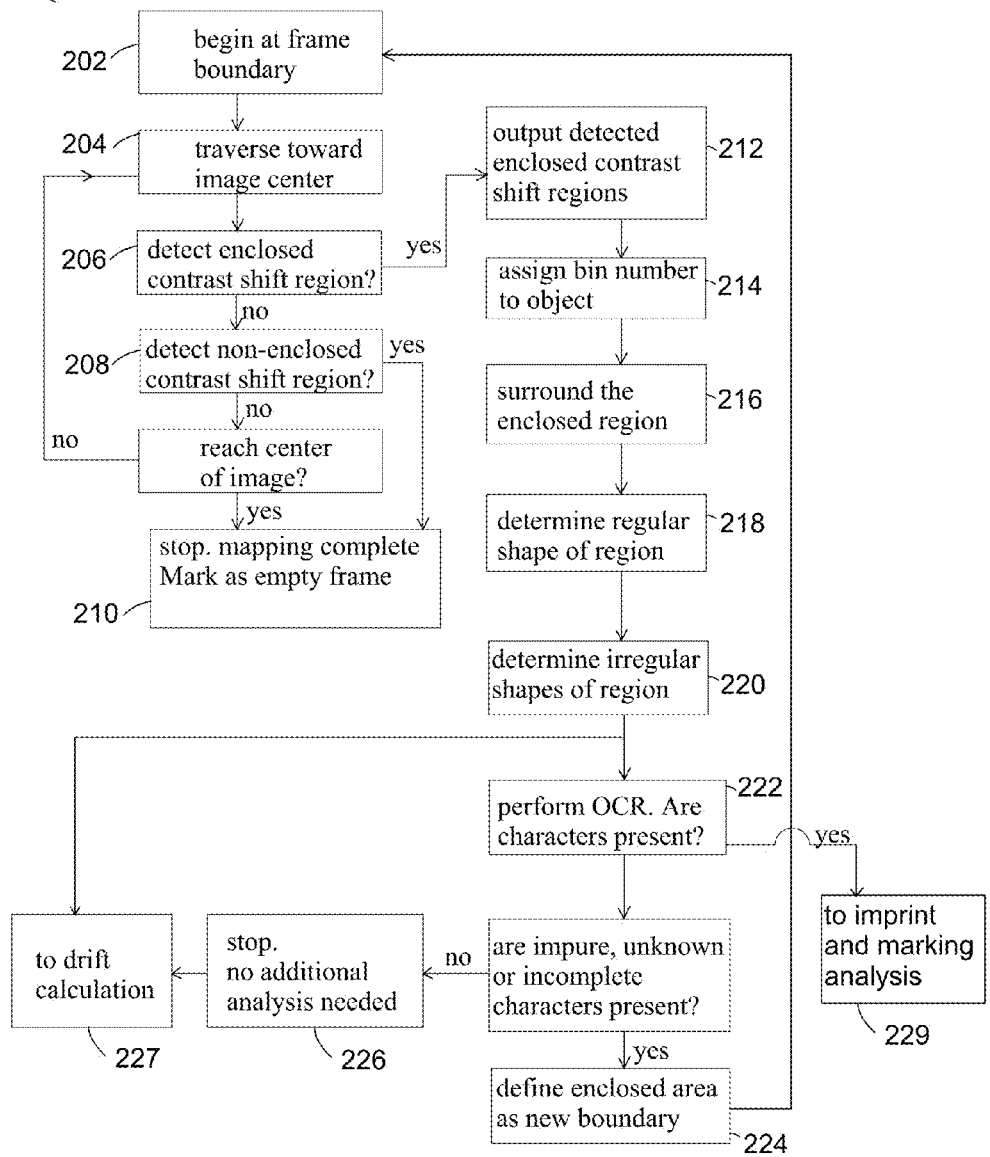
FIG. 7 illustrates a flow chart showing steps performed in one embodiment of a contrast shift detection module used in the method of FIG. 2
Figure 8:
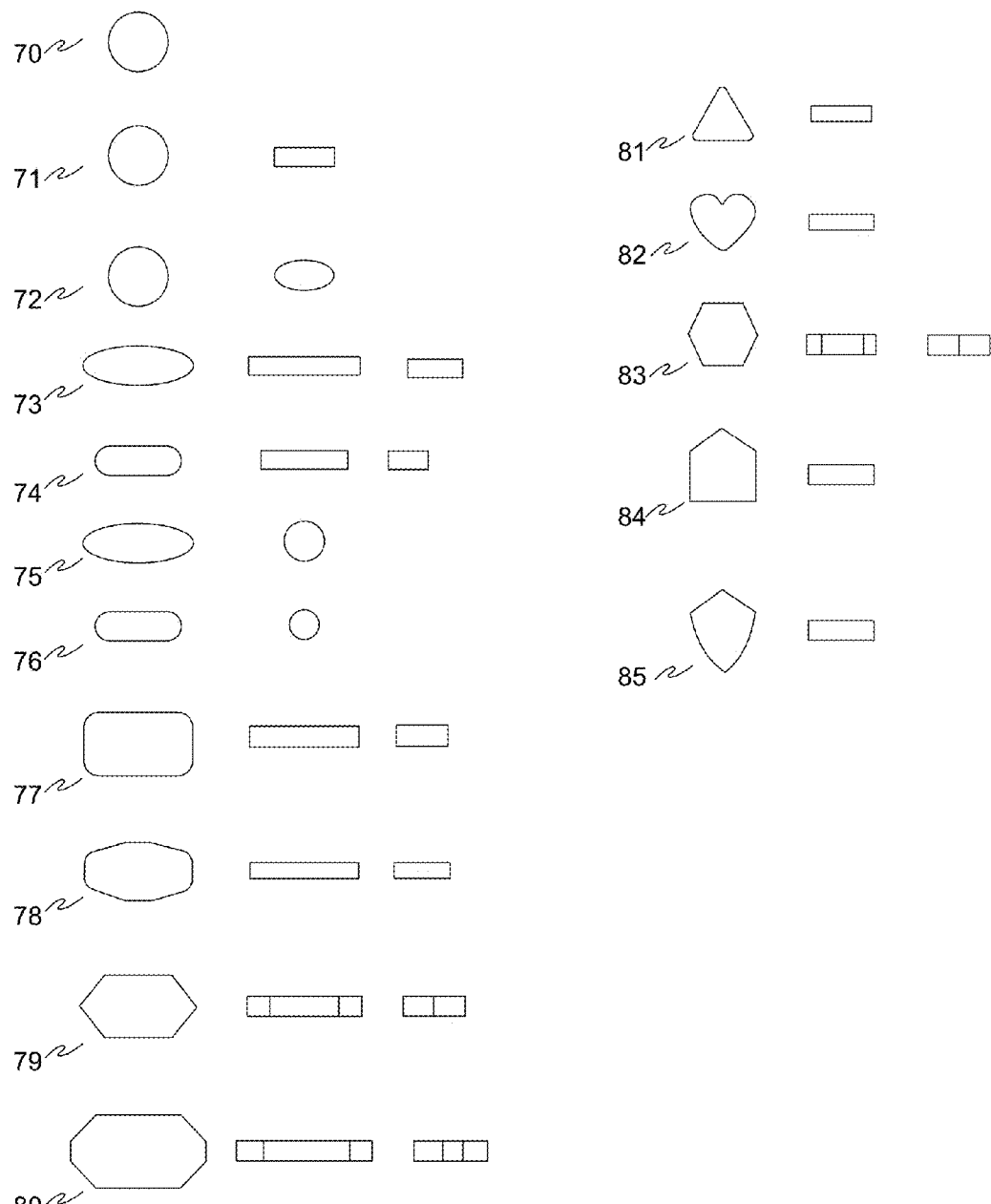
FIG. 8 illustrates examples of regular geometric pill shapes and shows a top view and end view(s) where appropriate.

As shown in FIG. 6, examples of element objects 60 include lines 60a, puzzle shape 60b, a pill 60c, quarter circle and numbers 60d, code 60e (e.g., bar codes, QR codes, etc.), and h-shape 60f. Symbols, color, and other pill features can also be element objects. Solid black-filled regions 60b, 60c shown in FIG. 6 represent detected enclosed contrast regions found during an iteration of deconstructor module 150. A method of Contrast Shift Detection Module FIG. 7 illustrates a flowchart showing steps performed in one embodiment of a contrast shift detection module 200. Contrast shift detection module 200 is used to find and analyze objects based on contrast shifts such as in steps 154, 166, 176 of deconstructor module.

In step 202, contrast shift detection module 200 preferably begins at the outer boundary of the image frame. In step 204, module 200 traverses inwards towards the geometric center of the image. Step 204 may be performed by using a triangle or other polygon to traverse the image in an inward or outward direction. In step 206, enclosed contrast shift regions are detected, such as the contour of a pill's beveled edge. In step 208, non-enclosed contrast shift regions are detected, such as a line segment. Steps 206 and 208 may be performed successively or concurrently. If no contrast shift regions are detected, module 200 continues moving inward toward the center of the image. In step 210, module 200 stops if module 200 either reaches the center of the image or if module 200 detects any non-enclosed contrast shift region. If no objects are detected within a frame, the frame is marked as an empty frame.

In one embodiment of the present invention, a contrast shift is indicated by a change in color, intensity, chemical constituency, or physical geometry by a unit of one channel. The change is identified by comparing the value of a pixel or location of interest to an adjacent image location (e.g., an adjacent pixel), to a region surrounding or proximate the pixel or location of interest, to the same pixel or location over time, or to sensor elements surrounding the pixel or element being examined.

For example, a change in color is represented by the change in just one value of an RGB color space table. The RGB hex code for red is FF,00,00 where FF represents the maximum value of 255 for the red channel, the middle pair of zeros represents the minimum or zero value for the green channel, and the last pair of zeros represents the minimum or zero value for the blue channel. A change from a value of FF,00,00 to FF,00,01 represents a minimum differentiation in pixel color. Whatever color space or color system is applied (e.g., RGB, CMYK, Pantone, grayscale, etc.) any change in the register value corresponding to a color or intensity is a color shift. When groups of pixels are processed by blob analysis or edge detection methods known in the art, the average value is determined for a region of pixel values. A dominant color or is extracted and saved or made available in a pixel-by-pixel or coordinate-by-coordinate table of the color register or intensity values. In one embodiment, the present invention uses the Recognized Color Keyword Names in the Scalable Vector Graphics (SVG) 1.1 Specification recommended by the World Wide Web Consortium (W3C) on Jan. 14, 2003 (incorporated herein by reference).

A change in chemical constituency is represented in one embodiment by a change in pattern features contained in raw sensor data, such as the Raman Spectroscopy Infrared Chemical Pattern Algorithm and Tables known in the art.

In one embodiment, method 100 is added to an existing Raman Spectroscopy system and accepts the processed pattern data from the Raman portion of the device. Method 100 could then map pattern data to a voxel (3D pixel) location of either the camera-imaged or Raman-imaged view of a pill. In another embodiment, Raman analysis is added to method 100 as a simple pass/fail chemical test module with a particular focus on processing coated pills. Current Raman Spectroscopy pattern algorithm complexity and completeness limitations apply to providing a 3D map of a pill's chemical constituency. Raman or other baseline chemical analysis detection methods are used to locate a chemical contrast shift by detecting a change in electronic state, isotopic state, or phase state.

A change in physical geometry is represented in one embodiment by a change in surface elevation. A surface elevation change can be due, for example, to a raised pill coating, material removed by a drill, or material pushed aside by a press-stamp. Any immediate or subsequent deformation of the original mass of material is to be an intentional change in physical geometry. Pill damage and splitting events are considered an unintentional change in physical geometry.

In one embodiment, contrast shift detection module 200 detects a change in physical geometry by analyzing data provided by an active distance or range finder sensor. In one embodiment, a contrast shift is reported for physical geometry when the amount of change in physical geometry (e.g., for an embossed marking) is at least three times the sensor's minimum spatial resolution value and when the final spatial location has at least one spatial coordinate value that is three times the minimum spatial resolution value distance from the initial spatial measurement location position. In one embodiment, range finding sensors are assumed to operate at minimum spatial resolution values starting at about 0.1 mm. In one embodiment, range sensors with a minimum spatial resolution above 0.1 mm are not considered to provide valid geometry data because they cannot process pills having the smallest FDA drug size of 2 mm.

In another embodiment, contrast shift detection module 200 is performed by scanning an image or a portion of the image line-by-line. Such a technique currently provides inferior performance for pills displaying artistic symbols and glyphs constructed of shapes and curves, but line-by-line scanning may be adapted for use, for example, with line-scan cameras configured to obtain images of pills positioned in one or more rows along a conveyor.

For any enclosed contrast shift region(s) detected in step 206, method 100 reports and/or outputs these regions in step 212. Step 212 optionally assigns a bin number to the each region(s) in step 214. Bin number in one embodiment indicates an object type, such as a letter, number, symbol, score, shape, code, or other object that identifies the detected object or region. In step 216, known methods are used to surround enclosed contrast shift regions. In subsequent iterations of contrast shift detection module 200, step 212 reports yet-unmapped enclosed regions that are detected within already-detected enclosed characters or markings.

Contrast shift detection module 200 will further process or analyze the enclosed contrast shift regions that were detected in step 206 to discern their contents, but prior to doing so, shape detection and determination steps 218, 220, and 222 are performed. As shown in FIG. 4 the "o", "R", "e", "©", "0"s in 1701 and 2003, puzzle-piece shape 60*b*, and ovoid object 60*c* are examples of objects having enclosed contrast shift regions that can be detected and mapped with further iterations of module 200.

On the first iteration of contrast shift detection module 200, regular geometric shapes are preferably detected first in step 218, followed by irregular geometry detection in step 220, and character recognition in step 222 (e.g., optical character recognition and verification or OCR/OCV).

As a result of shape detection and determination steps 218, 220, and 222, any detected regular and irregular geometric shapes are output for use in drift calculations as in step 122 of method 100. Detected characters are sent to a bin handler to analyze each detected character. From detected characters, if at least one impure, incomplete, or unknown character or shape is present, module 200 defines the enclosed area as a new boundary in step 224. If no impure, incomplete or unknown characters or shapes are present, module 200 ends at step 226 at which point no additional iterations of module 200 are needed for the detected object(s). Detected characters are also output to drift calculation module 370 in step 227 for drift calculations, which is discussed in more detail below. Detected characters are additionally output to imprint and marking analysis module 330 in step 229.

Based on the new boundary defined in step 224, contrast shift detection module 200 initiates another iteration of module 200 to analyze the contents of any detected enclosed contrast shift regions, beginning with step 202. In the second and subsequent iterations of module 200, the shape detection and determination step sequence is preferably reversed: characters are detected first in step 222, followed by regular geometric shapes in step 220, and irregular shape detection in step 218.

Shape Detection

The present invention defines a shape as either a regular geometric shape (e.g., circle, rectangle, triangle, ovoid, etc.) or an irregular geometric shape (e.g., dog, horse, car, etc.). Shape determination and matching is performed using known methods in the art to identify a shape. Example methods of regular and irregular geometric shape detection are disclosed in U.S. Pat. Nos. 6,952,206 and 6,026,189. Examples of regular geometric pill shapes recognized by the FDA SPL shape tables are shown in top and side view(s) of FIG. 8. Geometric pill shapes include round pill shapes, such as spherical 70, cylindrical 71, and ellipsoidal 72; elongated pill shapes, such as an elongated capsule 73, an oval-cylindrical shape 74, a racetrack cylindrical shape 75, an elongated ellipsoid shape 76, an elongated rectangular shape 77, a super elliptical cylindrical shape 78, a hexagonal cylindrical shape 79, and an octagonal cylindrical shape 80; and other regular shapes, such as a triangular cylindrical shape 81, a cardioid or heart cylindrical shape 82, a hexagonal cylindrical shape 83, a home plate shape 84, and a shield cylindrical shape 85. The present invention follows Euclidean geometry rules for geometric shapes and determines an object shape using known methods in the art. The present invention also defines some characters as regular geometric shapes (such as "0" or "X") or as irregular geometric shapes (such as "&" or "Q").

Referring again to FIG. 6, ovoid region 60*c* is determined to be a regular geometric ellipsoid shape. Puzzle-piece 60*b* is determined to be an irregular geometric shape and is then further classified as an invalid drug object shape because none of its outer edge parts can be used to successfully construct a recognized geometric shape used by pills. In the case of puzzle piece 60*b*, the upper left corner section 60*b*1 being connected to the main body 60*b*2 of puzzle piece 60*b* is an invalid structure type because it represents an excessive mass of pill material connected by a structure of insufficient size. For the same reason, the right-side protrusion 60*b*3 and bottom protrusion 60*b*4 of puzzle piece 60*b* are also invalid drug structures. Even though puzzle piece 60*b* is an invalid pill shape, the present invention attempts to process irregular geometric shapes such as puzzle-piece 60*b* since the invention characterizes pre-split and/or damaged drug objects. The present invention assumes that portions of valid, but damaged or pre-split drug objects, such as quarter circle portion 60*d*1, are part of the outer edge of a dominant FDA SPL shape that either has portions missing or that is a distorted variation of a known SPL shape.

The final object 60 of FIG. 6 is chair or h-shaped object 60*f*. Objects such as object 60*f* have multiple values associated with them. In this case, h-shaped object 60*f* is a chair symbol, a letter h, or a number 4 flipped upside down. The present invention characterizes the object as all of those items until a reference data set is available to determine the correct characterization. Current U.S. FDA SPL shape regulations do not allow medicines to have an outer shape or outline of letters or numbers. Nonetheless, the present invention meets and exceeds FDA specifications and will fully characterize such shapes. Method 100 usually performs many iterations of contrast shift detection module 200, but the first iteration is unique in that it isolates the data set boundary or frame 52 from the general background 54, from reference markings 56, and from contrast shift regions, such as element objects 60*a*-60*f*. Iterations of deconstructor module 150 subsequent to the initial DIF#0 iteration are performed to detect contrast shifts that are located within valid enclosed regions detected during DIF#0.

Special Handling

Figure 9:
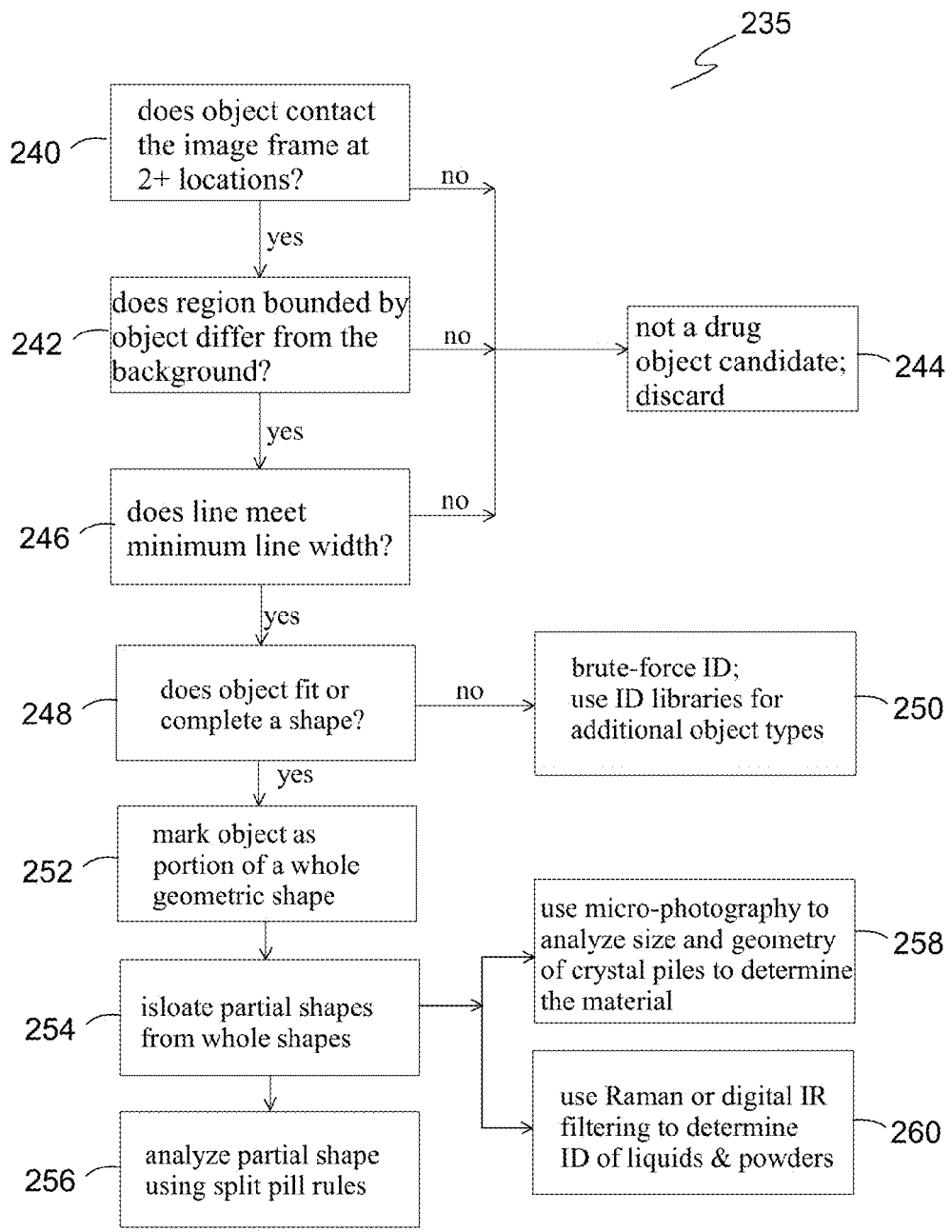
FIG. 9 illustrates a flow chart showing steps performed in one embodiment of a special handling module used in the method of FIG. 2.

As noted above, one of the three outcomes from the first iteration of deconstructor module 150 is a path for cases in which the drug image or data contains markers that indicate system calibration, re-programming, updates, debug mode operations, and the like. These objects are processed in step 160 of deconstructor module 150. FIG. 9 illustrates a flow chart of one embodiment of processing steps of special handling module 235 used to perform step 160 of deconstructor module 150 shown in FIG. 3. In step 240, it is determined whether an object shares pixels in common with (i.e., intersects) an image frame boundary at two or more locations. Because the coordinates of contrast shifts had previously been mapped in step 152, step 240 is performed, for example, by comparing the coordinates of the object with the coordinates of frame boundary. If the object contacts frame boundary at only one location, or does not at all contact frame boundary, the object is discarded as not being a drug object candidate. If the object contacts frame boundary at two or more locations, processing continues with special handling.

In step 242, it is determined whether the region bounded by the object (e.g., line or curved segment) differs from the background color and/or texture range as determined in step 156 of deconstructor module 150. If the color of the bounded region does not differ, then the object is discarded in step 244 as not being a drug object candidate. Otherwise, processing continues. Whether an object differs from the background color and or texture may be determined by comparing color channel values, intensities, or other criteria for individual pixels or a group of pixels. For example, for an image in RGB color format, step 156 may compare the color name with a reference color name. Alternately, step 156 may compare a pixel's six-number hexadecimal color code with a reference number for a background color. A method of color channel detection is disclosed in U.S. Pat. No. 4,812,904.

In step 246, it is optionally determined whether the object satisfies a minimum line width. In one embodiment, the minimum line width is 2 mm, a value established by the FDA for registered drugs. If the object does not meet or exceed the minimum line width value, the object is discarded in step 244 as not being a drug object candidate; otherwise, processing continues.

Whether an object is discarded in step 244 is the result of a yes/no or true/false answer to an inquiry. In one embodiment, each of the criteria used in steps 240, 242, and 246 may have one or more fixed or adjustable tolerance values that are included in the image data set of the acquired image. In another embodiment, precision and tolerance limits are set by the user. Method 100 utilizes standard math rounding rules for both integer and floating point math functions. The general rule for software bit depth, precision, and tolerance is to follow that which is available on the specific hardware host platform(s).

In one embodiment, precision values are related to the data set size and color depth. Data set precision and tolerance values on the low end are bounded by a minimum of 75 sensor data mapping units (e.g., pixels) in at least two spatial, thermal, compositional and/or temporal directions. At the upper end, precision and tolerance values are bounded by sensor data mapping units and have as many as 31,623 mapping units in each direction for a total of one gigapixels or $1 \times 10^9$ grid units.

Color precision on the lower end requires 8 bits wide of data representing 256 separate colors for the entire visible spectrum. At the upper end, a color range is capped at 64 bits wide. Color data widths of non-visible range sensors must also have a minimum range that covers the full range-type for a given sensor (infrared, ultraviolet, etc.). Method tolerances reject color data widths that are below the data width of the sensor that obtained or recorded the information.

In one embodiment, method 100 can successfully characterize a pill using black and white image data produced by a sensor that captures full color range data. The pill is rejected, however, because color data is a factor in counterfeit detection and missing color data can lead to false confirmations of drug objects. Other embodiments of method 100 opt out of this rejection logic and instead analyze out-of-tolerance data. This approach assumes that the user exercises appropriate control over the device operational environment and/or the characteristics of input sensor data sets.

In one embodiment, precision is based on the per-unit of sensor data precision. In other words, precision is limited only by the hardware (and stored data set resolution) used to perform the present invention. A color, hue, contrast, brightness, or other property value change from one image pixel to the next represents a single, minimum precision step of contrast shift. From there, single-unit precision allows only one of three follow-up events to take place if A→B pixel shift shows contrast change while on the way to examining value of pixel C:

(a) C pixel value matches A, but does not match B; C pixel value "returns" to an initial value.

(b) C pixel value matches B, but does not match A; C pixel value is treated as being the same as B.

(c) C pixel value does not match either A or B; C pixel value has a "new" value

For example, an object's line width may be found to meet the minimum line width value of 2.0 mm if it is within five percent of the minimum line width value (1.9 mm or greater in this example). A zero tolerance value would instead require the object's line width to be 2.0 mm or greater without exception. Also, each of the criteria used in steps 240, 242, and 246 may also have a fixed or adjustable value for precision (i.e., the number of significant digits). Continuing with the minimum line width example, consider a line width calculated to be 1.87 mm. Using a precision value of two significant digits would round the value up to 1.9 mm and result in further processing based on meeting the minimum line width value of 2.0 mm with a five percent tolerance and precision of two significant digits. In comparison, using a precision value of three significant digits would result discarding the object for failing to meet the minimum line width value of 2.00 mm and five percent tolerance because 1.87 is outside the five percent tolerance bracket and rounding applied to the last digit would not change the result. In some embodiments, each calculation may also be subject to rounding rules that are fixed or adjustable by the user or by method 100 based on properties of an image or data file determined in image pre-processing step 104. Values for precision and tolerance in some embodiments are set by method 100 based on the size, resolution, quality, or other measure(s) of an image or data file. In other embodiments, values for precision, tolerance, and rounding rules are set, and or adjusted by the user. Precision, tolerance, and rounding rules are not limited to steps 240, 242, and 246, but optionally apply to any decision or calculation performed by method 100.

In other embodiments of method 100, the user may identify or mark selected steps for an alternate analysis when one or more determinations or decisions is marked as a "close call." This alternate analysis is useful when a close call is determinative of a reported result. In the example above, the line width of 1.87 mm may be marked as a close call based on a second tolerance value associated with the deviation from the tolerance bracket. The second tolerance value is similarly fixed or adjustable by method 100 or by the user. Applying one or more second tolerance values that trigger identifying a decision as a close call, method 100 may ask the user if analysis should be conducted using one or more alternate decision results. Alternately, method 100 may automatically perform alternate processing for all close call decisions and output the secondary results along with the primary result (the result(s) obtained without alternate analysis). Such reporting may be useful to confirm a given result or to call into question a given result. For example, a pill may be identified as counterfeit by method 100 in the primary result, but alternate analysis shows that the pill is legitimate with alternate processing for one or more close call determinations.

Provided that the object is not discarded after performing any or all of steps 240, 242, and 246, the object is processed as a drug object that requires special handling. In step 248, the visible or detected portion of the object is submitted to a geometric fit or shape completion module to determine whether the object fits or completes any supported regular or irregular supported geometric shape. If shape completion and geometric fit methods are successful, the partial drug object will be characterized as if it were a whole or complete drug object, but no assumptions other than the shape will be made about the unknown portions of the drug object. Full characterization will take place only on the visible portion of the object(s). If so, the object is marked in step 252 as a portion of a whole geometric shape.

If shape completion is not successful, the pill may be analyzed using brute-force identification techniques described below in step 250. Additional libraries optionally are accessed to check additional shapes. When performing a shape check or matching operation on either whole objects located on an image background or markings located on an object where the object surface around the marking is considered the background, if the shape being examined does not match any shape in a database or library available to method 100, then a "brute force" shape identification method applies. Brute force shape identification operates on three assumptions: (1) the object and/or marking includes at least a single outer edge or marking path that partially matches a shape contained in the method's database(s); (2) the object and/or marking does not include any edges or marking paths that completely match any shape contained in the method's database(s); and (3) if multiple objects are in the field of view, then one or more individual objects may have an edge, feature, or pattern that matches a parent object shape. For example, a bevel edge matches the shape of the pill outline.

The present invention in one embodiment uses multiple pill images or data sets for attempts to find matching edge combinations and for suggesting pill fragments that belong to a whole, but where the fragments are contained in several image files.

The three assumptions rely on the meaning of "shape pattern" including edge geometries that range from a simple line segment or simple curve to up to shapes containing 64 sides. Inner marking geometries are allowed up to 1,024 "elements" to construct a shape. The much higher range number requires lines and curves to be able to intersect or otherwise form complex and/or artistic symbolic designs contained within the drug object outer edge boundary(ies). Sensor spatial data precision is also tied to the hardware used for capture, computation, and display. Typically, display output is the primary form of precision reduction because high-end camera systems often capture from two to ten times the amount of visual/sensory data than can be displayed on human-viewed display surfaces and this differential has remained fairly constant for several decades. The present invention limits spatial computations involving the conversion of pixel density, the number of pixels occupied by or containing a specified object, and the optical parameters involved in the sensor data recording event to two significant digits (e.g., focal length). In one embodiment of method 100, if an object in an image set has its pixel mapping obtained as well as the camera image capture session information, then method 100 reports the final computed size in millimeters with an error of +/−0.01 millimeters.

Brute force shape identification uses edge detection methods to detect an object on a background. All non-background objects are analyzed for uniform versus non-uniform edges. Known edge detection methods have well established math-based rules for determining if an edge is uniform or non-uniform. Generally, a uniform edge exhibits linear relationships between sequential frame mapping points. For example, straight edges that continue to compute as straight would be immediately labeled as a straight line edge segment while curved edge that continued to compute as matching the existing curve or smoothly transitioned into a different curve would be labeled as a curved segment.

A vertex is the location where either a line or a curve exhibits a change in established path parameters. Regions located between each vertex or edge segment are grouped until the entire object frame edge is mapped. Straight segments and curved segments are each counted as a group. The longest and shortest edge segments are identified, regardless of type, as the reference edge and secondary edge, respectively. If the reference and/or secondary edge are the curved type, an axis of symmetry is determined in order to assist in determining the overall outer shape. A very uniform, semi-circular curve with uniform symmetry has a very high probability of being a fragment of a round drug object. Similarly, a very uniform parabola with uniform symmetry has a very high probability of being a fragment of an ovoid shape.

Known saw tooth wave detection functions are applied to edges whose distance between vertex locations is less than half the distance of the reference edge. If the detected edge segment lengths match saw tooth behavior characteristics when compared to the length of the reference edge, then those edges are identified as being "broken." If two or more saw tooth peak-to-peak value ranges are detected, then the lower saw tooth peak range is assigned as belonging to a break along a valid score mark if the path of that saw tooth range data coincides with a location on the edge of the object that is consistent with current FDA and industry score mark rules and practice. The upper peak-to-peak range, which should be approximately two to ten times larger than the lower peak range value, is considered to belong to an edge resulting from damage or other improper pill spitting event. In other words, if both a "softer" edge and a "more rough" jagged edge are present, brute force method selects the "softer" detected jagged edge. It then fits a simple line to the edge path so that the line meets the edge of the object. The method verifies whether the location is consistent with valid FDA and industry score mark starting locations. If only a single saw tooth edge is present that has a consistent peak range and that does not double or more in value suddenly, then the edge is considered to be "broken edge" type until the paths are checked for a match with known score mark edge starting locations. If the edge path matches a score mark starting location, then the edge path is considered a "split edge" type and counts as a drug object score mark.

Broken edges and split edges are flagged for known jig-saw puzzle matching methods to determine the probability that the objects are pieces of a whole object. The final portion of the brute force method, which applies to the detection of surface markings, is performed by the marking and imprint analysis module 330, which handles misprinted characters and truncated characters.

In step 254, the object marked as a portion in step 252 is isolated from whole objects. In step 256, shape completion is performed using methods known in the art. Optionally, in step 258, micro-photography is used to analyze the size and geometry of crystal piles to determine the material of the pill. In step 260, Raman spectroscopy and/or digital infrared filtering is optionally applied to determine the identity of liquids or powders. After performing shape completion in step 256, the object is processed with the split pill module described below. An example of digital infrared filtering is described in U.S. Pat. No. 6,864,552.

Example: Special Handling Module

Figure 10:
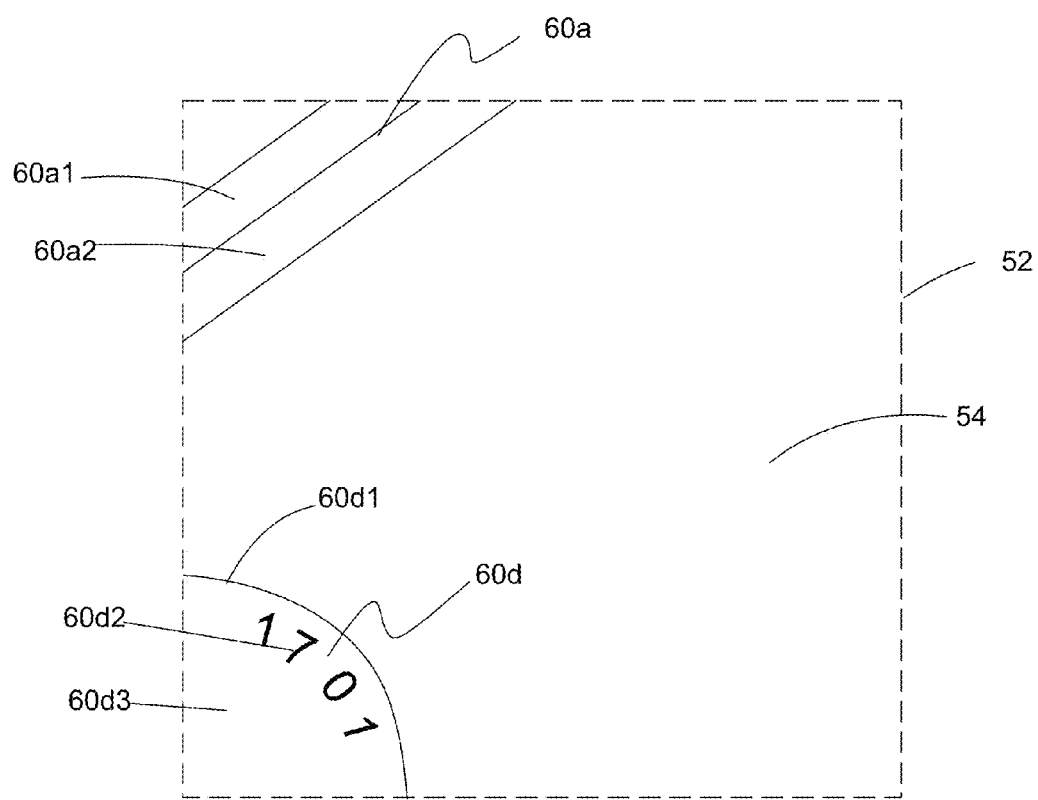
FIG. 10 illustrates an example implementation of the special handling module of FIG. 9.

Referring now to FIG. 10, an example implementation of special handling module 235 is discussed. FIG. 10 illustrates objects 60*a*, 60*d* that were detected during the first implementation of deconstructor module 150 (see FIG. 6). Special handling will be required for object 60*a* (three parallel lines) and object 60*d* (quarter circle 60*d*3 with label "1701" 60*d*1) because these objects share a position with the data set frame 52 as determined in step 240 of special handling module 235. Regions 60*a*1, 60*a*2 between the three parallel lines of object 60*a* and frame boundary 52' will be analyzed in step 242 to determine whether regions 60*a*1, 60*a*2 differ from the color and/or texture of background 54. In this example, regions 60*a*1, 60*a*2 do not differ from background 54. Object 60*a* is therefore discarded as not being a drug object candidate and requiring no further analysis. On the other hand, the label "1701" 60*d*1 within the region 60*d*2 does not match the color (not shown) of background 54. Thus, object 60*d* is not discarded and processing continues.

Applying step 246, the line width (not shown to scale) of quarter circle 60*d*3 is determined to be greater than the specified 2.0 mm minimum value, so object 60*d* is further processed as a drug object. The quarter-circle line 60*d*3 of object 60*d* will be isolated in step 254 as a partial-shape and analyzed in step 256 using split pill analysis for whole shape match or completion using prior art shape completion methods. The present invention in one embodiment uses discarded objects and markings for device calibration, testing, programming, and/or special device purposes.

It is possible for a single drug object to produce two partial drug objects. For example, pills having a shape described as a figure eight, peanut, or kidney can produce two curved drug object portions if only a portion of the pill is viewed. The present invention takes into account such possibilities. The present invention may use additional drug ID libraries to support object geometries later added by the U.S. FDA to the master SPL Shape tables, to support non-U.S. drugs, and to support drugs, supplements, and natural medicines that are not registered with the U.S. FDA.

Split Pill Analysis

Split pill module 256 is used in one embodiment of method 100 for analyzing a partial shape using split pill rules as discussed above in special handling module 160. Split pill module 256 differentiates partial drug objects that follow split pill rules from those that do not. For the purposes of this application, an object follows split pill rules if an object marked as "partial" fits a shape created or destroyed when a pill is broken along a score mark. For example, a round pill having a single score mark across its diameter has a circular shape for the whole object and semi-circular shapes for the pill halves when split along the score mark. A drug object that fits in whole or in part to either a circle or a semicircle would follow split pill rules. Some of the shapes that would follow split pill rules for this example include a closed semicircle, an arc, a circle, and an arc connected at one end to a line that extends along the diameter of the arc.

If a drug object follows split pill rules, the present invention treats the overall drug object shape and score mark(s) as having a known size and/or geometry. The present invention, however, treats other characteristics of the nonvisible portion of the object as unknown. These other characteristics can be color, texture, text, codes, or other pill features. The present invention will select score marks and outer edge shapes for the unseen portion of a pill, but the present invention preferably will not select characters, color(s), or texture(s) to occupy any unseen portions of the object. Because score marks on some pills traverse the pill's surface completely and others do not, the true length of a score mark remains unknown for score marks that are expected to exist on the non-visible portion of the pill.

Figure 11A:
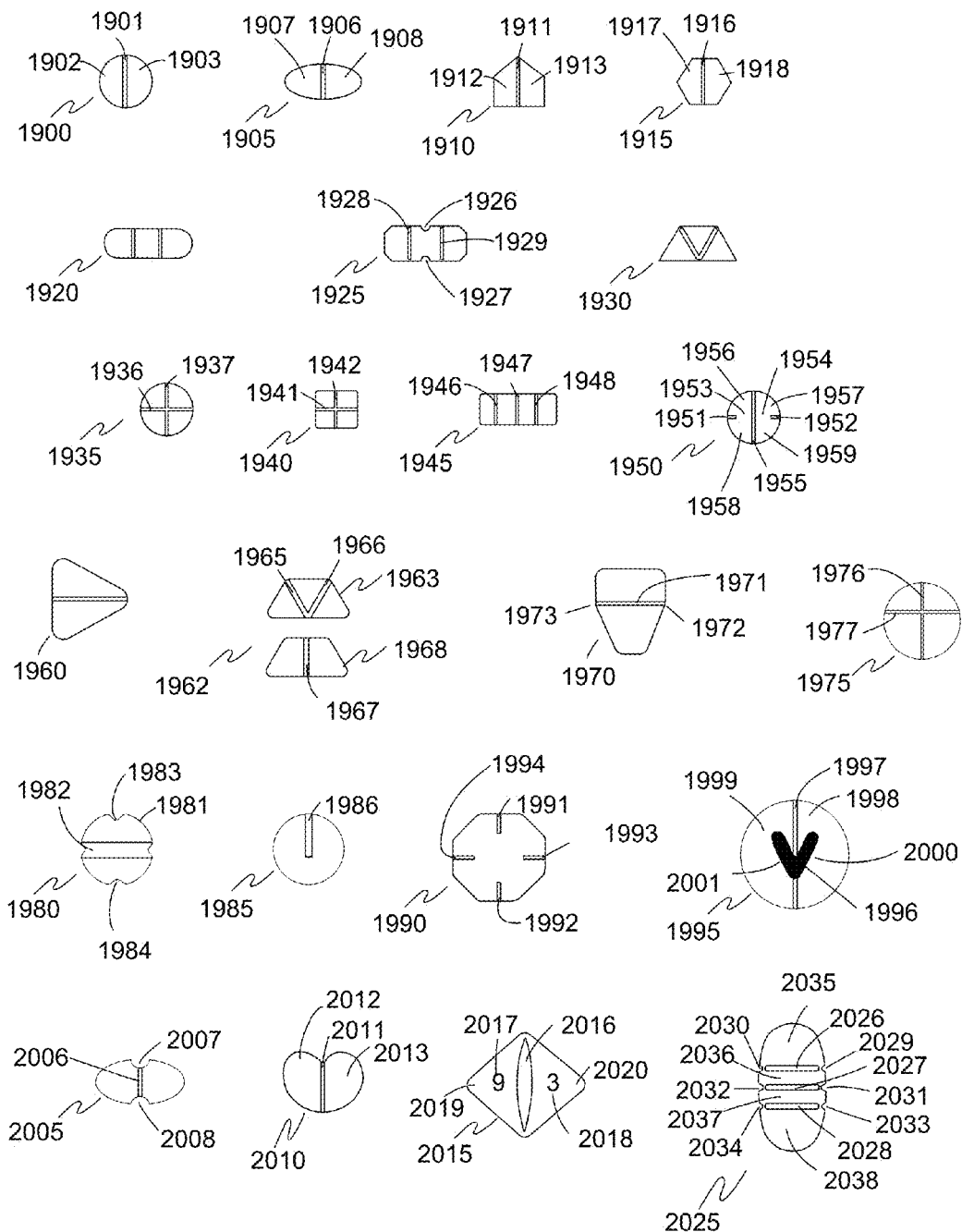
FIG. 11a illustrates examples of pills having score marks and split pill geometries.

Referring now to FIG. 11*a*, examples of pills having score marks are shown to illustrate split pill geometries. Pills 1900-1950 illustrate the parent and child shape relationships between FDA-approved oral medication geometries. Pills that are not scored for pill splitting are not shown but are represented by the shapes shown in pills 1900-1950. Pills 1900, 1905 have single score mark geometries that, upon separation along a primary score mark line 1901, 1906, respectively, a round pill 1900 would yield two half-circle geometries 1902, 1903. Similarly, pill 1905 is an ovoid tablet that would yield two parabolic shapes 1907, 1908 when split along a score line 1906; pill 1910 would yield half shapes 1912, 1913 when split along score mark 1911; and pill 1915 would yield half shapes 1917, 1918 when split along score mark 1916. Method 100 takes into consideration that a split ovoid pill 1905 may form incomplete parabolic regions that are not complete and deviate significantly from the axis of symmetry along score mark 1906.

Pills 1920, 1925, 1930 illustrate additional parent object geometries and score mark types include pill 1925 that utilizes a "pinch"-type score mark created by indents 1926, 1927 as well as standard etch-line score marks 1928, 1929. Pills 1935, 1940 show overlapping score marks 1936, 1936 and 1941, 1942, respectively. Pill 1945 shows maximum dimension score marks 1946, 1947, 1948 that extend completely across pill 1945. Pill 1950 shows geometry resulting from a horizontal "implicit" score mark implied as extending through partial marks 1951, 1952. Pill 1950 can exist as a left half circles 1953, 1954 when split along score mark 1955 or four quarter circle "pie" pieces 1955, 1956, 1957, 1958. Note that splitting round pill 1950 along partial marks 1951, 1952 would produce a more rough edge, while splitting pill 1950 along explicit score mark 1955 would produce a softer edge.

Additional industry score mark geometries for FDA-approved medications include a triangular pill 1960, an isosceles trapezoid pill 1962 with two score marks 1965, 1966 on side A 1963 and one bisecting score mark 1967 on side B 1968. Pill 1962 shows an FDA-approved geometry for providing 150 mg, 100 mg (2×50 mg), 75 mg (half of whole pill) and 50 mg doses in a single tablet configuration. Pill 1970 has five sides but uses a score mark 1971 that cuts between different vertices 1972, 1973 than the geometries produced by score mark 1911 of pill 1910.

Method 100 computes the areas bounded by detected score marks and verifies whether the geometry and ratio of areas matches reference information. These computations are performed even for pills such as pill 1975 having score marks that would result in uneven split geometries. Pill 1975 has an overall round shape with a laterally-centered vertical score mark 1976, but having an offset horizontal score mark 1977.

Pill 1980 follows the "clover" geometry for its outer shape 1981 and displays a single horizontal score mark 1982. The geometry of pill 1980 has a single explicit score mark 1982, but also exhibits an implicit score mark extending between notches 1983, 1984. Pill 1985 has an explicit score mark 1986 that traverses slightly more than half of the total distance across the pill surface as per FDA regulations. Pill 1985 has a partial score mark 1986 that would also yield a soft and a more-rough sawtooth-type edge when pill 1985 is split along score mark 1986. The more-rough sawtooth-type edge is a result of the break occurring through a thicker portion of pill 1985 and due to the lack of a score mark that fails to provide a line to "guide" the split. Method 100 detects partial score marks of the type shown on pill 1985.

Pill 1990 illustrates an example of a drug that employs two implicit marks on a single side. A first implicit score mark extends between marks 1991, 1992; a second implicit score mark extends between marks 1993, 1994. One embodiment of method 100 supports up to five combination "soft" and "rough" edge paths per side. These combination edge paths result from implicit score marks. Pill 1995 has a "V" cut out 1996 and score mark 1997. Split pill geometries resulting from pill 1995 include unique half-circles 1998, 1999 with diagonal cut paths along the angled sides 2000, 2001 of the V cutout 1996.

Pill 2005 has both a standard score etch mark 2006, plus a "pinched" score mark recesses 2007, 2008 where score mark 2006 edge contacts recesses 2007, 2008. Pinched score mark recesses 2007, 2008 enhance a clean split edge and therefore an evenly split drug dose. Pill 2010 has a heart shape with a single score mark 2011 thus yielding a half-heart geometries 2012, 2013. Pill 2015 shows a diamond-shaped dose with a single score mark 2016 that, when combined with the "9" and "3" imprints 2017, 2018 and the internal angles at corners 2019, 2010 re-defines pill 2015 from being a square-type geometry to a diamond geometry. Pill 2025 has a more complex geometry. The overall shape of pill 2025 is an ovoid or oblong and has three etched score marks 2026, 2027, 2028, each with "pinch" score mark enhancers 2029 &2030, 2031& 2032, and 2033 & 2034, respectively on each end of the score mark. The result is pill 2025 that can be taken whole or broken into 4 separate, smaller doses 2035, 2036, 2037, 2038 with the outer, larger end doses 2035, 2038 and two smaller, inner doses 2036, 2037.

Figure 11:
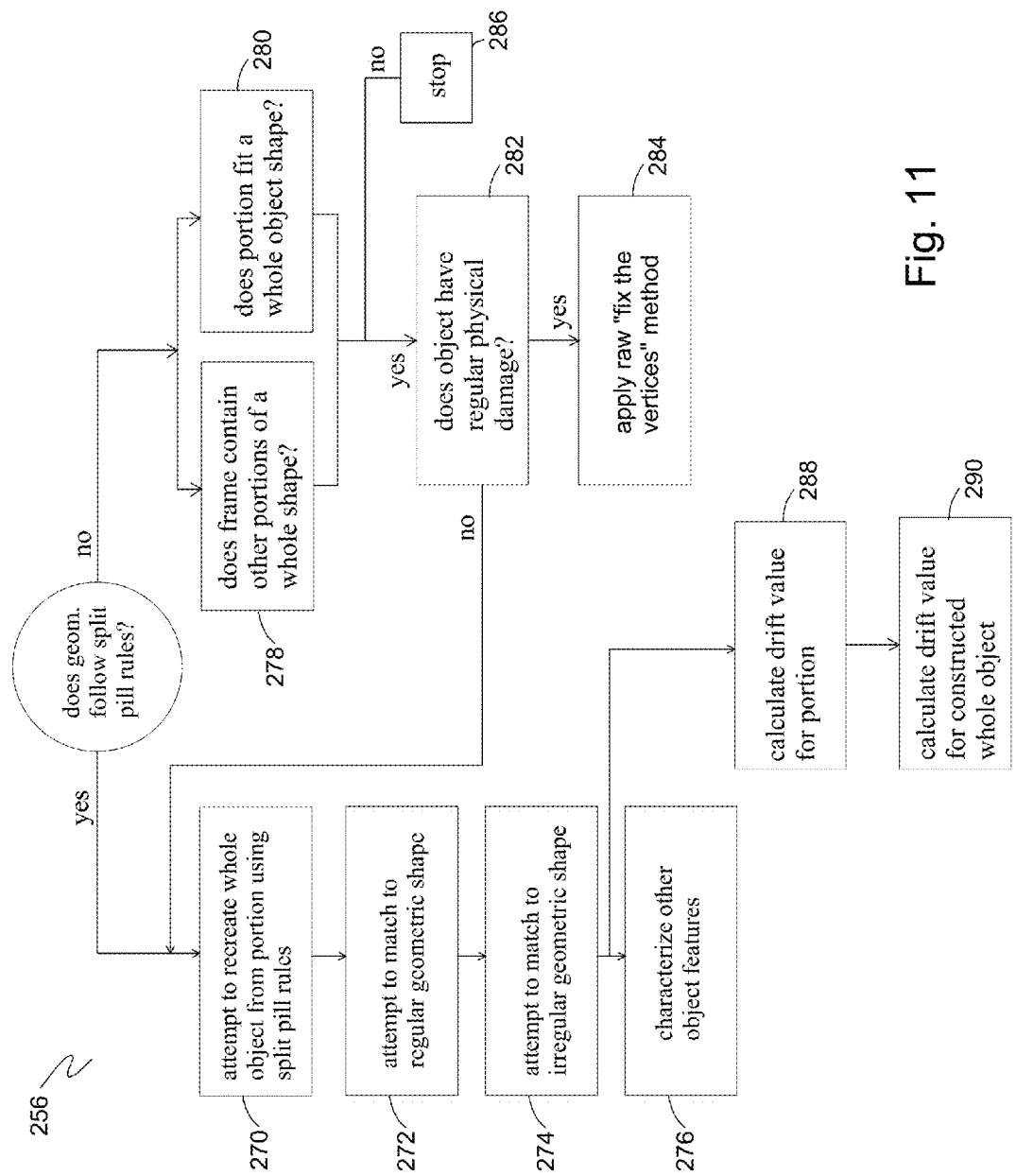
FIG. 11 illustrates a flow chart showing steps performed in one embodiment of a split pill module used in the method of FIG. 2.

Referring now to FIG. 11, a flow chart illustrates steps performed in one embodiment of a split pill module 256 and also referred to as step 256 of special handling module shown in FIG. 9. For objects that follow split pill rules, prior art methods are applied in step 270 to match the object, such as a segment of a pill's edge, to a regular geometric shape. If no regular geometric shape matches are achieved, the present invention attempts in step 272 to match the object to any known irregular geometric shape. In step 274, the present invention characterizes other features of the drug object portion regardless of whether or not whole-shape matching attempts are successful. In step 276, multiple objects within frame 52 and marked as "portion" are analyzed to determine if these objects fit together to form a whole object or a larger part of a whole object. For example, step 276 checks whether two quarter-circle portions combine or fit together to form an object that fits part of a whole circle.

Objects that do not follow split pill rules are treated as incomplete pill features. The present invention determines in step 278 if frame 52 contains other portions of a whole shape. In step 280, the present invention determines whether the portion is related to a whole object shape that exhibits damaged pill effects. "Damaged pill effects" are defined as physical effects that are beyond pharmaceutical manufacturer control or design. An example of a damaged pill effect is tablet breakage that does not occur along a score line. In contrast, a pill that is properly split along its established score mark lines is not considered damaged. Damaged objects will be those that have been subjected to forces or interactions that affect or modify the overall shape, size, mass, color, texture, or imprints and markings. Crushing, truncation, and oxidation or chemical interactions, both external and internal (e.g., caused by ingredient flaws) are common forms of damage effects for pills.

If the result of either of steps 278 or 280 is true, the present invention proceeds to check for regular physical damage in step 282. In contrast to damaged pill effects, regular physical damage is defined as damage expected from drug object packaging, shipping and handling, and shelf-aging. Regular damage effects on pills includes missing imprint character elements caused by pill to pill and pill-to-packaging abrasion during shipping, by swelling or shrinking of pills due to exposure to humidity or dry conditions. Regular damage effects also include whole or partial pill discoloration caused by exposure of reactive materials in the pill to chemicals, gases, or physical contamination.

Regular physical damage further includes physical modifications made after or during manufacture that are intentional in nature. One example of regular physical damage is chill holes or "time release modification" holes that are drilled by either the pharmaceutical maker or a prescription dispensary. These manually-drilled holes allow more rapid deployment of the active ingredients in the pill once consumed by a patient. Such surface effects are considered damage that affects the marking status of the object, but not the overall object geometry. The present invention relies on the fact that only certain medications utilize such an industry-accepted physical modification and use this information to classify pills not eligible for this feature as having a damaged pill effect. Known OCR methods detect and classify such effects as not belonging to or interfering with a character's font.

Having found other portions within frame 52, the present invention performs steps 270, 272, and 274 on the incomplete object. If the object exhibits regular physical damage, the present invention optionally applies the raw "fix the vertices" method in step 284 to repair damaged pill samples. The present invention defines "fix the vertices" method as that described in U.S. Pat. No. 6,952,206 ("the '206 patent") as it applies to reconstruction of a geometric shape object. The '206 patent (incorporated herein by reference) describes a fix-the-vertices method for geometric transforms and fitting full or partial objects or element sets to geometric shapes. The fix the vertices method presumes that the object's overall symmetry can be determined by looking at existing or visible sides, the interfaces (vertexes) of those sides, the angles and lengths of those sides, and extrapolating the total geometric shape.

If the partial drug object does not follow split-pill rules, does not have industry modifications or "regular" physical damage effects, and the partial drug object does not match other drug object fragments in the same frame, split pill analysis module will mark the drug object as not a drug object and stop analysis at step 286. The user may then determine the value of characterization data from the visible portion of the pill. In step 288, results are sent to drift calculation module 370 to calculate drift for pill portions. In step 290, results are sent to drift calculation module 370 to calculi drift for whole objects.

Capsule Seam Gap Detection

The present invention includes detection and characterization of two-part soft and hard gelatin capsules. Drug capsules made of two shells can be transparent, colored, imprinted, and/or contain blank or marked bands. Capsules do not have score marks per se, but the FDA classifies all two-piece gelatin capsule solid oral dose medications as having a SPL Score value equal to one. Instead of a score mark, gelatin capsules exhibit a seam gap where the end of the larger shell (referred to as "shell A" per FDA specifications) overhangs the smaller shell (referred to as "shell B").

The present invention detects seam gaps by performing computations on all oblong shaped objects with rounded ends (i.e., oblong objects deviate from a circular shape by being elongated in one direction) and objects that have one or more rounded or bullet-shaped ends. Oblong objects have two substantially parallel line segments joined to a rounded portion at one or both ends. Such an object appears, for example, as a rectangle with semicircular ends. A bullet-shaped end has opposing arcs that join at a point, or are connected by a curve or line segment. Some gelatin capsules have one or two bullet-shaped ends instead of rounded or semi-circular ends.

Figure 12:
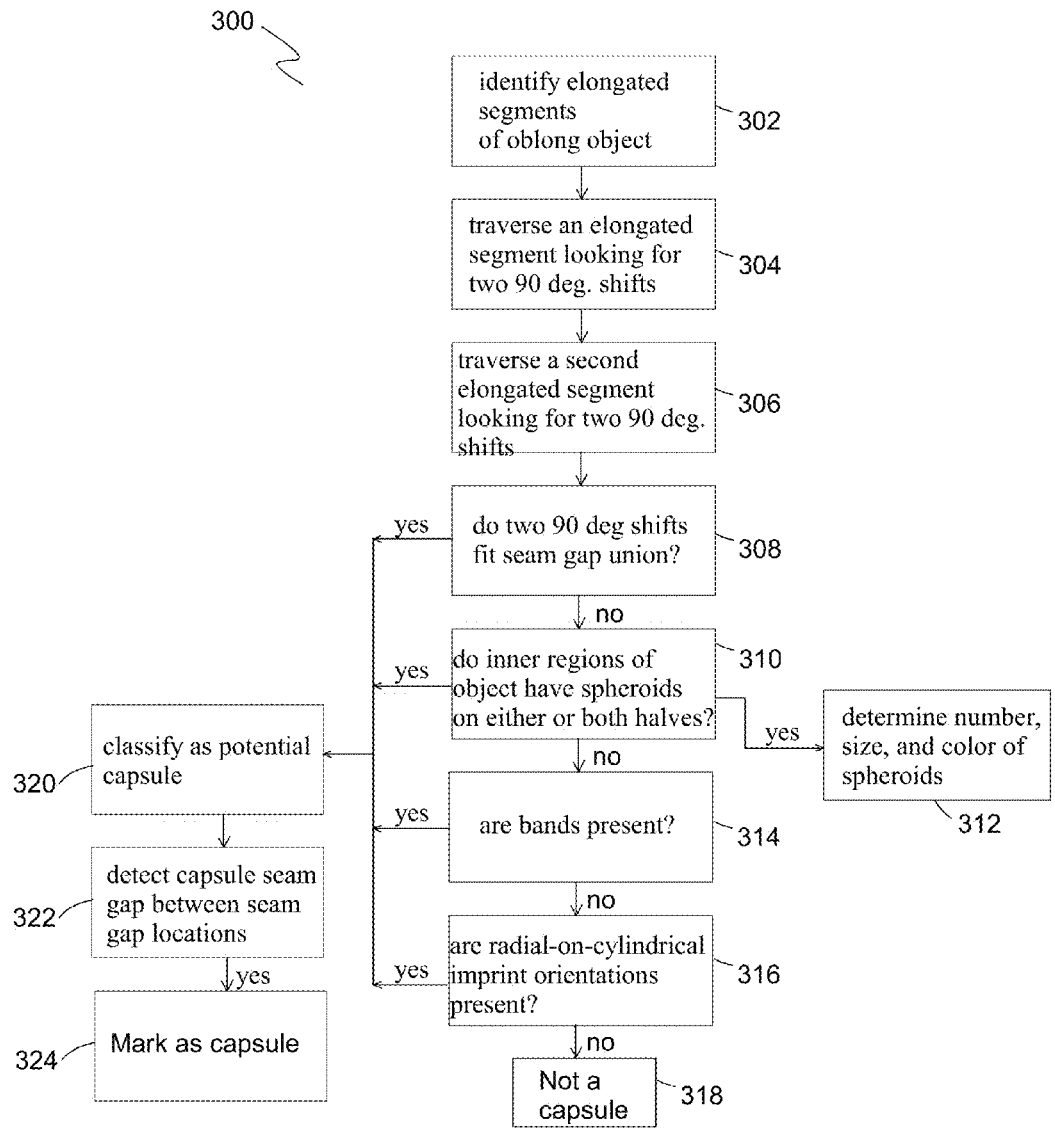
FIG. 12 illustrates a flow chart showing steps performed in one embodiment of a capsule detection module used in the method of FIG. 2.

Referring to FIG. 12, a flow chart illustrates steps performed in one embodiment of a capsule detection module 300. After deconstructor module 150 has initially identified an object having an overall oblong shape with rounded or bullet-shaped ends, capsule detection module 300 searches for a capsule seam gap. Capsule detection module 300 detects a seam gap by identifying the coordinates of two elongated line portions or sides extending between ends of the oblong object while ignoring the shorter, curved ends that connect between the elongated line segments across the width of the oblong object.

In step 302, the coordinates of elongated segments of an oblong object are identified. In step 304, capsule detection module 300 traverses a first elongated segment of the elongated object looking for two changes in direction of first elongated segment of about ninety degrees. A first change in direction is followed by a second change in direction that continues substantially in the direction of traversal along the first elongated segment. Stated differently, step 304 searches for two substantially parallel line segments positioned in an offset arrangement where a proximal end of a first line segment is located adjacent a distal end of a second line segment and where a transverse line segment extends between the proximal end of the first line segment and the distal end of the second line segment. In most cases, the transverse line segment forms a first angle of about ninety degrees with the first line segment and a second angle of about ninety degrees with the second line segment.

In step 306, capsule detection module 300 similarly searches along a second elongated portion of the oblong object for two substantially parallel line segments positioned in an offset arrangement where a proximal end of a third line segment is located adjacent a distal end of a fourth line segment and where a transverse line segment extends between the proximal end of the third line segment and the distal end of the fourth line segment.

In step 308, module 300 determines whether the two changes in direction along each of the object's elongated sides are consistent with a seam gap. The changes in direction are determined to be consistent with a seam gap if the transverse segments between first and second elongated segments and between third and fourth elongated segments both extend either towards or away from each other. Changes in direction may alternately be found to be consistent with a capsule seam gap by determining whether both transverse segments are collinear. In some cases, two pairs of direction changes may not be detected due to poor image quality, analysis of a partial image, or other factors that cause seam detection to fail.

In step 310, module 300 determines if interior regions of oblong object contain spheroids or circular shapes. Spheroids may be found within the entire object shape, within one or both capsule halves (divided at seam gap), or within one or more portions of each or both capsule half. If circular or spheroidal objects are detected, step 312 detects the number, size, and/or color of the spheroidal objects using known methods.

In step 314, module 300 determines if one or more capsule bands are present by checking for contrast shift regions that extend between one elongated side and the opposite elongated side of the oblong object.

In step 316, module 300 determines the presence of radial-on-cylindrical imprints on the object. Known OCR methods return the orientation or direction of detected characters if the characters otherwise pass valid character OCR processing rules. Capsule detection module 300 will already have the orientation and shell side assignments of the object. Given these two pieces of information, the data returned from the OCR prior arts methods can be interpreted to determine the actual characters present on a 2-piece capsule whether oriented radially or longitudinally. In one embodiment of capsule detection module, both the characters to be identified and a flag indicating that the OCR method should perform radial-style character orientation/presentation check are output to known OCR methods used in the invention.

In other words, known OCR methods are informed that the material to be processed is in fact located on a surface that is known to have radial effect or impact on characters if they are determined to be aligned in a specific direction in the mapped field of data. This is instead of relying on the OCR method to determine whether or not radial effects are involved. In known OCR methods, a general rule specifies that more parameter information provided to OCR methods results in greater overall accuracy of the OCR function.

The present invention uses either known OCR methods to determine the radial status of characters being analyzed or uses capsule detection and bin run direction or orientation analysis performed by imprint and marking analysis module 330 to determine the radial status of characters. In another embodiment of the present invention, a combination of the two approaches is achieved. The most accurate embodiment of these methods involves pairing the capsule shell orientation detection of the current invention with the character orientation vector data returned from prior arts OCR methods. Known OCR methods will fail to solve the orientation problem if the only character visible for processing is a glyph or symbol or character that is not supported by current OCR libraries, which is the case for the vast majority of pharmaceutical vendor glyphs and drug symbols.

Several factors are used by the present invention to determine radial imprint orientation. The primary factor is whether or not the detected character(s) are in contact with the established longest edge/side of the object. A secondary factor is the character orientation. A non-radial imprint oriented along the longest side-axis can appear radial in nature if the capsule is rotated such that the characters contact the edge of the object. This effect is much less common compared to true radial print where the character orientation appears to be transverse to the capsule's length.

In cases where longitudinal print is partially occluded due to the rotation of the object about its central axis, known radial-type OCR detection and correction methods compute and return the most probable character set since those methods are designed to process semi-truncated characters regardless of where the truncation of character elements takes place (chopped off top or left or bottom or right).

Another factor that signals radial-on-cylindrical imprints is correcting for "bending" or curvature-based appearance deformation of imprint characters. For drug objects whose imprint elements are located on cylindrical surfaces that have been rotated to near-out-of-view positions, accurate determination of character element marking dimensions with respect to a reference image or set of data requires correction. Known OCR methods support stretching or dimensional disturbance corrections if the methods are informed that the characters are subject to a skewing effect. Otherwise, the present invention is not be able to include geometrically skewed character elements as part of a counterfeit computational analysis unless the authenticated reference image/data also contained the same amount of rotational viewpoint skew.

If all four of steps 308, 310, 314, and 316 return a negative result, module 300 marks the object as not being a capsule in step 318. On the other hand, if one or more of steps 308, 310, 314, or 316 returns a positive result, module 300 marks the object in step 320 as a potential capsule and continues analysis. In step 322, deconstructor module 150 is applied to locations where changes in direction are identified along elongated portions of oblong object to determine whether a capsule seam extends along the entire distance between seam gap locations. If a capsule seam is found, module 300 marks the object as a capsule in step 324. If not, the object remains marked as a potential capsule.

Example: Capsule Analysis

Figure 13:
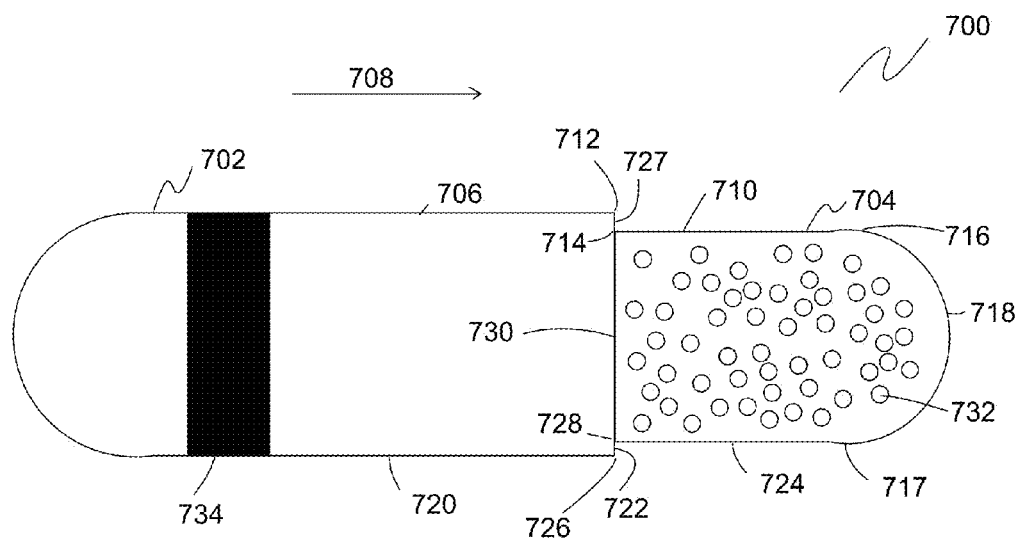
FIGS. 13-16 illustrate an example implementation of the capsule detection module of FIG. 12.

An example implementation of capsule detection module 300 is illustrated with reference to FIGS. 13-16. FIG. 13 shows an oblong object 700 having shell A 702 and shell B 704. In step 304, capsule detection module 320 traverses shell A's upper line segment 706 in a direction of traversal 708 towards an upper line segment 710 of shell B 704, looking for a first change in direction 712 of about ninety degrees, followed immediately by a second change in direction 714 of about ninety degrees back in the direction of traversal 708 towards shell B 704, which then continues on without any other detected discontinuities or shifts other than a direction change 716 leading into an end-cap 718.

The second or lower line segment 720 of shell A 702 is traversed in step 306 in the same manner as upper segment 706 in direction 708. Transverse segment 722 from lower line segment 720 to lower line segment 724 must extend in a direction that is opposite of transverse segment 726 from segment 706 to segment 710 when traversing in direction 708 from shell A 702 to shell B 704. In other words, the two initial ninety degree shifts 726, 728 should define transverse segments 722, 727 that both extend towards each other and connect to each other to indicate the skirt or seam gap 730 created by the union of shell A 702 and shell B 704. Using the two-part capsule 700 illustrated in FIG. 13 as an example, two pairs of horizontal line segments can be extracted from the overall oblong shape of the capsule (segments 706-710, segments 720-724). Traversing in direction 708 from left to right in FIG. 13, upper pair of line segments 706-710 encounters a downward shift with transverse segment 727 prior to completing its traversal. Similarly, traversing in direction 708 from left to right, lower pair of line segment 720-724 encounters an upward shift with transverse segment 722 prior to completing its traversal.

Figure 14:
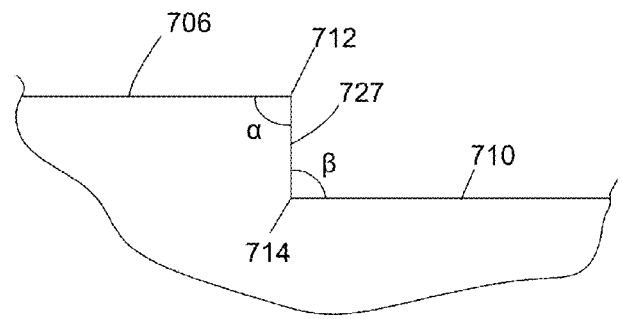

As illustrated in FIG. 14, which shows an enlarged view of upper segment 706-710 of capsule 700, first upper segment 706 of shell A 702 is connected to upper segment 710 of shell B by transverse segment 727. Angle α at direction change 712 and angle β at direction change 714 are each approximately ninety degrees.

Referring again to capsule 700 of FIG. 13, if in step 310 module 300 detects inner regions filled with circular shapes within either half 702, 704 of capsule 700 or within entire capsule 700 (e.g., when the capsule shell is translucent), object 700 is classified as potentially being a capsule in step 320. Characteristics of number, size, and color(s) for capsule spheroids 732 are determined in step 312. The teachings of U.S. Pat. No. 6,952,206 can be used to estimate the number of spheroids encapsulated within capsule 700 given the diameter of spheroids 732 and the dimensions of capsule 700. In some cases, such as with excessive JPEG image file compression, the use of a low-quality JPEG encoding/decoding module, or poor image resolution, one or both of the capsule seam gap transverse segments 727, 722 can be "erased" or not be visible or pronounced enough to be detected by module 320. In such cases, the present invention will determine the presence of bands 734, spheroids 732, or radial-on-cylindrical imprint orientations 736 (see FIG. 16 n.736).

In step 322, capsule detection module 300 applies contrast detection module 200 to a region 731 between the two transverse segments 727, 722 to determine if capsule seam 730 is present and runs the entire length between transverse segments 727, 722. The two capsule transverse segments 727, 722 were detected in a first iteration of deconstructor module 150 and the full capsule seam 730 was detected in a subsequent iteration of deconstructor module 150. If a capsule seam gap 730 is detected as shown in FIG. 13, pill 700 is marked as a capsule in step 324.

Figure 15:
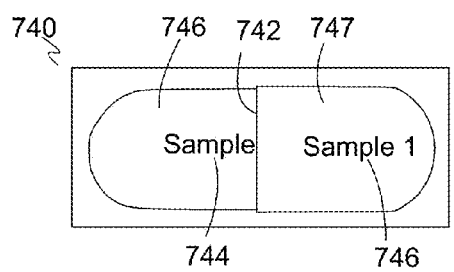
Figure 16:
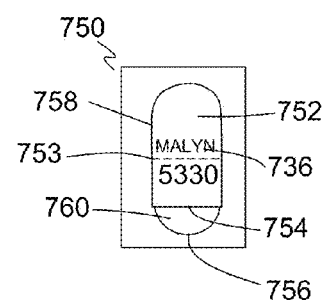

FIG. 15 shows an example pill image 740 having a capsule seam gap 742 that partially masks or occludes imprint marking 744 on side B 745, which normally is identical to imprint marking 746 on side A 747. FIG. 16 shows an example pill image 750 with capsule 752. Capsule 752 has capsule seam gap 754 that is not located at the capsule's mid-point or equator 753 and may actually be located very close to one end 756 of capsule 752. The present invention does not exclude capsules with seam gaps located at other than the midpoint of the capsule body.

As shown in FIG. 16, some capsule shells A 758 may occlude part or all of imprint marking (not visible) on shell B 760 if shell A 758 covers a large portion of shell B 760 as is the case in FIG. 16. Drug makers compensate for this occlusion by having a duplicate imprint marking 736 on shell A 758.

Imprint and Marker Analysis Module

In addition to superscript, subscript, underline, bold, italic, and other font attributes, the present invention introduces the concept of a bin handler that supports linear, radial, helical, inverse, minor, and transverse element orientation for use with character recognition and verification methods known in the art (e.g., OCR and OCV). Examples of known OCR methods are disclosed in U.S. Pat. Nos. 2,026,329 and 5,150,425 and in US patent application serial no. 2011/0081087. The present invention operates independently of language and symbols, thus being able to characterize and analyze pill markings and imprints based on lines, curves, dots, and diacritical elements. As a result, method 100 can generate and provide pill characterization data that is used to check any marked pills using a non-SPL-based medicine information database as commonly used outside the United States.

Figure 17:
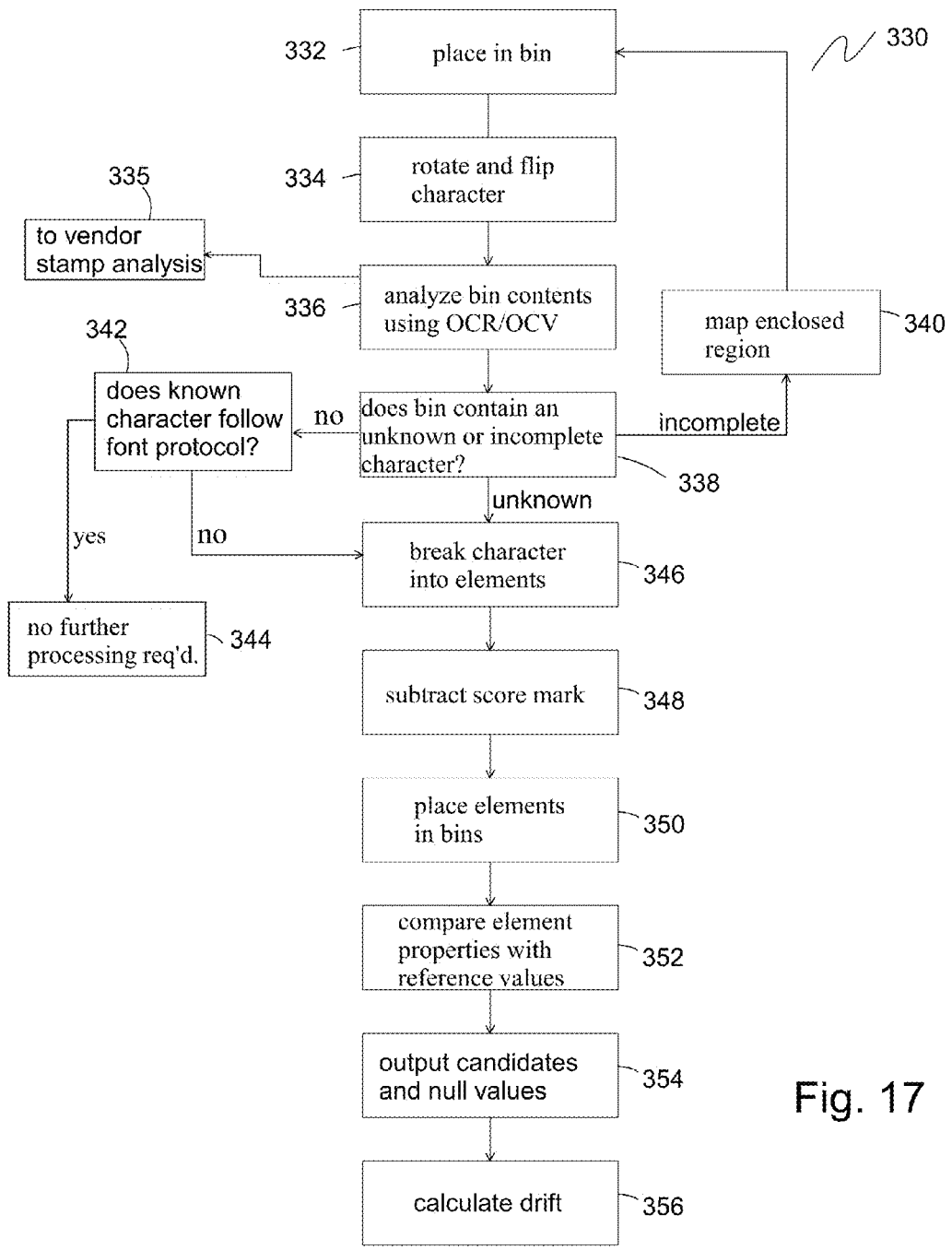
FIG. 17 illustrates a flow chart showing steps performed in one embodiment of an imprint and marker analysis module used in the method of FIG. 2.

FIG. 17 illustrates a flow chart for steps performed in one embodiment of an imprint and marker analysis module 330 that is used, for example, to perform step 120 of method 100. In step 332, each detected marking or imprint character is placed into a bin following OCR spacing rules. The group of bins makes up a bin run with each bin of the bin run holding one character or object from a word, phrase, or group of characters in a marking or imprint. In step 334, the character is mirrored, flipped, aligned, and rotated as needed. In step 336, the character is analyzed using known character recognition and/or verification methods. In step 335, characters are output to vendor stamp analysis module 360, discussed below.

In the present invention, the term "character" means any mark or symbol used in a writing system. Characters include numbers, letters, punctuation marks, underlines, super/subscripts and established shapes and symbols. A character must occupy at least one bin unit in addition to comprising the contents of one or more bin runs. Typically, one bin unit will contain an entire character but with some pill designs, several bin units are required to represent the entire set of character information.

The present invention introduces the concept of impure, incomplete, and unknown characters to resolve bin unit contents. Characters are assigned one or more character type designation. Character types include pure, impure, complete, incomplete, known, and unknown. Pure characters use elements to construct the character and adhere 100% to a font type. Impure characters use elements to construct the character, but the character does not adhere 100% to font type and/or the character contains extra and/or missing elements used to construct the intended character.

Complete characters have coordinates or regions within the bin unit and/or bin run that are 100% processed. In other words, no unknown or unprocessed regions are present in complete characters. Incomplete characters have coordinates or regions within the bin unit and/or bin run that are not 100% processed. That is, the character has unmapped or unprocessed regions.

Known characters are characters within a bin unit and/or bin run that are successfully resolved using optical character recognition (OCR) and/or verification (OCV) methods known in the art. All elements of known characters are accounted for and are used to construct the character. A known character can be marked as known and incomplete if the known character contains unmapped regions that have no effect on the status of the "known" designation of the character. Unknown characters are characters within a bin unit and/or a bin run that are not 100% resolved using optical character recognition and/or verification methods and/or not all elements of the character are accounted for. The present invention employs deconstructor module 150 in a character analysis module 330 to differentiate complete markings from incomplete and unknown markings from known markings. Purity is a property of the character and does not by itself indicate whether the character has any unmapped or unknown entities. Purity is related to drift in that after a region is fully mapped and characters are identified within that region, the character's adherence to a font can be calculated.

In step 338, imprint and marker analysis module 330 determines whether a bin contains an unknown or incomplete character. Incomplete characters are processed in step 340 by applying deconstructor module 150 to map unmapped enclosed regions of the character. The results of step 340 are returned to step 332 where they are placed in one or more bins.

In step 342, known characters from step 338 are checked for adherence to a font as detected in character recognition and verification step 336. If the character adheres 100% (or within a set tolerance limit) to the detected font, the character is marked as not requiring further character analysis processing in step 344. On the other hand, if a character does not follow the detected font protocol 100% (or within a tolerance), the character is further analyzed by breaking it into elements in step 346.

Similarly, complete, but unknown characters are further analyzed by breaking the character into elements in step 346. In one embodiment of module 330, step 346 involves identifying line segments, vertices, angles, circles, and curves that make up a character. In one embodiment, elements are identified as vectors with a length and an angle. In another embodiment, elements are identified by a series of coordinates describing the element. In another embodiment, elements are identified by vertex or end points. Properties of each element include, but are not limited to a position, a length, an angle, a shape, a distance, a radius, and a line width.

In step 348, score marks are ignored, subtracted, or otherwise excluded from character analysis. In step 350, each element making up a character is placed in a bin for individual analysis. Coordinates of each element are known from mapping the region and each element's coordinates may be used in step 352 to determine locations, lengths, widths, and paths of each element. These values for each element are compared, for example, to reference values stored in a database from a drug vendor image or data file identified as a possible match for the sample being analyzed. Angles, distances, and/or size differences between any two elements are also compared with reference values. For example, two line segments intersecting at a vertex provide many data points. The angle between the segments, length of each segment, relative sizes of each segment, and proximity of each segment to other elements may be analyzed and compared to reference values. In step 354, character match candidates are output along with null values for use by other modules of method 100. For example, one object may potentially match several characters or shapes as may be the case with varieties of p and d; g, b, and q; 6, 9, and g; O, 0 and D, and other characters having similar appearances and elements. In step 356, one or more drift values are optionally calculated for each element of each character.

Figure 18:
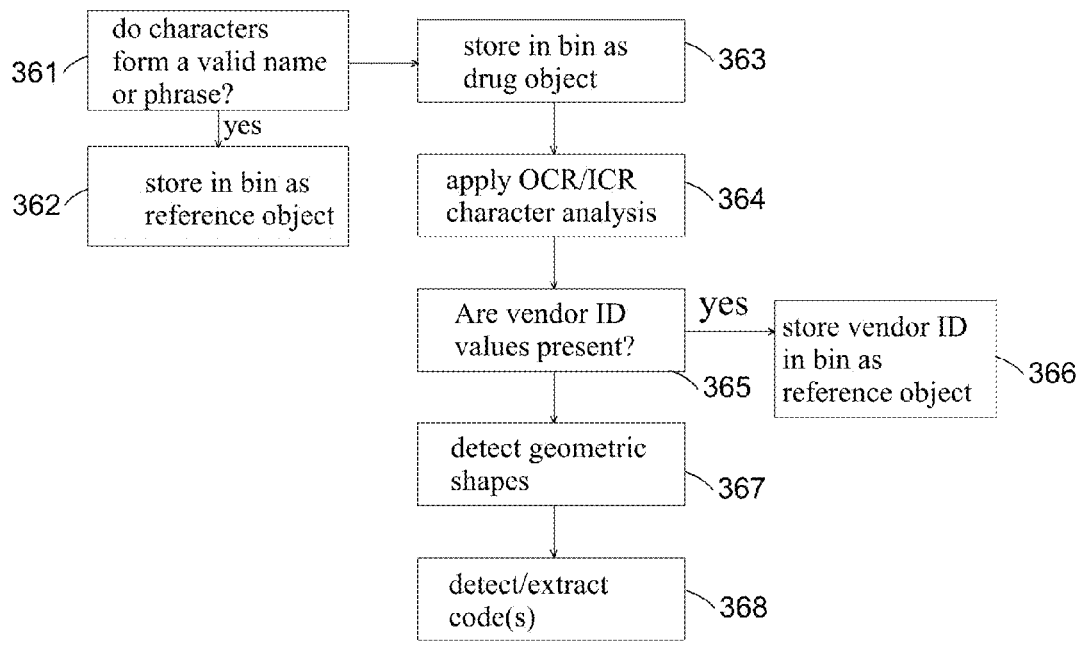
FIG. 18 illustrates a flow chart showing steps performed in one embodiment of a vendor stamp analysis module used in the method of FIG. 2.

Referring now to FIG. 18, a flowchart illustrates steps performed in one embodiment of a vendor stamp analysis module 360. Vendor stamp analysis module is used in conjunction with imprint and marking analysis module 330 to analyze pill vendor stamps. In step 361, vendor stamp analysis module 360 checks detected characters against known vendor names, markers, and phrases to determine whether they form a valid name or phrase. If a valid name or phrase is formed, the imprint or marking is determined to be a reference object in step 362 and placed in a bin for further analysis. If the imprint or marking does not form a valid name or phrase, it is determined to be a drug object in step 363 and placed in a bin. In step 364, character recognition is performed using known methods, such as optical character recognition or intelligent character recognition. In step 365, the imprint or marking is compared to known vendor ID values. If the imprint or marking matches a vendor ID value, it is labeled a reference object in step 366 and stored in a bin for further analysis. In step 367, regular and irregular geometric shapes are detected. In step 368, codes, if any, are read and compared to reference values.

Drift Calculation Module

In one embodiment of method 100, each detected object proceeds to drift calculations in step 122, preferably when no further processing is required for the object. Drift calculations facilitate using method 100 for pill authentication and counterfeit detection. The present invention computes size, color, shape and marking differentials or "drift" between one pill and its corresponding reference pill, or between several pills of the same type. Drift is defined as the amount that a selected characteristic differs from a reference value. The reference value may be determined by analyzing pill samples (e.g., prior data), may be calculated (e.g., a constructed geometric shape), or may be provided by the FDA or another medical authority (e.g., length of a pill). Drift applies to any value differentials for any item characterized by the present invention. The present invention computes feature value differentials between drug object data sets that include length, width, relative position, color, texture, straight-line alignment, curvature adherence, size of diacritical element(s), distance from a diacritical "parent," marking rotation, edge quality, and comparisons between two or more of these items. Features providing data used in a drift calculation include shape, size, color, texture, score marks, and imprint marks. Drift is used, for example, to measure the dimensional change observed between the first pill of a specific drug manufacturing batch run and the last pill of the batch run.

To calculate a value for drift, the present invention may use, for example, existing data sets provided by drug manufacturers as reference data. The present invention alternately or additionally can generate or supplement data sets required to authenticate the over 60,000 prescription medications approved by the FDA. The present invention may generate data by analyzing authentic pills and/or image files or data for authentic pills.

With respect to shape and size, and by using two dimensional data sets of two or more drug object samples, the present invention calculates a drift value for pill samples by obtaining the difference between x and y coordinates yielding a spatial drift value between the initial pill and subsequent pills. Spatial drift can be viewed as the distance in specific geometries. Similarly, color drift can be viewed as the difference in individual or collective color channels. In addition to representing the difference between one pill attribute and a reference value, drift may also represent an attribute of the same pill when evaluated at different points in time. For example, a pill's length on the date of manufacture may be compared with the length of the same pill after being packaged and stored for twelve months.

Figure 19:
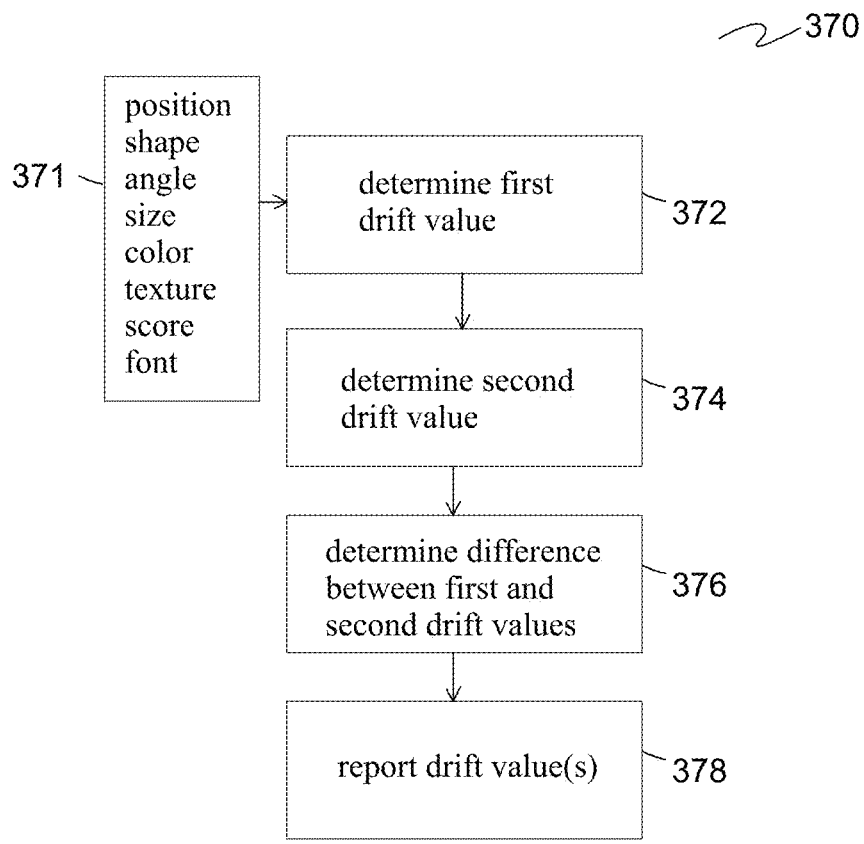
FIG. 19 illustrates a flow chart showing steps performed in one embodiment of a drift calculation module used in the method of FIG. 2.

Referring now to FIG. 19, a flow chart illustrates steps performed in one embodiment of a drift calculation module 370. In step 372, drift calculation module 370 inputs results sent to it from other processing steps or modules. Results may include, position, size, shape, angle, color, area, color, texture, score mark, font, or any other feature or attribute of a feature. In step 372, a first drift value is determined from any one or more attributes of a pill or its features, such as position, size, shape, angle, color, texture, score, and font. In step 374, a second drift value for a pill attribute is determined or obtained that corresponds to the first drift value. For example, a first drift value may be the angle of a character relative to a score mark on a sample pill. A second drift value may be the same angle between the character and the score mark as listed in a vendor-supplied table of information. In step 376, the difference is determined between the first and second drift values. Based on the difference in drift values, a drift value is reported in step 378. The reported drift value may be expressed numerically as the actual difference, a percentage, ratio, statistical value, yes/no, +/−, or other reported value. Statistical reporting may include skewness, kurtosis, chi squared value, standard deviation, shape fitting, font adherence, font entanglement, or any other value that expresses the difference between an attribute of a pill or its features and a reference value.

The present invention defines "raw map" as the actual detected edge or outline of an object (e.g., a split or damaged pill) where the entire object is visible in the image. The concept of raw map allows drift computations at unexpected locations within supported geometries. The concept of raw map also allows fitting object fragments together with other shapes in the same frame in an attempt to reassemble fragments of broken or split objects back into their "parent" or original structure.

Frame Objects Module

Figure 20:
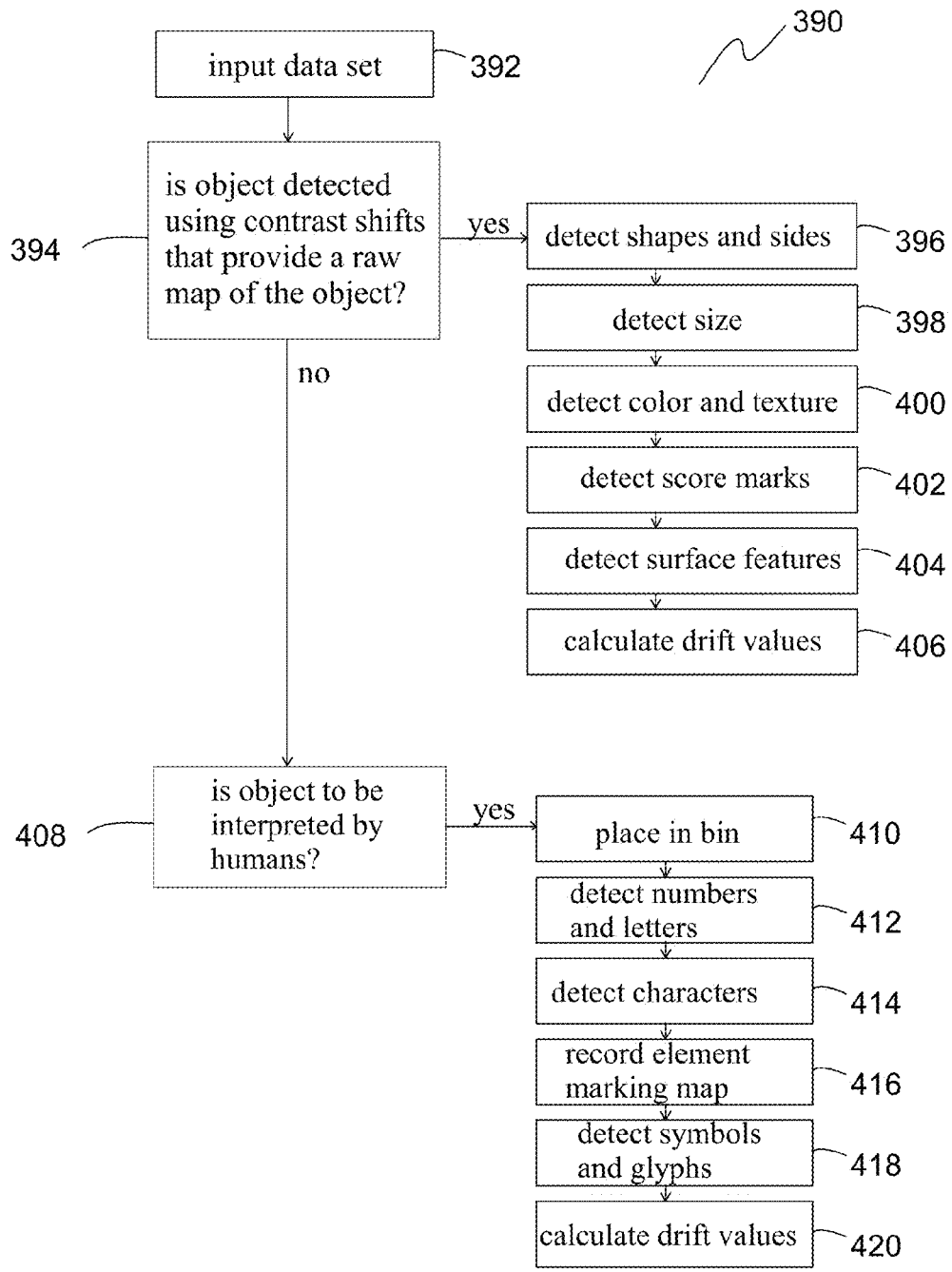
FIG. 20 illustrates a flow chart showing steps performed in one embodiment of a frame objects module used in the method of FIG. 2.

Referring now to FIG. 20, a flow chart illustrates steps performed in one embodiment of a frame objects module 390 used to differentiate between frame objects and imprints or markings that require further processing. Examples of frame objects include image background, background text, calibration markings, and diagnostic markings. In step 392, an image or data set is input to the processor or database of the present invention. In step 394, it is determined whether an object is a frame object or an element object. The present invention defines a "frame object" as an object having detectable contrast shifts and that provides a "raw" map of the detected object. Element objects include pill shapes, beveled edge contours, shapes of raised or recessed regions on pills, through-openings in a pill, and the like.

For objects defined as a frame object or element object, the shape and side(s) of a frame object in the data set or image are detected in step 396. In step 398, the size of a detected frame object is determined based on a map of the image or data set. In step 400, the color and/or texture of the frame or element object is detected. In step 402, score marks are detected for element objects. In step 404, surface features of element objects are detected. In step 406, one or more drift values are calculated for attribute(s) of a frame or element object. The order of steps 396-404 is described as a preferred sequence. Other step sequences also are acceptable.

In step 408, frame objects module 390 determines whether the object is an imprint or marking. The present invention defines "imprint or markings" as human-specified or human-designed markings, structures, and designs that are to be interpreted by humans as opposed to being identified or processed using a raw map. As noted above, the raw map is the actual detected edge or outline of an object where the entire object is visible in the image. Examples of imprints and markings include text, symbols, characters, glyphs and the like. Imprints or markings are placed in one or more bins in step 410. In step 412, each number or letter is detected using known OCR/OCV methods and labeled accordingly. In step 414, non-alphanumeric characters (e.g., @, %, ~, !, ©, ®, &, $) are similarly detected and labeled as characters. In step 416, an element map is recorded for elements making up numbers, letters, and characters. In step 418, symbols and glyphs are detected. In step 420, one or more drift values are calculated for selected (preferably all) imprints and/or elements of imprints or markings. Steps 412-418 are described here as a preferred sequence, but other step sequences are also acceptable.

The present invention applies deconstructor module 150 independently to both frame objects and to bin contents containing imprints and markings. This analysis enables method 100 to verify that a pill's feature is located in the deconstructor module cycles during the correct iteration. That is, a pill feature will be determined to match or not match reference data both in terms of its geometry and its topography. Data or information obtained from processing frame objects using deconstructor module 150 is used to both determine overall pill geometry and to populate deconstructor module bin units. The contents of deconstructor module bin units are used to detect characters more precisely by analyzing attributes of fundamental elements.

The separation of the two deconstructor module types also allows the present invention to be applied to other types of object identification where some forms of data set pre-processing is performed prior to the data set being processed by the present invention. In such a data set, no frame object cycles of deconstructor module are needed because the present invention receives previously processed data. Separation of the two different deconstructor module processing types is intentional and allows for flexibility of the present invention to be used for applications beyond pill identification and characterization.

The present invention in one embodiment can fully map any pill in no more than fifteen contrast shift detection cycles. All imprints and markings can be resolved in nine or fewer contrast shift detection cycles. Another way to view the fifteen and nine contrast shift cycle limits is that physical pill designs are currently limited to fifteen levels of features of all and any type, and imprint features or designs located within the body of the pill's geometric boundary are currently limited to nine levels of features.

In one embodiment, complete mapping of all of a pill's physical and marking features is obtained within fifteen base cycles to resolve physical structures of the pill. Each of the fifteen physical cycles has up to nine contrast shift detection cycles to resolve markings and imprints for a total of 135 contrast shift detection cycles.

In another embodiment, five physical and three marking contrast shift detection cycles, or fewer, are performed to fully characterize pills with standard physical geometries and known alphanumeric characters instead of unusual drug geometries or complex symbols and glyphs. Performance gains are the goal of this embodiment.

In another embodiment, method 100 processes all pill features within fifteen total contrast shift detection cycles or iterations where bin contents (markings and imprints) are resolved in-step with the fifteen iterations. Preferably, the present invention defaults to the mode of processing all pill features within fifteen total contrast shift detection iterations. The present invention can switch to 15×9 mode if any unknown, incomplete, or impure character regions remain within even one single bin. If no unknown, incomplete, or impure character regions exist, the default setting of the present invention is to mark processing as complete.

For example, the outer image frame, frame objects, and a pill's outer shape are detected in the first iteration; a pill's beveled edge is mapped in the second iteration, the shape of raised square region within the beveled edge is mapped in the third iteration, an outline of characters printed on the raised square is mapped in the fourth iteration, and enclosed regions within characters are mapped in a fifth iteration. Preferably, for each iteration of contrast shift detection module 200, drift values are calculated and colors and/or textures are detected. When a full set of contrast shift detection iterations is complete, 100% of the data set is mapped and no unmapped regions remain. All object shapes, designs, glyphs and imprints are now complete and known (including pure and impure characters).

Figure 21:
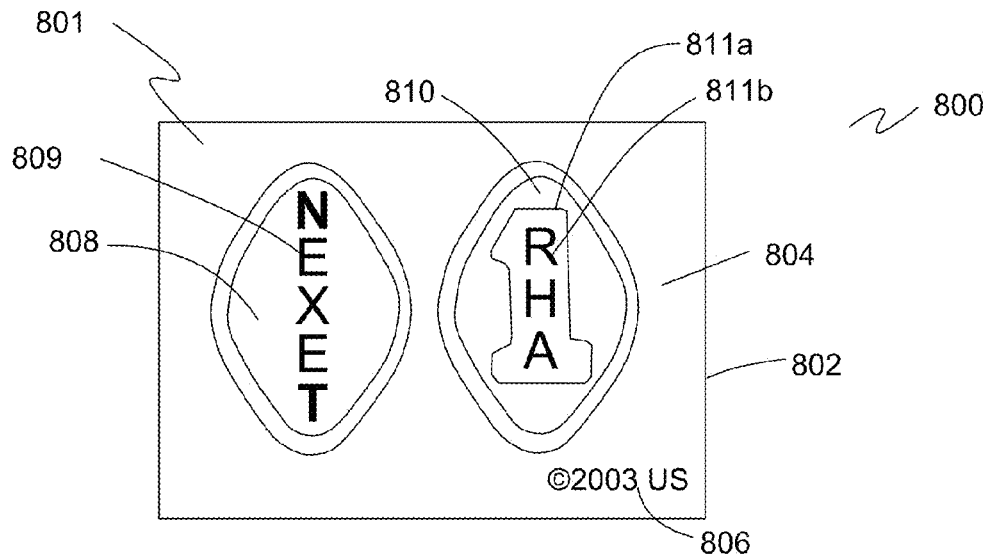
FIGS. 21-23 illustrate an example implementation of one embodiment of a method of pill identification and characterization and showing application of the imprint and marking analysis module of FIG. 17.
Figure 22:
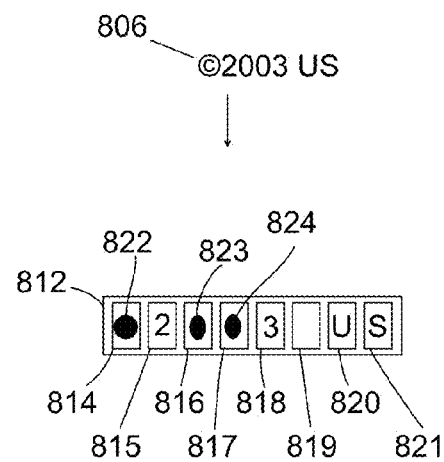
Figure 23:
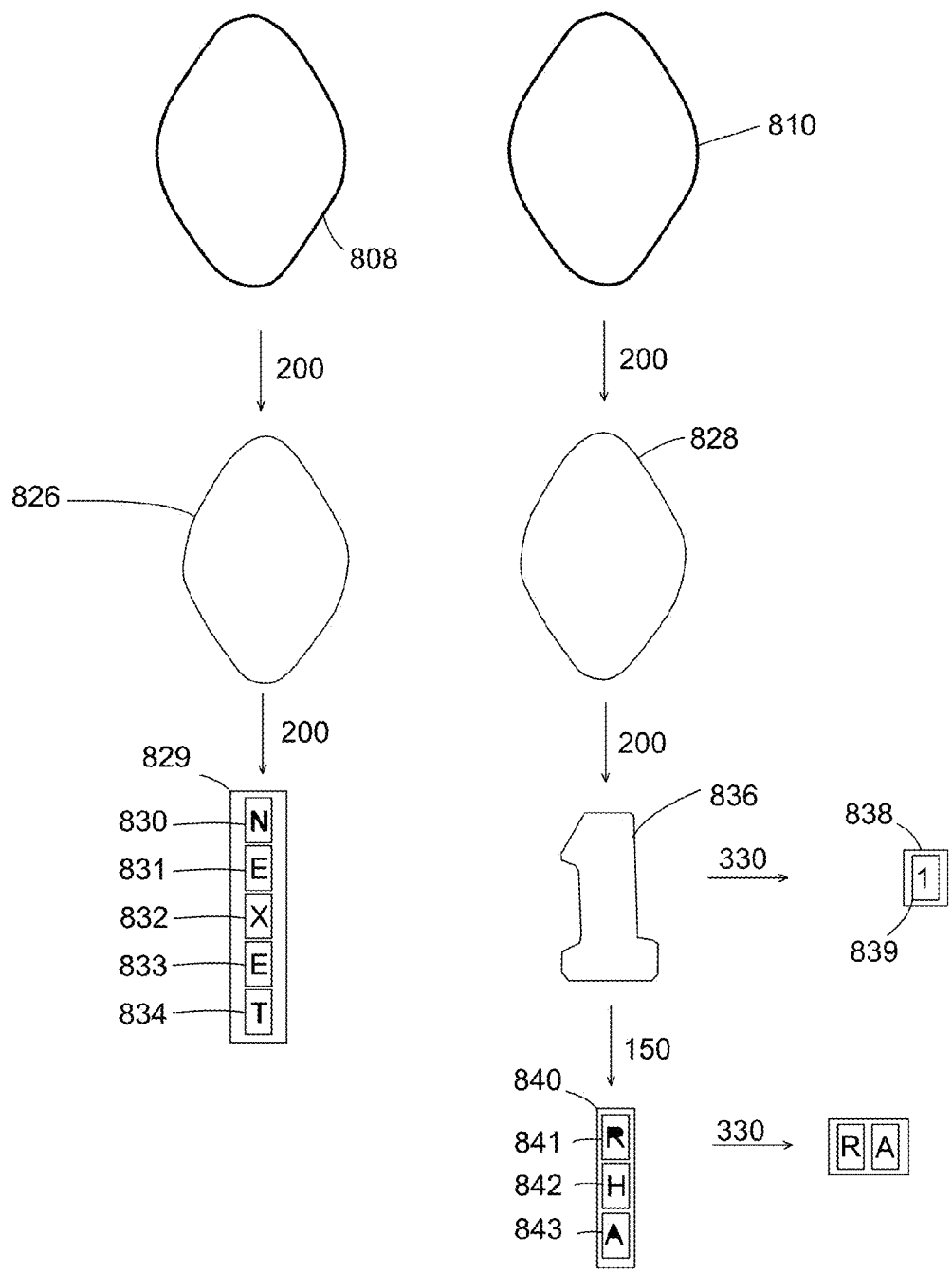

Example: Pill Characterization with Imprint and Marking Analysis:

Referring now to FIGS. 21-23, a pill image 800 illustrates an example implementation of one embodiment of method 100 for pill identification and characterization with application of imprint and marking analysis module 330. FIG. 21 shows a pill image 800 with pill 801. The first iteration (DIF#0) of deconstructor module 150 mapped pill image 800 of a Nexet pill 801 and detected frame 802, background 804, reference object 806. Edge detection module 200 was used to scan for contrast shifts within image frame 802, detecting two enclosed contrast shift regions, namely side A 808 and side B 810. A comparison of the areas of pill side A 808 and pill side B 810 revealed equal areas, matching shapes, and spatial alignment between the objects. Because of the equal areas and matching shapes, sides A and B 808, 810 were assigned sides as side A and side B, respectively. Since sides A and B 808, 810 are aligned, rather than being rotated with respect to each other and/or scattered within image frame 802, sides A and B 808, 810 are likely part of a vendor-supplied or other reference image. Subsequent iterations of deconstructor module 150 reveal that pill side A 808 has bevel edge 826 (DIF#1) and NEXET imprint 809 (DIF#2). Also, pill side B 810 has bevel edge 828 (DIF#1), "1" imprint 811*a* (DIF#2) and "RHA" imprint 811*b* (DIF#3). Regions within the letter R and A of RHA imprint 811*b* are mapped during DIF#4 using contrast shift detection module 200.

After 100% of data set mapping has been completed for image 800, many objects have been detected that provide information for identifying and characterizing pill 801. For this example, image 800 provides information that includes the following:

Image 800 has "© 2003 US" reference object 806;

Image background 804 is white and has no patterns or other special markings;

Primary pill color is white; pill shape is 4-sided ovoid shape, no score mark, overall 11 mm size;

Sides A and B 808, 810 have child bevel edges 826, 828, respectively, which are smaller copies of shape of side A 808 and side B 810;

NEXET imprint 809 is vertically oriented and centrally located on side A 808;

NEXET imprint deboss/engrave is not consistent in font attributes from letter to letter (N and T of NEXET are bold type);

The number "1" 811*a* is an embossed relief object taking up most of side B 810 and centrally located on side B 810;

Full color channel count for each of side A and side B;

Full texture mapping of both sides;

Dimensions and positions of all sides, bevel edges, imprint/marking elements, contrast regions; and Drift values when compared to perfect geometric composite, actual drug, or vendor image.

Having obtained this information, pill 801 can be identified as a Nexet 1 mg dose pill. Further processing and calculation of drift values can be used to determine the quality and authenticity of pill 801.

As shown in FIG. 21, reference object 806 reads "© 2003 US." Reference object 806 has eight characters including ©, 2, 0, 0, 3, [space], U, and S. In step 332, each of these characters is placed in bin units 814-821, respectively, of bin run 812. Since these objects were detected during the first iteration (DIF#0) of deconstructor module 150, the enclosed regions within vendor reference object 806 have not yet been analyzed.

In step 336, OCR/OCV is applied to each bin unit 814-821 of bin run 812 shown in FIG. 22. Conventional OCR/OCV methods successfully determine that bin unit 815 contains a number "2", bin unit 818 contains a number "3", bin unit 819 contains a single valid blank space, bin unit 820 contains a letter "U," and bin unit 821 contains the letter "S." In step 338, module 330 determines that bin units 814, 816, and 817 contain unknown characters because characters "©" and "0" have enclosed regions that are unmapped (or "unknown") after the first iteration of deconstructor module 150 (DIF#0). The unmapped regions 822, 823, and 824 are shown as solid black-filled regions in FIG. 22. Due to the presence of even one unknown character or due to incomplete processing of all coordinates of image 800, module 330 initiates an contrast shift detection module 200 in step 340 to map any unmapped regions. In this example, step 340 maps unmapped regions 822, 823, and 824, places the contents of regions 822, 823, and 824 in bin units in step 332, and analyzes the bin unit contents in step 336 using known OCR/OCV methods. As a result of this sequence of steps, module 330 in this example determines that unmapped region 822 contains the letter "c," and both unmapped regions 823, 824 are empty.

For comparison, had 100% of the image coordinates of image 800 been processed on the first iteration of deconstructor module 150 and the sum of incomplete, unknown, and impure objects been zero, module 330 would not have performed step 340 and instead would have marked the data as not requiring further imprint analysis processing in step 344.

FIG. 23 shows features of pill 801 as steps of deconstructor module 150 are performed. Pill side A 808 and pill side B 810 are further processed by applying deconstructor module 150 to pill side A 808, which yields beveled edge 826, and to pill side B 810, which yields bevel edge 828. Since beveled edge 826 encloses an unmapped region, deconstructor module 150 operates on the region enclosed by bevel edge 826, detecting characters N, E, X, E, and T. These characters are placed in bin units 830-834, respectively, of bin run 828. Character analysis module 330 places the characters in bins 830-834 of bin run 828 and analyzes the bin contents using OCR/OCV to identify or confirm letters N, E, X, E, and T. If each character sufficiently follows the font protocol of the detected font, no further character processing is performed. Characters that do not sufficiently follow the detected font protocol are broken into elements, where the position, size, lengths, angles, and spatial relationships with other elements are compared with reference values. Drift values may be calculated for each character element, each complete character 814-821, the group of characters as imprint 809, bevel edge 826, and pill side A 808.

Elements of pill side B 810 are similarly analyzed using deconstructor module 150 and character analysis module 330. Deconstructor module 150 is applied to detect bevel edge 828 on pill side B 810. The region enclosed within bevel edge 828 is deconstructed to detect the outline of a large number one 836, which is an unknown character type. The number one shape 811a requires additional iterations of deconstructor module 150 to process the more advanced features designed into pill side B 810. Focusing on the unknown versus known status of the characters present on number one imprint 836 of FIG. 20, known OCR/OCV methods detect number one 836 as an outline-type font character. Number one imprint 836 is placed into a single bin unit 839 of a single bin run 838. Number one imprint 836 contains unmapped or unprocessed coordinates because the identity of number one 836 character was determined purely based on the outline of the object.

Because shape 836 encloses an unmapped region, deconstructor module 150 is employed in step 340 to map the region, detecting three characters R, H, and A. Characters R, H, and A are placed in bin units 841, 842, and 843 of bin run 840 and analyzed using imprint and marking analysis module 330. Regions enclosed within the letters R and A are mapped using deconstructor module 150 and no further elements are detected. In step 342, each character R, H, and A is analyzed for font adherence. For any character that does not sufficiently adhere to detected font protocol, the character is broken into elements and further analyzed according to the shape, position, angle, and other attributes of each element. Drift values may be calculated for each character element; each complete character 836, 841-843; each group of characters as an imprint or marking 811a, 811b; bevel edge 828, and pill side B 810.

Still referring to FIG. 23, method 100 now has detected pure, complete and known characters for side B 810 as well as having bin run 840 containing three bin units 841, 842, 843 arranged vertically. The present invention also records the fact that pill side B 810 has characters "RHA" arranged vertically on the host character, number one 811a. The present invention further records the orientation and spatial relationships of imprint elements detected either during different deconstructor module cycles or during a single deconstructor module cycle. These relationships enable effective detection of counterfeit pills. As an example, a fake NEXET tablet could be made to have a "1" and "RHA" characters on the tablet but not in the proper arrangement or relationships established by the actual drug vendor. A person performing a manual look-up may observe a text-based table that merely indicates that NEXET tablets have "a 1 and RHA visible on side B." As a result, without detailed information about the relationships of the various imprint elements, a counterfeit NEXET tablet could easily go undetected as counterfeit even when checked against references.

Examples: Imprint and Marking Analysis with Pure and Impure Characters

Figure 24:
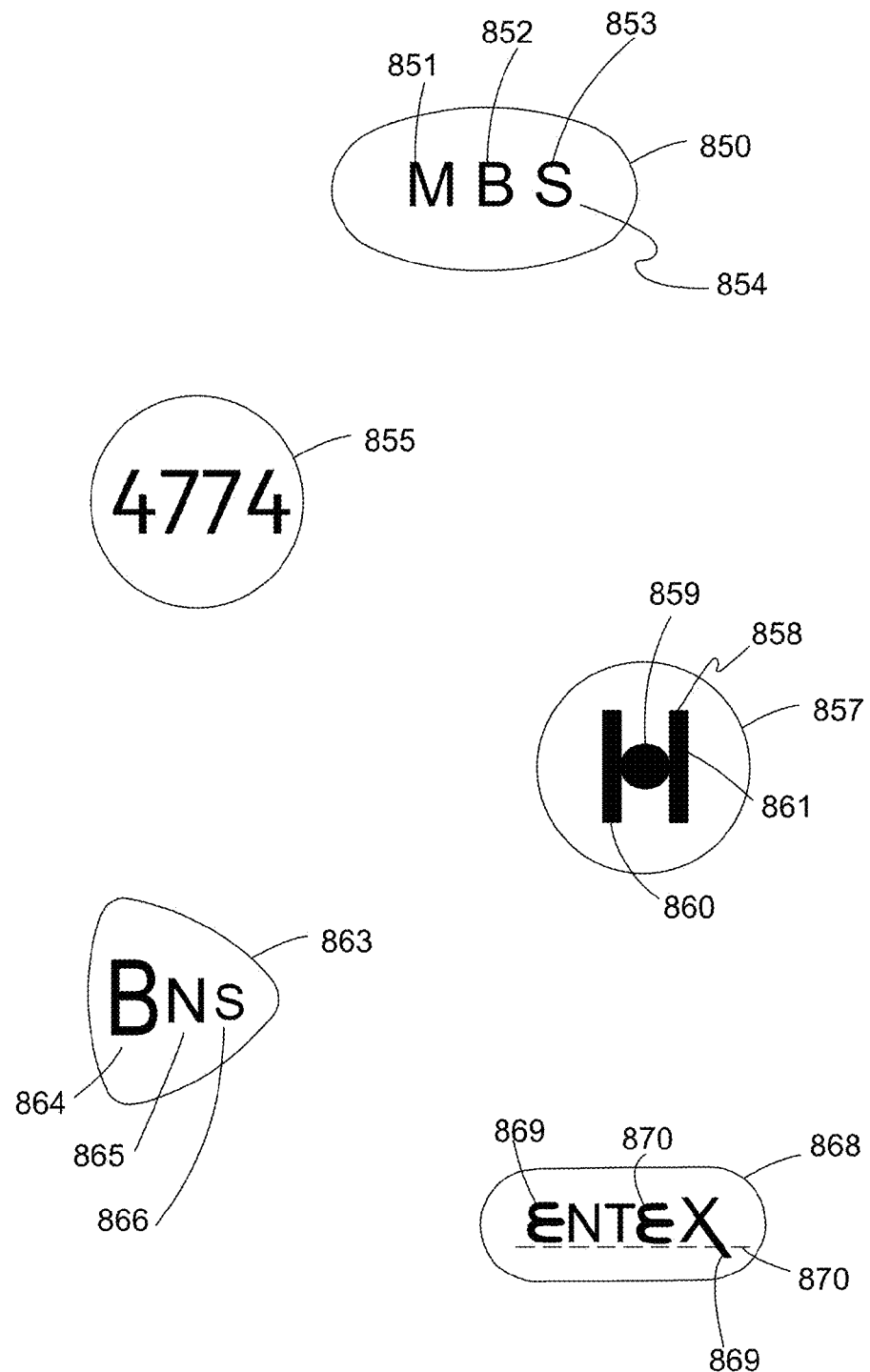
FIG. 24 shows sample pills and illustrates an example implementation of the imprint and marking analysis module of FIG. 17.

Referring now to FIG. 24, various pills 850, 855, 857, 863, 868 are shown to illustrate example implementations of steps in imprint and marking analysis module 330. As described above, character analysis module 330 determines in step 342 whether a character is pure or impure by determining if the character follows a detected font protocol. Pills 850 and 855 are examples of pills having imprints made up of pure characters M, B, S, 4, and 7. These characters are pure characters because each element making up each of these characters adheres 100% to font protocol of a font detected by OCR/OCV methods. For example, the letter M 851 of pill 850 can be broken down into four line segments that are positioned in the shape of a capital letter M. The length, width, relative position, and relative angle, for example, of each line segment match the reference values for these attributes of a letter M of the font detected by OCR/OCV methods. In this example, the line segments of the letter M adhere 100% to the lengths, positions, angles, and other attributes of a letter M written in Arial font. The letter B 852 and letter S 853 similarly adhere to Arial font protocol. Also, the font size, appearance, and spacing of the MBS imprint 854 is consistent between each of letters M 851, B 852, and S 853.

Pill 857 is another example of an impure character because the horizontal marking element 859 of the letter H character 858 is a regular geometric shape (a circle in this example) that is entangled in, or used to form, letter H character 858. Although OCR/OCV methods may identify character 858 as a letter H, step 342 of imprint and marking analysis module would mark character 858 as an impure character and further analyze character 858 because it does not adhere 100% to the letter H of fonts in the database. Character 858 would be broken down into its elements of a circle 859 and vertical beams 860, 861. The shape, position, size, length, relative position, and relative angles of elements 859, 860, and 861 would be compared to values for vendor imprints and symbols contained in the database.

Pills 863 and 868 are further examples of impure element markings or characters. Pill 863 shows impurity in overall character font size between bin unit #1 "B" 864, bin unit #2 "N" 865, and bin unit #3 "S" 866. Pill 868 shows element impurity due to skew in bin units #1 "E" 869, bin unit #4 "E" 870, and bin unit #5 "X" 871. The character "E" in both of bin unit #1 869 and bin unit #4 870 exhibits skew because the character has curves connecting the horizontal lines rather than a vertical line segment of a capital letter E of the detected Arial font. Bin unit #5 868 contains an impure version of the letter "X" that differs from the characters in bin units #1 through #4 because the lower right line segment 869 of the X extends beyond the base line 870 below the other characters on pill 1080. The lower right line segment of the X extends into the space normally occupied by markings such as subscripts or underlines.

Examples: Imprint and Marking Analysis with Complete and Incomplete Characters

Figure 25:
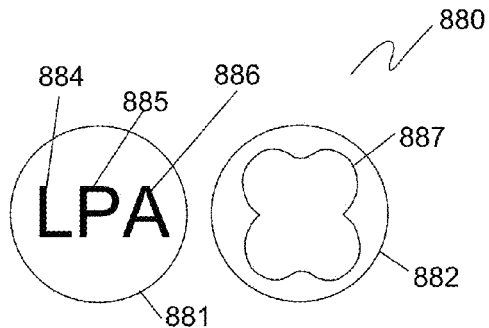
FIGS. 25-33 show sample pills and pill features to illustrate example implementations of imprint and marking module of FIG. 17.

Referring now to FIGS. 25-33, sample pills 880, 890, 895, 905, 910, and 920 are shown to illustrate how imprint and marking analysis module 330 distinguishes complete from incomplete characters in step 338. Referring to FIG. 25, pill 880 has imprint markings with complete character types. The "LPA" imprint 883 with letters L 884, P 885, and A 886 on side A 881 of pill 880 are pure characters because they adhere to detected font protocol. The clover shape 887 on side B 882 is a recognized, but irregular shape. Clover shape 887 for this example is a valid FDA-registered shape for both surface markings and for the overall shape of a pill. Pill 880 has no ambiguous markings present on side A 881 or side B 882. All markings of pill 880 are easily resolved via application of known OCR/OCV and shape detection methods.

Figure 26:
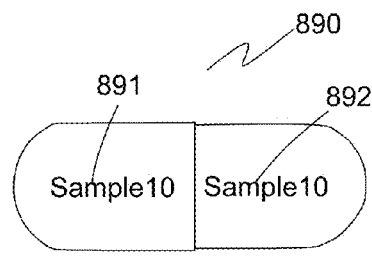

Referring to FIG. 26, pill 890 also has imprint markings 891, 892 with complete character types. Marking imprints 891, 892 on capsule-type pill 890 are easily resolved using known OCR/OCV methods because "Sample10" imprints 891, 892 are made up of pure characters that are all completely visible.

Figure 27:
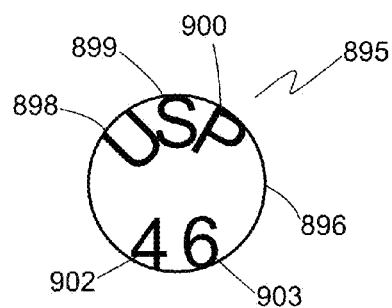

Referring to FIG. 27, pill 895 has an incomplete side since only side A 896 is shown. Imprints 897, 901 have incomplete characters because characters 898-900 and 902-903 contact the edge of side A 1121. Imprint and marking analysis module 330 is able to successfully map 100% of the coordinates of side A 896, which normally would result in labeling characters 898-900, 901-903 as complete characters. However, characters 898-901, 901-903 are marked as incomplete due to the possibility of a partially truncated character. Processing incomplete characters accommodates analysis of pills that have errors, such as manufacturing misprints, off-set prints, and pill damage from processing equipment, causing characters to be partially occluded or truncated. For example, a pill may exhibit crumbling or partial disintegration due to batch manufacturing or chemical processing problems. This type of manufacturing problem may lead to characters located near the outer edge of the pill being partially-truncated.

Figure 28:
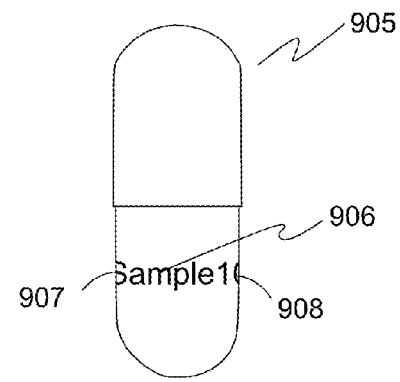

Referring to FIG. 28, capsule-type pill 905 also has an incomplete side since the image or data set has only one side of pill 905. Pill 905 has imprint 906 with incomplete characters because characters 907, 908 are not entirely visible due to the curvature of pill 905 removing portions of these letters from the field of view.

Figure 30:
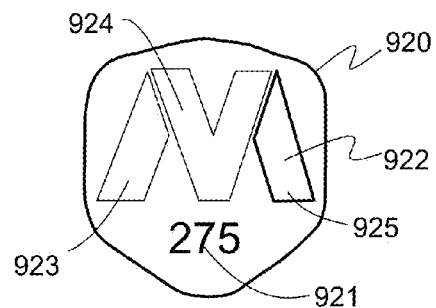

Referring to FIG. 30, pill 910 is flagged as incomplete because a score mark 911 interferes with a primary imprint character 913. The resulting display is considered to be ambiguous and requires further processing with imprint and marker analysis module 330. Based on information from databases available to method 100, this imprint design is identified as being from a particular family of pills. Imprint and marking analysis module 330 resolves character 913 by subtracting score mark 911 from the display except for the portions 912, 914 overlapping the number 6 character 913.

Example: Imprint and Marker Analysis with Known Characters

Referring now to FIG. 30, pill 920 has a stencil-type design that forms the letter M marking 922. Letter M marking 922 would occupy a bin run with three bin units since deconstructor module 150 would detect three distinct markings 923, 924, 925. Only the bin unit containing marking 924 contains a character identified using OCR/OCV methods as a letter V. Markings 923 and 925 (bin unit items #1 and #3) that form the outer "legs" of the letter M 922 and the orientation of the "275" dose value marking 921 etched below the letter M vendor symbol marking 922 are items used to verify that V marking 924 is in fact a V and not another character. Based on comparison with database values, imprint and marking analysis module 330 identifies letter M marking 922 as a recognized drug vendor glyph.

The present invention preferably is "hard coded" to identify glyphs and symbols by comparing bin unit and bin run contents with reference values in a table or database, for example. Such a reference table preferably contains all bin run values for glyphs, symbols, and logos used by drug vendors and manufacturers. Such a table is preferably updatable to account for additions of new symbols, new drug vendors, and other new information.

Figure 31:
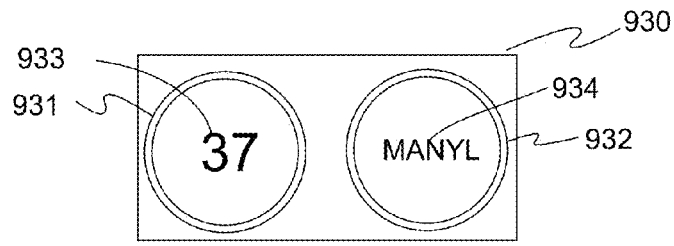
Figure 32:
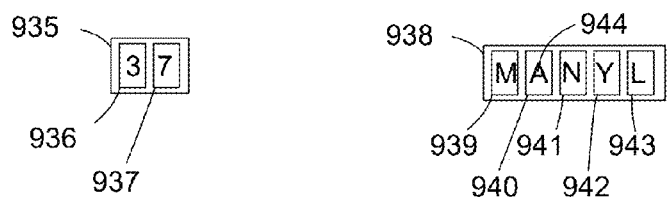

Referring now to FIG. 31, pill image 930 with pill side A 931 and pill side B 932 of a fictional Manyl pill illustrates an example of "known" characters detected in step 338 of imprint and marking analysis module 330. Pill side A 931 includes imprint 933 that reads "37." Pill side B 932 includes imprint 934 that reads "MANYL."

Figure 29:
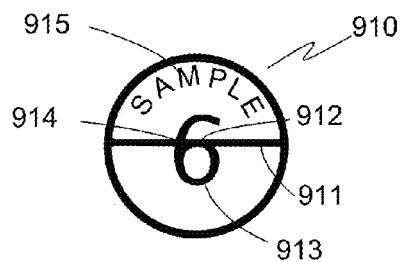

As illustrated in FIG. 29, deconstructor module 150 yields bin run 935 for pill side A 933 of FIG. 28 with bin units 936, 937 containing "3" and "7," respectively. Shown in FIG. 32, bin run 938 for pill side B 932 of includes bin units 939-943 containing "M," "A," "N," "Y," and "L," respectively. The only character that requires additional deconstruction is bin unit 940 of bin run 938 because it contains capital letter "A" with an enclosed internal triangular region 944.

Figure 33:
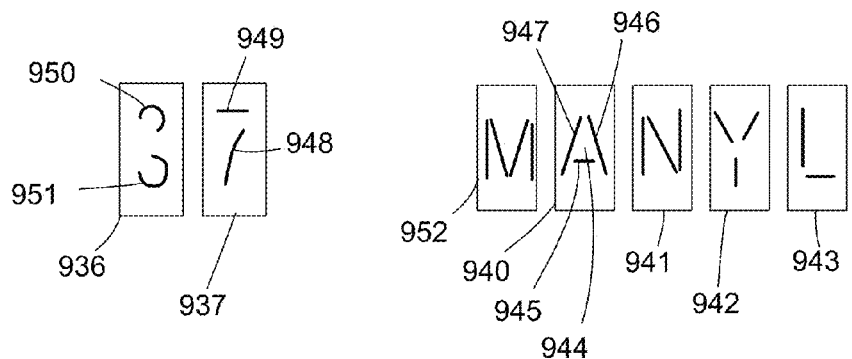

As illustrated in FIG. 33, internal triangular region 944 is formed by the junction of the three elements 945, 946, 947 that construct the character. Each character of bin units 936-937 and 939-943 is similarly shown enlarged in FIG. 33 having been broken down into elements by known OCR/OCV methods. These OCR/OCV methods identify line segments, curves, intersections, and vertices and break the character into these elements.

Still referring to FIG. 33, bin units 936, 937 of bin run 935 contain the fundamental elements of the "3" and "7" characters on pill side A 931. Bin unit 937 contains a horizontal element 949 representing the top of the number 7 and a curve 948 that represents the lower portion of the number 7. Bin unit 936 contains two roughly three-quarter circle curved segments 950, 951 representing the upper and lower portions of the number 3, respectively. Similarly, bin units 939-943 contain the line segments needed to construct MANYL imprint 934 present on pill side B 932. The contents of both bin runs 935, 938 all resolve to pure, complete, and known characters, so character imprint and marking analysis module 330 marks character processing complete in step 344 of FIG. 17.

Examples: Pill Analysis with Unknown Characters

Figure 34:
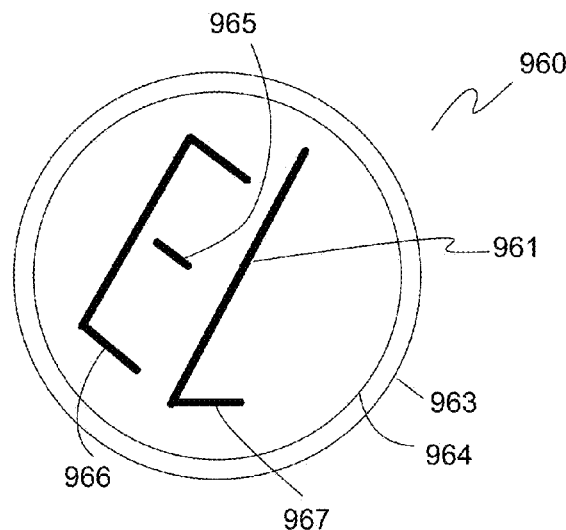
FIGS. 34-36 show a sample pill with pill features to illustrate another example implementation of imprint and marking module of FIG. 17.
Figure 35:
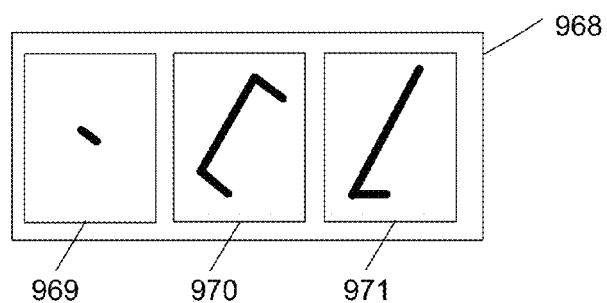
Figure 36:
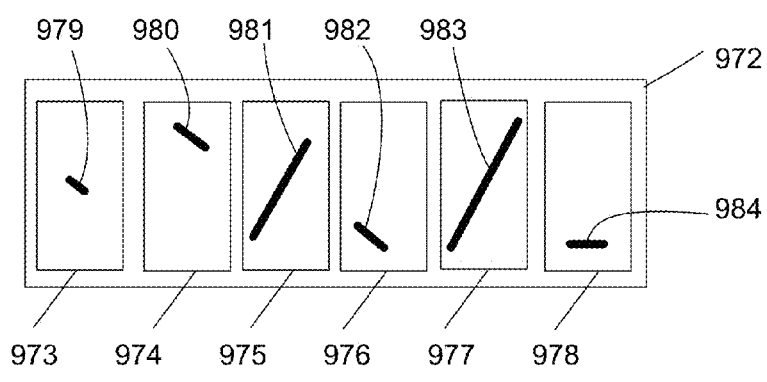

Referring now to FIGS. 34-36, a more complex glyph or symbol character illustrates another example implementation of imprint and character analysis module 330. FIG. 35 shows imprint 961 on the surface pill 960. At first glance, glyph 961 is not easily recognizable and would likely fail to be identified by known OCR/OCV methods. If OCR/OCV methods fail to identify glyph 961, it is characterized as "unknown" in step 338 of imprint and marking analysis module 330 and further processed, beginning with breaking glyph 961 into elements in step 346. The present invention improves on the limitations of known methods by comparing the elements comprising glyph 961 with those of known glyphs and symbols in a database or other repository of information.

As also illustrated in 34, successive iterations of deconstructor module 150 achieve 100% coordinate mapping of pill 960, first detecting the overall pill shape 963, followed by beveled edge 964, and then first glyph portion 965, second glyph portion 966, and third glyph portion 967. As illustrated in FIG. 35 glyph portions 965, 966, 967 are placed in three bin units 969, 970, 971, respectively, of bin run 968. Imprint and marking analysis module 330 attempts to identify the glyph portions using known OCR/OCV methods, but will likely fail due to the uncommon shape of glyph 961 and of glyphs portions 965-967.

As illustrated in FIG. 36, bin run 972 has bin units 973-978 that contain elements 979-984, respectively. These elements make up glyph portions 969, 970, 971. Bin run 972 includes the following information:
Vertical elements: none
Horizontal elements: one total
    'short';
        bin unit 971
Diagonal elements: five total
    'long' (two)
        bin unit 975
        bin unit 977
    'short' (three)
        bin unit 973
        bin unit 974
        bin unit 976
Curved elements: none
Diacritical relationships: three
    all six bin units are diacritical with respect to each other
Underscore elements: none
Super/sub-scripts: none
Explicit shape elements: none Bin run 972 data also contains relative angles and length values for each element. In one embodiment, elements are expressed as vectors with a length and angle value. Each glyph can thus be represented as a group of vectors. In one embodiment of the invention, the vector direction is expressed as being toward the edge of the pill. Method 100 preferably maintains tables of vectors for identifying known glyphs and symbols.

By analyzing markings that appear to be fractured or split up by design FIGS. 34-36 also illustrate the processing of drug objects that are fractured, damaged, or pre-split along score marks. The present invention does not discard an arrangement of glyph elements if one or more glyph elements are missing due to damage or being located on a missing portion of a pre-split pill. The present invention instead characterizes and/or identifies a pill even if only one element is detected.

Figure 37:
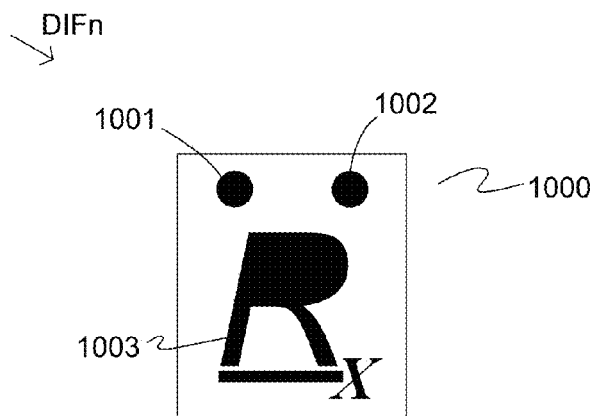
FIGS. 37-40 show examples of pill markings or imprints to illustrate another implementation of imprint and marking module of FIG. 17.

Referring now to FIGS. 37-40, another example of unknown character processing using imprint and marking analysis module 330 is illustrated. As illustrated in FIG. 37, deconstructor module frame 1000 from iteration DIFn includes unknown characters 1001, 1002, 1003 detected by deconstructor module 150 due to enclosed, unmapped regions within each character 1001, 1002, 1003. The unmapped regions, shown as black-filled regions in FIG. 37, are deconstructed through successive iterations of deconstructor module 150 until the characters are broken down into raw element parts and no unmapped regions exist.

Figure 38:
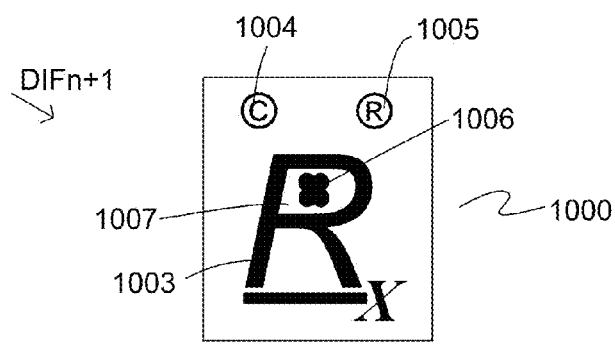
Figure 39:
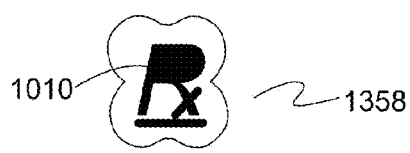
Figure 40:
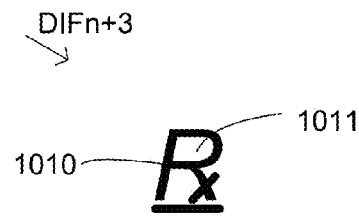

As illustrated in FIG. 38, the next iteration DIFn+1 of deconstructor module 150 yields a copyright symbol 1004, registered trademark symbol 1005, and cloverleaf shape 1006 from an enclosed portion 1007 of the letter R character 1003. As illustrated in FIG. 39, the next iteration DIFn+2 of deconstructor module 150 maps cloverleaf region 1006 to reveal an Rx character 1010. As illustrated in FIG. 40, the next iteration DIFn+3 of deconstructor module 150 reveals that enclosed region 1011 of Rx character 1010 is a pure character and enclosed region 1011 has no additional elements or unmapped regions. The Rx symbol 1010 is considered a universal or language-agnostic symbol used world-wide and known OCR/OCV libraries are used to identify the Rx character 1010.

Example: Drift Calculation

Figure 41:
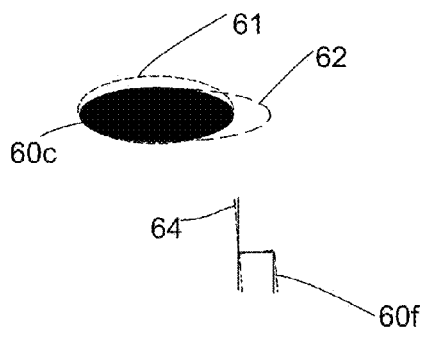
FIGS. 41-43 show examples of pill features to illustrate an implementation of drift calculation module of FIG. 19.
Figure 42:
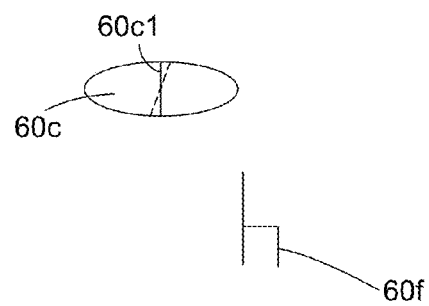
Figure 43:
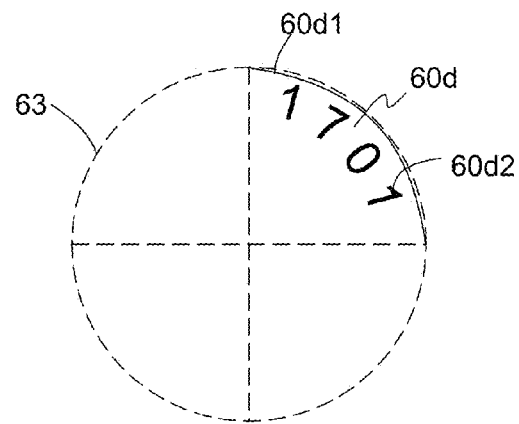

Referring now to FIGS. 41-43 and recalling objects 60c and 60d of FIG. 6, an example implementation of drift module 370 is discussed. Drift module 370 or variations thereof is used to perform step 122 of method 100 shown in FIG. 2. FIG. 41 shows objects 60c, 60f. Dashed lines indicate ellipses 61, 62 fit to ovoid object 60c and show the drift range for size and shape of object 60c. Dashed line 64 indicates a reference h-shape used to calculate drift values for h-shape object 60f.

The size of a pill can change due to environmental and other factors. Solid oral dose medications can swell from exposure to moisture or can shrink due to desiccant shipping or storage conditions. For a pill processed with no reference value(s) available, drift values for the pill's size and shape are zero. In other embodiments, these drift values are reported as empty, error, or uncalculated. Ovoid object 60c shown in FIG. 41 is a recognized, regular geometric shape, but if the right and left sides of ovoid object 60c move towards each other, then ovoid 60c becomes more like a circle. Similarly, a square can become a triangle if the length of one side is reduced to a value near zero.

FIG. 41 also illustrates angular drift as well as spatial drift for h-shaped object 60h as the rotational or angular orientation difference between h-shaped object 60f and dashed line 64, for example. Dashed line 64 shows a reference h-shape used to calculate drift values for object 60f. Object geometries with external angles have an angular drift value calculated by drift calculation module 370. Swelling and shrinkage caused, for example, by changes in a pill's environment can also affect the drift value(s) of features imprinted on a pill. The h-shaped object 60f is also eligible for spatial drift value calculation since the object includes angles in its geometry defined between lines or line segments. Such angles are very often present in many-sided pill shapes, such as hexagonal pills. The present invention determines angles for all features that exhibit a vertex of two or more segments, such as an angle that forms part of the pill's contour, part of a marking or feature within the pill's contour, or part of an internal cut-out in a pill.

FIG. 42 shows fully-mapped objects 60c, 60f where ovoid object 60c and "h" object 60f each have size, shape, angle, color, and texture information. Drift calculation module 370 can calculate corresponding drift values for these attributes. Ovoid object 60c also has one or more drift value for a central score mark 60c1 since it exhibits this feature. Drift values for score mark 60c1 include, for example, length, position, angle, depth, width, and distance from another feature.

FIG. 43 illustrates drift for object 60d with quarter circle portion 60d1 and numbers 60d2. Quarter circle 60d1 displays both actual drift related to the detected edge as well as an estimated drift value for the remaining calculated or predicted edge 63. The established default for this drift computation is a perfect circle. Drift calculation here assumes that the closer the visible quarter-circle edge 60d1 of object 60d adheres to a perfect circle 63 having the average radius of the quarter circle edge 60d1, the smaller the estimated drift values will be for the remaining three computed segments. The present invention applies this type of drift computations across all partial pill shapes if the whole shape can be successfully computed or estimated.

Example: Counterfeit Detection 1

Figure 44:
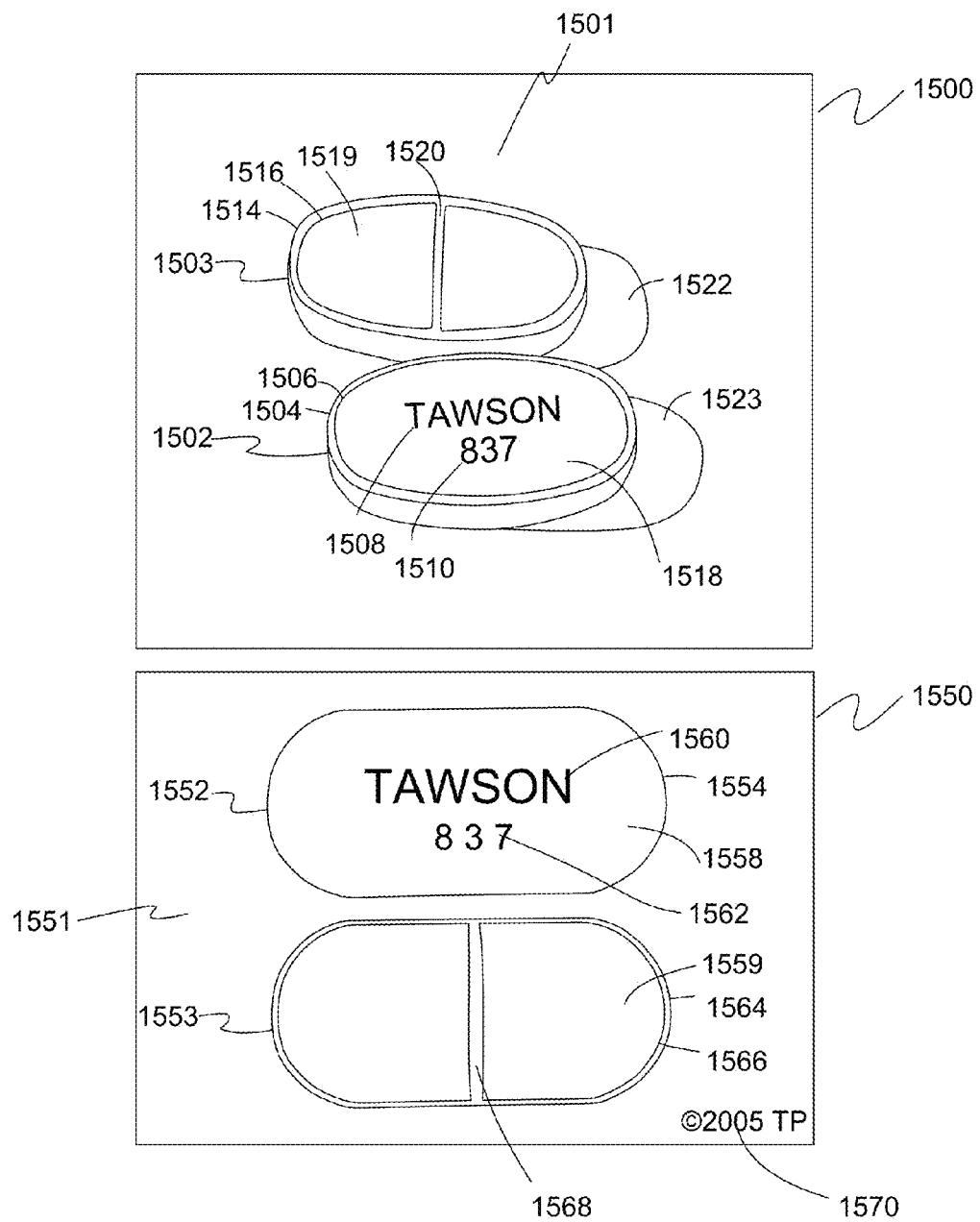
FIG. 44 shows example pill images to illustrate use of the method of FIG. 2 to detect a counterfeit pill.

Referring now to FIG. 44, an example application of method 100 used to process a sample image 1500 is illustrated for a recognized counterfeit pill 1501. In this example, image 1500 shows a counterfeit pill 1501 and image 1500 shows an authentic drug 1552. After acquiring image 1500 in step 202 with side A 1502 and side B 1503, method 100 applies a complete set of deconstructor iteration module 150 cycles (5 total for drug image 1500) to obtain overall shape 1504, bevel edge 1506 "TAWSON" imprint 1508, "837" imprint 1510, and color 1518 on side A 1502. On side B 1503, method 100 detects outer shape 1514, bevel edge 1516, color 1519, and score mark 1520. Method 100 then checks images and data sets contained in a reference database using the most dominant identifying feature of image 1500, "TAWSON 837". A reference database provides an image data set corresponding to "TAWSON 837" pill 1501 in image 1550.

Method 100 performs a separate set of deconstructor module 150 cycles to extract outer shape 1554, color 1558, "TAWSON" imprint 1560, and "837" imprint 1562 on side A 1552. Method 100 similarly extracts outer shape 1566, bevel edge 1564, score mark 1568, and color 1559 from side B 1553 of pill 1551. Next, method 100 compares the bin contents obtained after each iteration of deconstructor module 150 for each of pill 1501, 1551 to arrive at a match or mismatch decision. For image 1500 and image 1550, method 100 reports a mismatch on at least six grounds. First, the overall shape 1504 of pill 1501 does not match overall shape 1554 of pill 1551. Second, bevel edge 1506 does not match reference bevel edge 1566 because it is larger and has a rougher edge than bevel edge 1566. Third, score mark 1510 is for a flat surface and deeper than score mark 1568. Fourth, the inter-character spacing of "837" imprint 1514 does not match the inter-character spacing of "8 3 7" imprint 1562 on pill 1551. Fifth, the Vendor name on pill 1501 is valid, but relative size between "TAWSON" imprint 1508 and "837" imprint 1510 does not match relative size between "TAWSON" imprint 1560 and "8 3 7" imprint 1562. Sixth, side A 1502 has bevel edge 1506, but side A 1552 of pill 1551 does not.

Compared to image 1550, shadows 1522, 1523 present in image 1500 support the determination that image 1500 is a "street photo" rather than a vendor-supplied photo. The matching orientation of pill sides 1552, 1553, presence of © 2005 TP label 1570, and lack of shadows in reference image 1550 support the determination that reference image 1551 is vendor-supplied. Comparing vendor data with © 2005 TP label 1570, background, image size, and other attributes of image 1550 are used to verify that reference image 1550 itself is authentic. Thus, method 100 reports that pill 1501 is a counterfeit drug based on the significant drift values between features of pill 1501 and pill 1550.

Example: Counterfeit Detection 2

Figure 45:
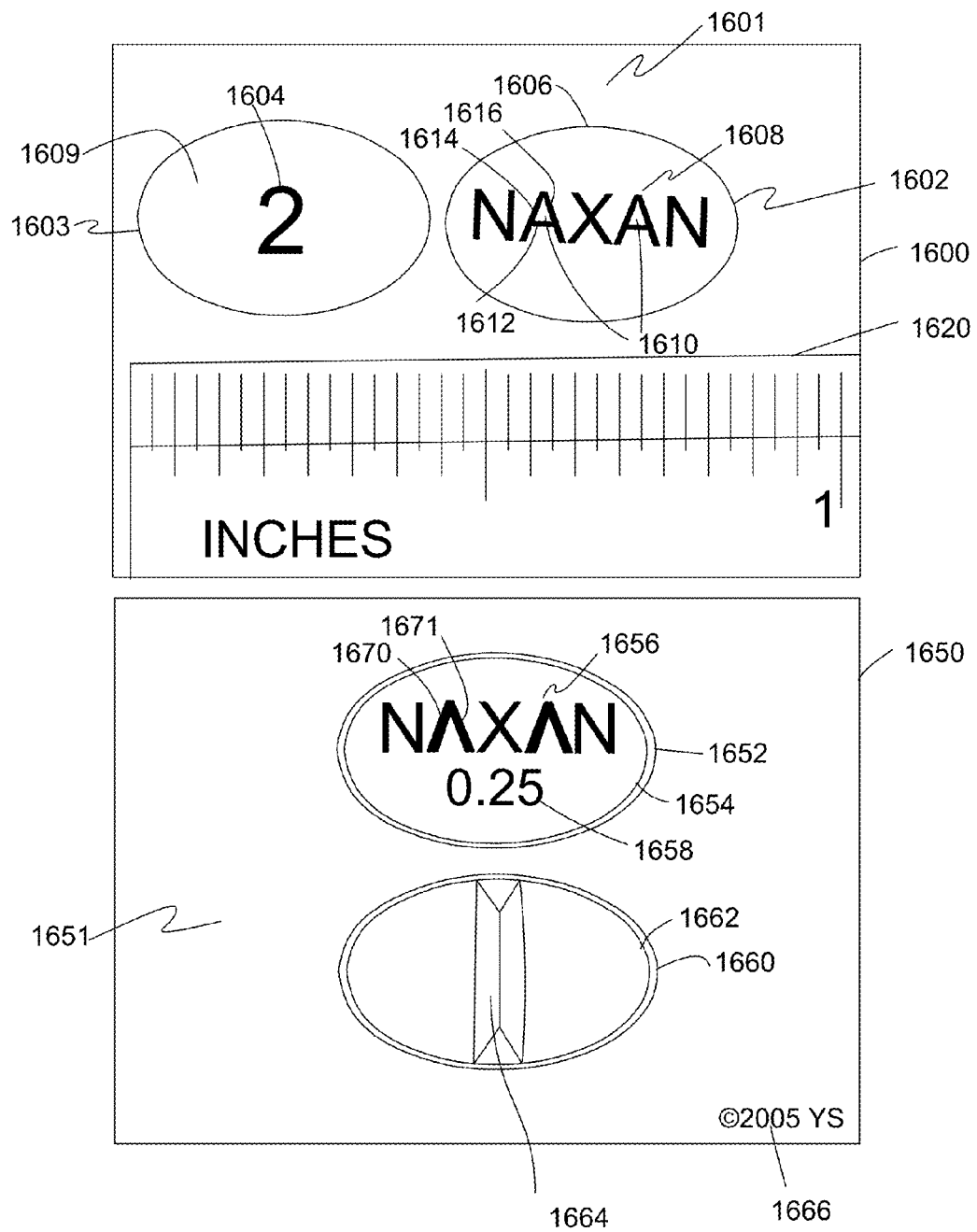
FIG. 45 shows more example pill images to illustrate use of the method of FIG. 2 to detect a counterfeit pill.

Referring now to FIG. 45, another example illustrates method 100 performed with image 1600 and image 1650 for counterfeit detection. Image 1600 shows higher quality, but still known counterfeit version of a Naxan pill 1601. Method 100 maps all features of pill 1601 (3 cycles total) and the results are compared to image 1650 obtained from a reference database. For pill 1601, method detects overall shape 1606, "2" marking 1604 on side B 1603, "NAXAN" imprint 1608 on side A 1602, and pill color 1609. At least 5 variances are detectable compared to reference image 1650, which is a vendor-supplied image as indicated by "© 2005 YS" 1666 in the corner of image 1650. Primarily, when a real FDA-registered drug is characterized, it has a score mark 1664. Under current FDA specifications, all pills having a score mark are assigned a default score mark value of 1. The score mark value count is increased incrementally if physical score marks are etched into the pill. The differential in the score mark count alone flags pill 1601 as fake. In addition, fake pill 1601 is missing "0.25" imprint 1658 below a "NAXAN" imprint 1656, fake pill 1601 has a "2" imprint 1604 on side B 1603 instead of a score mark 1664 on authentic pill 1651, and fake pill 1601 lacks bevel edges 1662, 1654 of authentic pill 1651. Further, the As in "NAXAN" imprint 1608 of fake pill 1601 have three font elements or lines 1612, 1614, 1616 making up the letter A and enclosing a raised region 1610 consistent with the surrounding pill surface, while the As in "NAXAN" imprint 1656 of pill 1651 are formed by two angled lines 1670, 1671 that do not form an enclosed region. Ruler 1620 shown in image 1600 may be used, but is preferably not relied on exclusively, to determine size of pill 1601.

Figure 46:
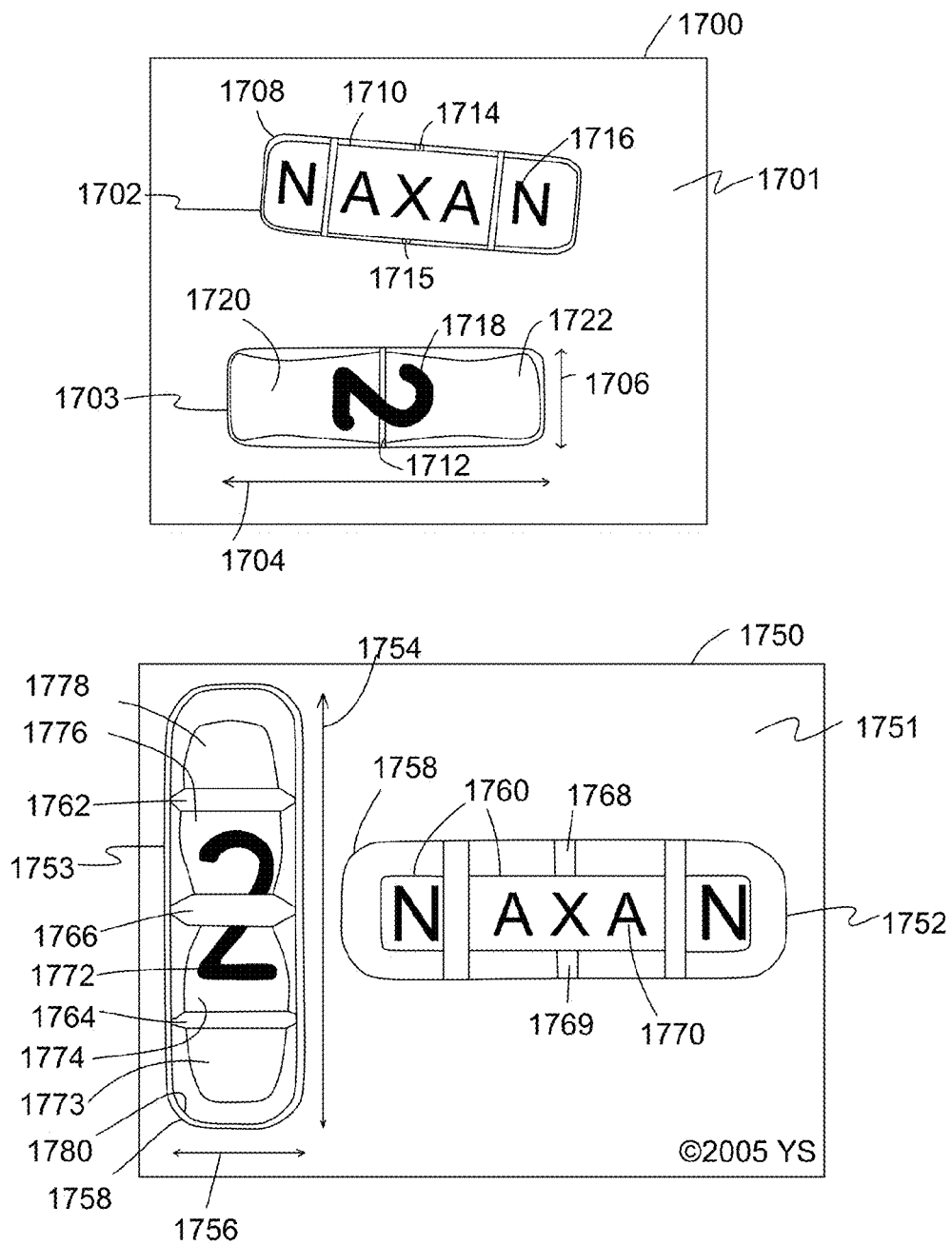
FIG. 46 shows more example pill images to illustrate use of the method of FIG. 2 to detect a counterfeit pill.

FIG. 46 illustrates an example of an advanced counterfeit Naxan pill or fake pill 1701 shown in image 1700. Method 100 performs a full set of deconstructor module 206 cycles to characterize fake pill 1701 and to characterize authentic pill 1751 in reference image 1750. Upon comparison of features, fake pill 1701 closely resembles authentic pill 1751, but differs in at least many detectable areas. While more differences between fake pill 1701 and authentic pill 1751 are apparent, seven differences are discussed below.

One telling difference is that fake pill 1701 does not have the same ratio of overall tablet length 1704 to width 1706 as the ratio of length 1754 and width 1756 of authentic pill 1701. Second, the radius of curvature of the corners 1708 of fake pill 1701 is smaller than the radius of curvature for corners 1758 of authentic pill 1751. Third, bevel edge 1710 on side A 1702 of fake pill 1701 is narrow, flat, and rough compared to bevel edge 1760 on side A 1752 of authentic pill 1751. Rough bevel edge 1710 of fake pill 1701 shows chipping and erosion-type damage, perhaps from a missing surface coating. Fourth, fake pill 1701 lacks score marks 1762, 1764 on side B 1753 of authentic pill 1751. Fifth, score mark 1712 on side B 1703 of fake pill 1701 is too narrow and is not a butterfly-type score mark like score mark 1766 of authentic pill 1751. Sixth, score marks 1714, 1715 on side A 1702 of fake pill 1701 are shorter than score marks 1768, 1679 of authentic pill 1751 reference tablet and drift excessively in their positions along side A 1702 of fake pill 1701 by not being centered lengthwise. Seventh, method 100 also detects variations between "NAXAN" imprint 1716 and "2" imprint 1718 as compared to "NAXAN" imprint 1770 and "2" imprint 1772, respectively.

Characters in "NAXAN" imprint 1770 of authentic pill 1751 exhibit element marking distances from each character element to pill edge 1758 and from each character element to bevel edge 1760. These differences are different than observed in fake pill 1701, which exhibits a larger distance between each character element and bevel edge 1710. Additionally, inter-character spacing between A and N of "NAXAN" imprint 1716 of fake pill 1701 is inconsistent with the greater inter character spacing between A and N of "NAXAN" imprint 1770 of authentic pill 1751. Further, the ratio of character sizes in fake pill 1701 is inconsistent with the character sizes of authentic pill 1751 because the AXA characters on authentic pill 1751 are smaller than the N characters at each end of "NAXAN" imprint 1770. Many other variations exist, including shape discrepancies between region 1720 on pill 1701 and regions 1773, 1774 on pill 1751 and between region 1722 of pill 1701 and regions 1776, 1778 of pill 1751.

Example: Drift Analysis for Imprints

Figure 47:
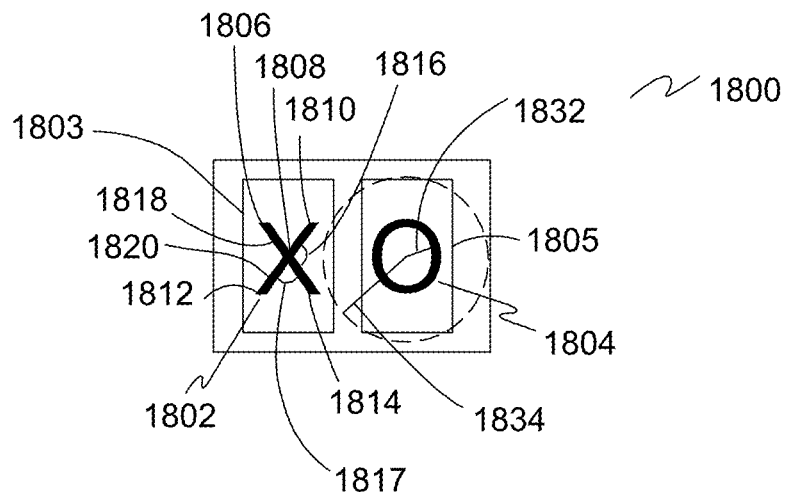
FIGS. 47-48 show characters to illustrate drift calculation module of FIG. 19 as applied to imprints and markings.
Figure 48:
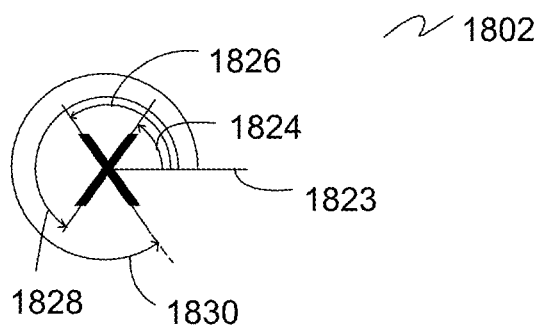

Referring now to FIGS. 47 and 48, an example of imprint drift analysis module 370 is illustrated for imprints and markings. FIG. 47 shows bin run 1800 with an X character 1802 in bin 1803 and an O character 1804 in bin 1805. X character 1802 is constructed of two intersecting line segments 1818, 1820 with intersection point 1808. X character 1802 has angles 1816, 1817 between segments 1818, 1820; and four endpoint locations 1806, 1810, 1812, 1814, one for each endpoint of segments 1818, 1820. As shown in FIG. 18, X character 1802 has four angles 1824, 1826, 1828, 1830, one for each segment of X character 1802 relative to the horizontal 1823. Shown in FIG. 47, "O" character 1804 has internal radius 1832 in and an effective frame radius or distance 1834 for a circle inscribing bin 1805. Internal radius and effective frame radius also apply to X character 1802.

Known OCR methods return either a pixel count or a sum of the pixel count for the region mapped in a morphological step sequence. In one embodiment, drift calculations include calculating the ratio of the area of a first mapped region to the area of second mapped region. As deconstructor module sweeps a region from a starting point or frame at iteration DIF#n to a specific ending point or next frame at iteration DIF#n+1, the region swept has a total area. From the region's total area, the area occupied by a marking or markings is calculated and subtracted. In one example, the first mapped region and second region represent enclosed contrast shift regions of successive iterations of contrast shift detection module 200. Referring to FIG. 46, for example, a first mapped region is region bevel edge 1780 of pill side A 1753 that was mapped in one iteration of deconstructor module 150. A second mapped region is region 1774 of pill side A 1753 mapped in a subsequent iteration of deconstructor module 150. For additional drift values, for example, the distances between vertices of "2" imprint 1772 and any other feature is calculated, such as region 1774, bevel edge 1780, or pill outer edge 1758.

Given a full set of inner bin values, such as the angles, endpoints, and radii described above, method 100 can populate tables with distance and angle information for every marking on a pill. Determining the distance from an element of a marking to the starting location or edge of the current DIF detection frame enables method 100 to validate distance, area, and volume ratios presented by various pill features. Counterfeit pills may have the correct distance ratios between elements and an edge (e.g., distance from segment ends 1806, 1810, to nearest pill edge), but have incorrect internal feature ratios for a character element (e.g., angle 1817). Angular data captured from a drug sample can be used to verify degree of rotation of marking elements with respect to each other and with respect to the pill or any other feature of the pill.

Interleaving frame drift analysis (IFDA) is the process by which both sequential and, more importantly, non-sequential DIF# frames are examined for drift. IFDA is the method by which pill feature placement is verified against a reference image or data set. IFDA can be used to determine not only if a pill feature is present, but also determine whether the feature is properly located relative to other pill features. Pill color typically plays the least significant role in counterfeit determination because sensor and cameras quality and sensitivity varies tremendously from device to device, especially when the present invention is applied to platforms such as smart phones and the like.

The present invention can also detect counterfeit pills by checking a speckled appearance of a pill. The present invention can check the unit density of specks on a pill and the properties of the specks (e.g., size) against reference values. A drug manufacturer may use the present invention as a quality control tool to characterize changes in drug properties as production steps are modified. A drug manufacturer could also then apply the present invention to an entire drug line to produce "master drift tables" that can be used by a dispensary entity to see if the medications or items about to be dispensed or consumed are within the manufacturer's specifications or not. Drift processing, given sufficient sensor data, can provide unique or per-pill identification because the ability to map the location and property of every individual sensor data point is possible.

The most common languages appropriate for code development for the present invention include C, C++, C#, OpenCL, OpenGL, Voyant Vision, CUDA, and Python. Other programming languages may also be used.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. A computer-implemented method of pill analysis comprising the steps of:
    a computer acquiring a pill image having an image frame;
    the computer detecting contrast shifts within the image frame, thereby locating at least one object having an object outline defining an enclosed contrast shift region;
    the computer determining a first value for the at least one object, the first value selected from the group consisting of an area, a position, a length, a width, an angle, a color, a brightness, a code, a shape, a crystal pile size, a crystal geometry, a substance identity, and a character identity;
    the computer searching within the enclosed contrast shift region for additional contrast shifts, thereby determining contents of the enclosed contrast shift region;
    the computer determining for the contents of the enclosed contrast shift region at least one second value selected from the group consisting of an area, a position, a length, a width, an angle, a color, a brightness, a code, a shape, a crystal pile size, a crystal geometry, a substance identity, and a character identity;
    the computer outputting a result to a user based on the first value and the second value.

2. The method of claim 1, further comprising:
    the computer comparing one or more of the at least one first value and the at least one second value with a reference value to obtain at least one drift value.

3. The method of claim 2, further comprising:
    determining a pill authenticity based on the at least one drift value.

4. The method of claim 1, wherein the step of detecting contrast shifts is performed by one of a line scan method, a radial scan method, and a polygonal scan method.

5. The method of claim 1, wherein the step of detecting the enclosed contrast shift region comprises detecting a change in one or more of (i) a color, (ii) an intensity, (iii) a chemical constituency, and (iv) a physical geometry.

6. The method of claim 5, wherein detecting the change in a chemical constituency comprises detecting a change in one or more of an electron value, an isotope value, and a phase state value.

7. The method of claim 1, wherein detecting the at least one object comprises detecting at least a first pill side and a second pill side including:
    comparing a property of the first pill side with a corresponding property of the second pill side, wherein the property and the corresponding property are selected from the group consisting of shape, area, length, width, height, angle, and perimeter length; and assigning a side label to each of the first pill side and the second pill side.

8. The method of claim 1, wherein determining at least one enclosed contrast shift region includes
determining whether the enclosed contrast shift region contacts the image frame at more than one location;
defining at least one partial object
determining whether the at least one partial object is an incomplete drug object; and
determining whether the incomplete drug object substantially matches a portion of a whole geometric shape.

9. The method of claim 1, further comprising the steps of:
determining a first background value;
determining a reference background value;
comparing the first background value with the reference background value to determine a background shift value.

10. The method of claim 1, wherein determining the contents of the enclosed contrast shift region includes
searching regions enclosed by the one or more characters for a contrast shift when the contrast shift region contains one or more characters.

11. The method of claim 1, wherein determining the contents of the enclosed contrast shift region contents includes:
defining each of the one or more characters by one or more elements selected from the group consisting of a line segment, a curve, a circle, a vertex, a length, a distance, and a vector when the contrast shift region contains one or more characters;
determining at least one value for each of the one or more elements, the at least one value selected from the group consisting of a position, a length, an angle, a shape, a distance, a radius, and a line width; and
calculating a drift value for the one or more characters.

12. The method of claim 1, wherein detecting the at least one object includes:
determining whether the pill is a capsule by detecting at least one feature selected from the group consisting of a capsule seam, a capsule band traversing the oblong object, and a plurality of objects having a substantially spherical shape when the at least one object is an oblong object.

13. The method of claim 12, wherein detecting the capsule seam includes:
detecting a first portion of a first elongated segment, the first portion having a proximal end and a distal end;
detecting a second portion of a first elongated segment, the second portion having a proximal end and a distal end, wherein the second portion of the first elongated segment is substantially parallel to the first portion of the first elongated segment and wherein the distal end of the second portion of the first elongated segment is located proximate to the proximal end of the first portion of the first elongated segment;
detecting a first transverse segment extending transversely between the proximal end of the first portion of first elongated segment and the distal end of the second portion of the first elongated segment;
detecting a first portion of the second elongated segment, the first portion having a proximal end and a distal end;
detecting a second portion of the second elongated segment, the second portion having a proximal end and a distal end, wherein the second portion of the second elongated segment is substantially parallel to the first portion of the second elongated segment and wherein the distal end of the second portion of the second elongated segment is located proximate to the proximal end of the first portion of the second elongated segment; and
detecting a second transverse segment extending transversely between the proximal end of the first portion of second elongated segment and the distal end of the second portion of the second elongated segment.

14. The method of claim 13, further comprising
determining whether the first transverse segment is substantially collinear with the second transverse segment.

15. A computer-implemented method of pill analysis from a pill image, the method comprising the steps of:
inputting a pill image to a computer, the pill image having an image frame;
the computer detecting an object having an object outline within the image frame;
the computer determining for the object one or more value selected from the group consisting of a length, a width, a height, an area, a position, a color, an intensity, a shape, an angle, a perimeter length, a code, a substance identity, a crystal pile size, a crystal geometry, and a character identity;
the computer detecting one or more additional object within the object outline, the one or more additional object selected from the group consisting of a letter, a number, a character, a symbol, and a glyph;
the computer defining the one or more additional objects using one or more object elements selected from the group consisting of a line segment, a curve, a circle, an angle, a vector, a line width, a vertex, a distance, and a length;
the computer calculating, for the one or more object elements, a value selected from the group consisting of a position, a distance, a dimension, and an angle;
comparing the value with a reference value to obtain at least one drift value; and
reporting a result to a user based on the at least one drift value.

16. The method of claim 15, wherein reporting the result includes reporting a value selected from the group consisting of a pill identity and an authenticity determination.

17. The method of claim 15, wherein detecting the object comprises detecting a change in one or more of (i) a color, (ii) an intensity, (iii) a chemical constituency, and (iv) a physical geometry.

18. The method of claim 15, wherein detecting the object includes:
determining whether the pill is a capsule by detecting at least one feature selected from the group consisting of a capsule seam, a capsule band traversing the oblong object, and a plurality of objects having a substantially spherical shape when the at least one object is an oblong object.

19. The method of claim 15, wherein the oblong object has a first elongated segment and a second elongated segment substantially parallel to the first elongated segment, and detecting a capsule seam comprises:
detecting a first portion of the first elongated segment, the first portion having a proximal end and a distal end;
detecting a second portion of the first elongated segment, the second portion having a proximal end and a distal end, wherein the second portion of the first elongated segment is substantially parallel to the first portion of the first elongated segment and wherein the distal end of the second portion of the first elongated segment is located proximate to the proximal end of the first portion of the first elongated segment;

detecting a first transverse segment extending transversely between the proximal end of the first portion of first elongated segment and the distal end of the second portion of the first elongated segment;

detecting a first portion of the second elongated segment, the first portion having a proximal end and a distal end;

detecting a second portion of the second elongated segment, the second portion having a proximal end and a distal end, wherein the second portion of the second elongated segment is substantially parallel to the first portion of the second elongated segment and wherein the distal end of the second portion of the second elongated segment is located proximate to the proximal end of the first portion of the second elongated segment; and detecting a second transverse segment extending transversely between the proximal end of the first portion of second elongated segment and the distal end of the second portion of the second elongated segment.

* * * * *